United States Patent [19]
Tahara et al.

[11] Patent Number: 6,031,631
[45] Date of Patent: Feb. 29, 2000

[54] IMAGE PROCESSING SYSTEM WITH INDEPENDENT CONTROL OF IMAGE FORMING APPARATUSES

[75] Inventors: Motoaki Tahara; Hiroyuki Takahashi, both of Kawasaki; Toshiyuki Kitamura, Yokohama; Michio Kawase, Kawasaki; Tatsuhito Kataoka, Tokyo; Masakazu Kitora, Yokohama, all of Japan

[73] Assignee: Canon Kabushiki Kaisha, Tokyo, Japan

[21] Appl. No.: 08/942,117

[22] Filed: Oct. 1, 1997

Related U.S. Application Data

[63] Continuation of application No. 08/300,489, Sep. 2, 1994, abandoned.

[30] Foreign Application Priority Data

| Sep. 3, 1993 | [JP] | Japan | 5-219728 |
| Sep. 21, 1993 | [JP] | Japan | 5-234698 |
| Oct. 22, 1993 | [JP] | Japan | 5-264856 |
| Dec. 28, 1993 | [JP] | Japan | 5-337377 |

[51] Int. Cl.[7] ............................. G03G 15/00; H04N 1/00
[52] U.S. Cl. .......................... 358/296; 358/401; 358/448; 399/2; 395/114
[58] Field of Search .................... 358/296, 401, 358/501, 407, 408, 448, 443, 444; 399/1, 2, 3; 395/114, 101

[56] References Cited

U.S. PATENT DOCUMENTS

| 4,497,037 | 1/1985 | Kato et al. | 355/202 |
| 4,527,885 | 7/1985 | Ayata et al. | 347/2 |
| 4,797,706 | 1/1989 | Sugishima et al. | 358/300 |
| 5,021,876 | 6/1991 | Kurita et al. | 358/75 |
| 5,073,868 | 12/1991 | Tada | 395/112 |
| 5,079,625 | 1/1992 | Kitamura et al. | 358/75 |
| 5,130,824 | 7/1992 | Miyakawa et al. | 358/486 |
| 5,165,072 | 11/1992 | Kurita et al. | 358/448 |
| 5,172,244 | 12/1992 | Nakahara et al. | 358/401 |
| 5,198,865 | 3/1993 | Haneda et al. | 355/326 R |
| 5,220,380 | 6/1993 | Hirata et al. | 355/204 |
| 5,339,168 | 8/1994 | Evanitsky et al. | 358/402 |
| 5,564,109 | 10/1996 | Snyder et al. | 355/202 |
| 5,619,649 | 4/1997 | Kovnat et al. | 395/101 |
| 5,631,724 | 5/1997 | Sawada et al. | 355/205 |
| 5,692,229 | 11/1997 | Ishimoto et al. | 399/2 |
| 5,790,119 | 8/1998 | Sklut et al. | 345/349 |

*Primary Examiner*—Peter S. Wong
*Assistant Examiner*—Derek J. Jardieu
*Attorney, Agent, or Firm*—Fitzpatrick, Cella, Harper & Scinto

[57] ABSTRACT

One of a plurality of image processing apparatus connected to an image processing system freely sets image forming conditions, such as recording paper size and enlargement/reduction magnification ratio, with regard to some or all of the other image processing apparatus, subsequently reads the image of an original by means of a reader, outputs image data indicative of the image read and transmits this image data to the other image processing apparatus. The image processing apparatus that has read the image of the original and the image processing apparatus that has received the image data output copies of the image of the original on the basis of the image forming conditions that have been set. Accordingly, it is possible to provide an image processing method and system in which a plurality of image processing apparatus are connected and identical images are outputted simultaneously from each of the apparatus connected.

15 Claims, 54 Drawing Sheets

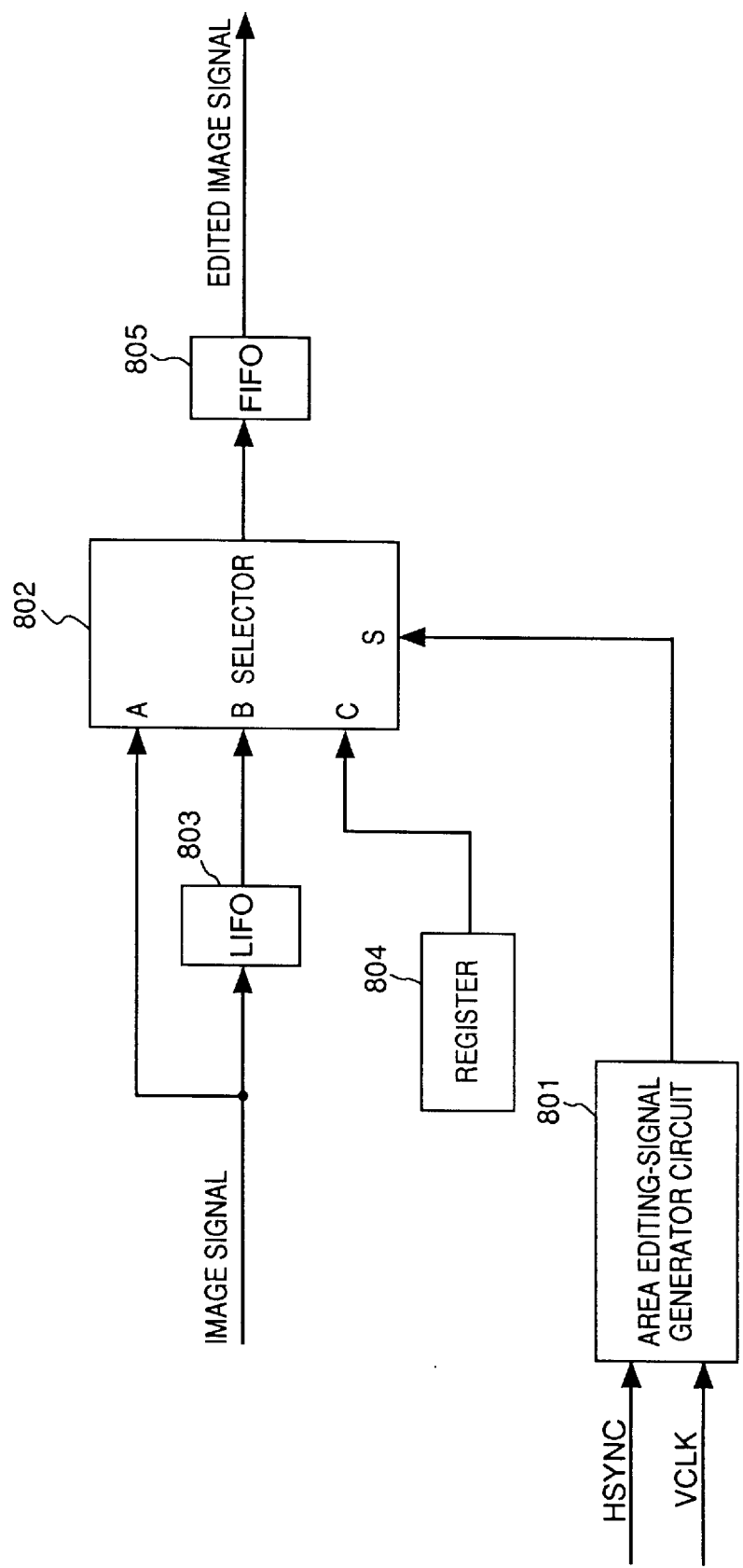

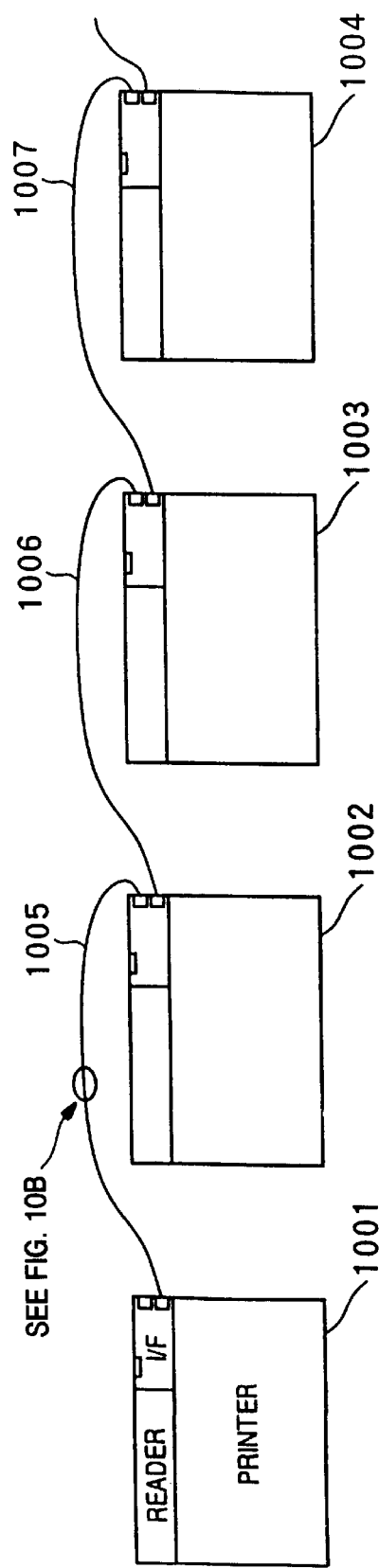
FIG. 10B
VIDEO CONTROL (VCLK, HSYNC, VE)
VIDEO (EIGHT LINES FOR EACH OF R, G, B)
COMMUNICATION LINES (ATN*, SID*, DACK*, OFFER*)
FIG. 10A

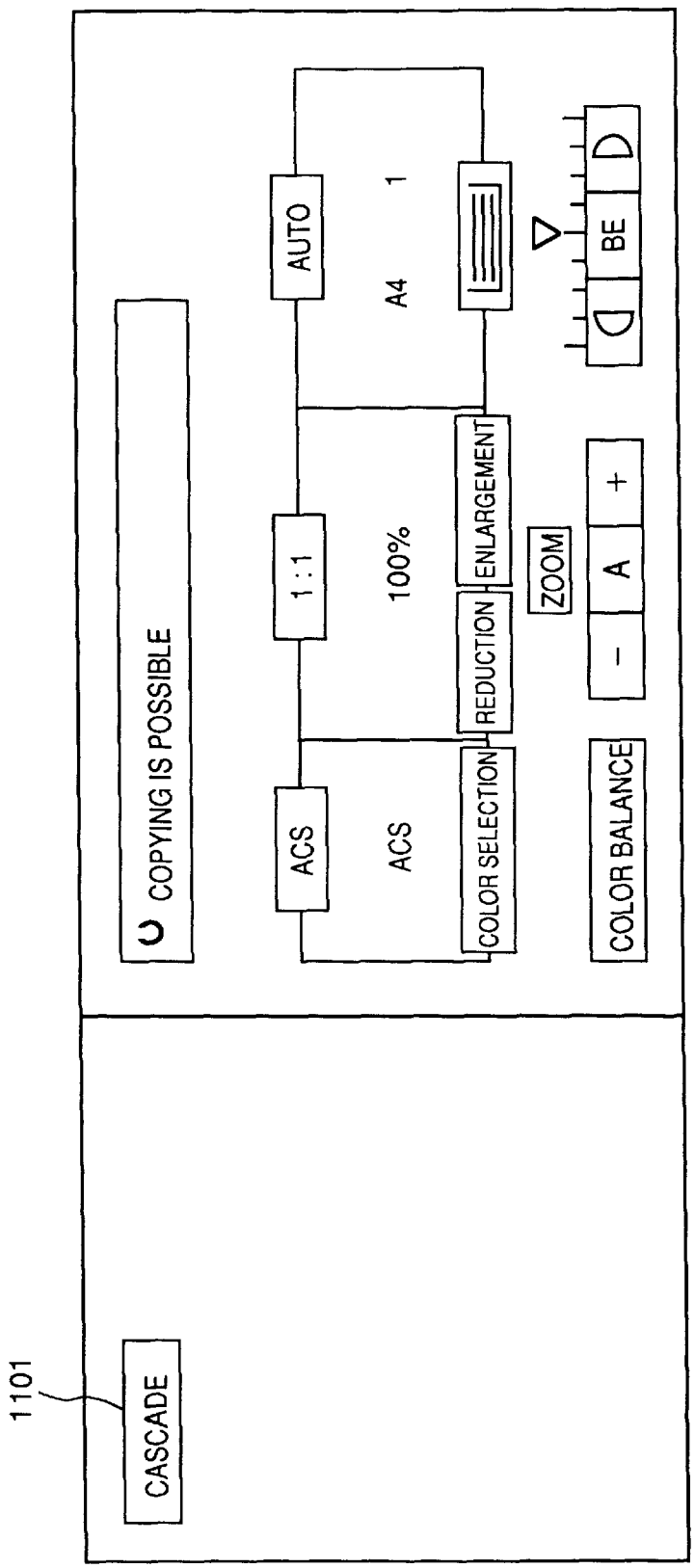

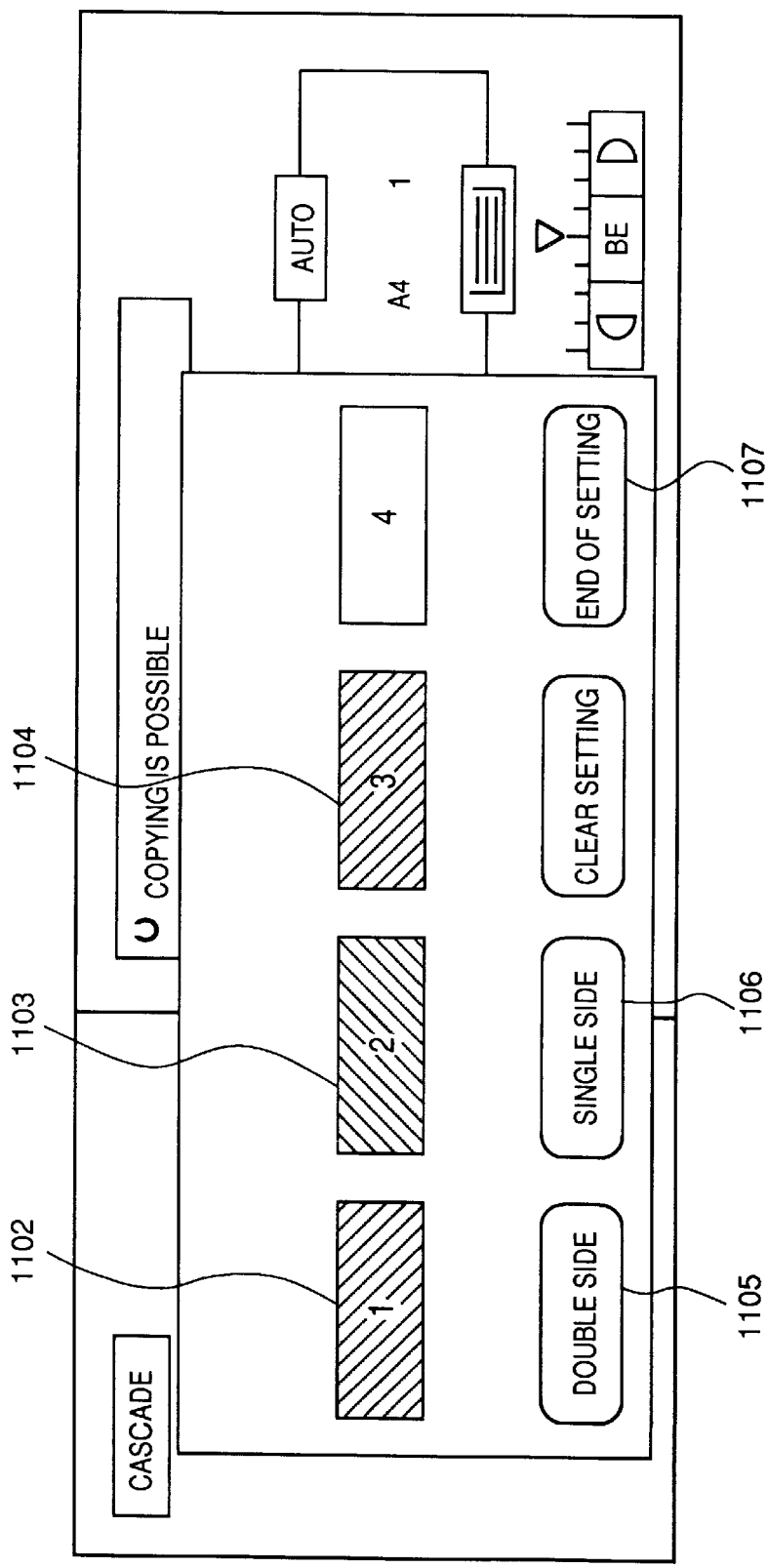

FIG. 20B

VIDEO CONTROL (VCLK, HSYNC, VE)

VIDEO (EIGHT LINES FOR EACH OF R, G, B)

COMMUNICATION LINES (ATN*, SID*, DACK*, OFFER*)

FIG. 20A

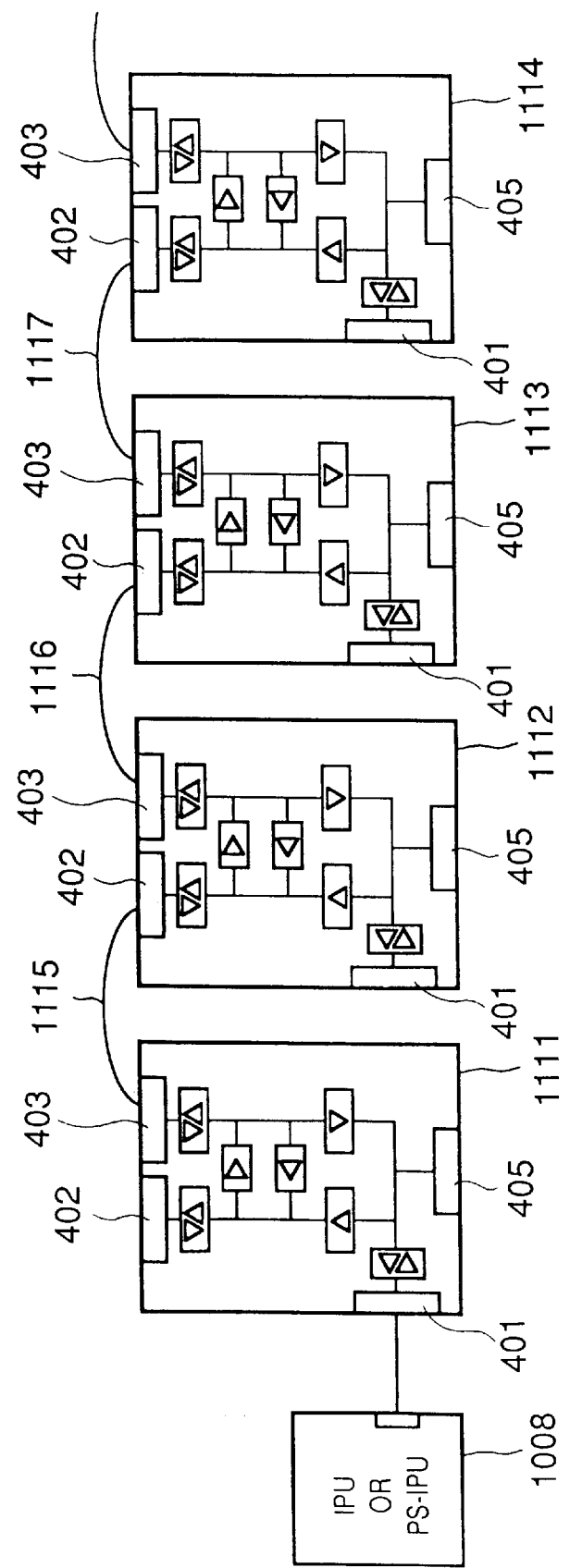

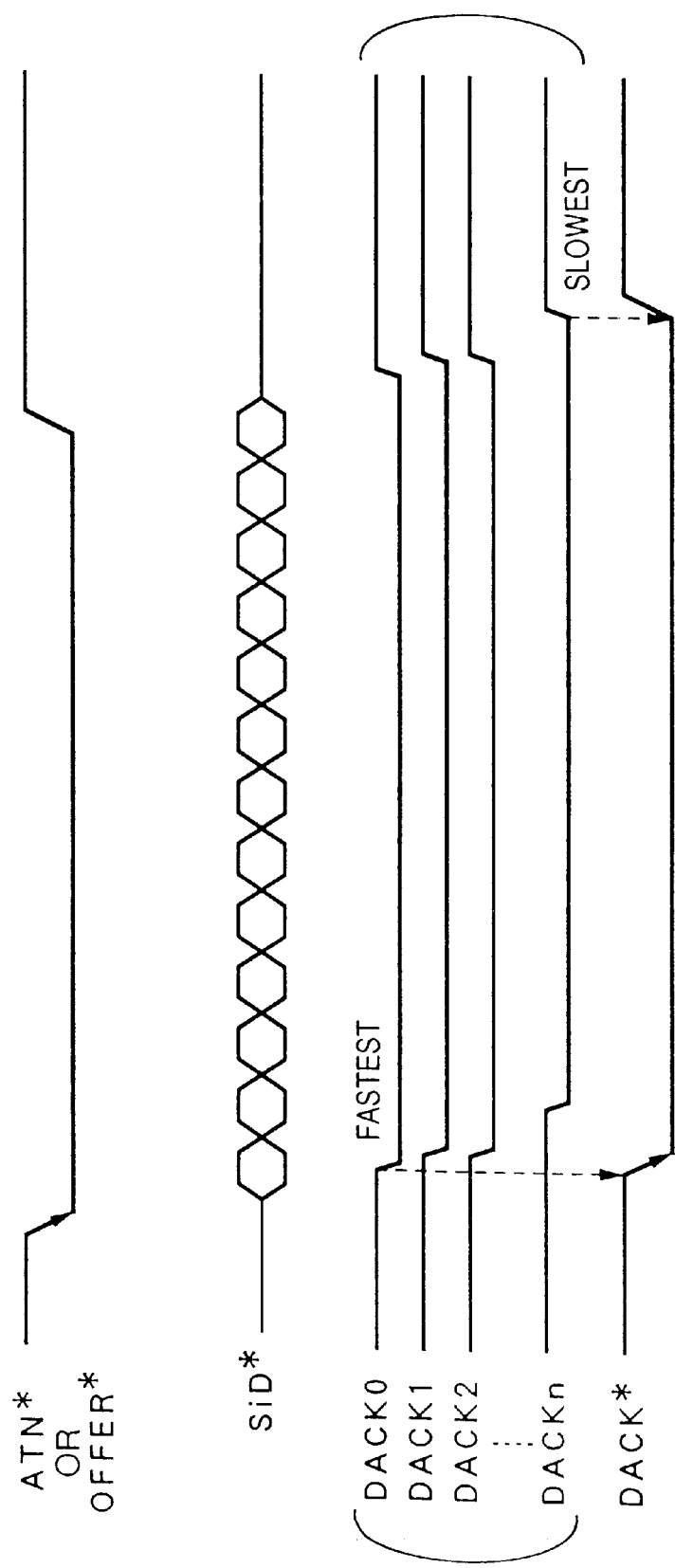

FIG. 24

| CODE | COMMAND | CONTENTS |
|---|---|---|
| 10 | INTERFACE CLEAR | ISSUED BY MASTER STATION AFTER IT HAS BEEN INITIALIZED |
| 01 | PRINT START | ISSUED BY SOURCE OF DATA TRANSFER. CONTAINS ADDRESS OF TRANSFER SOURCE, ADDRESS OF TRANSFER DESTINATION, PAPER SIZE, NUMBER OF SHEETS, ETC. |
| 03 | STATUS REQUEST | ISSUED BY MASTER AT FIXED INTERVALS. CONTAINS ADDRESS OF REQUEST DESTINATION |
| 05 | STATUS TRANSFER | ISSUED BY SLAVE WITHIN FIXED PERIOD OF TIME IN RESPONSE TO STATUS REQUEST FROM MASTER. CONTAINS OWN ADDRESS FOLLOWED BY PRINTER STATUS, ABSENCE OR PRESENCE OF ERROR, ETC. |
| 06 | END OF TRANSFER | ISSUED BY SOURCE OF DATA TRANSFER AFTER END OF TRANSFER |

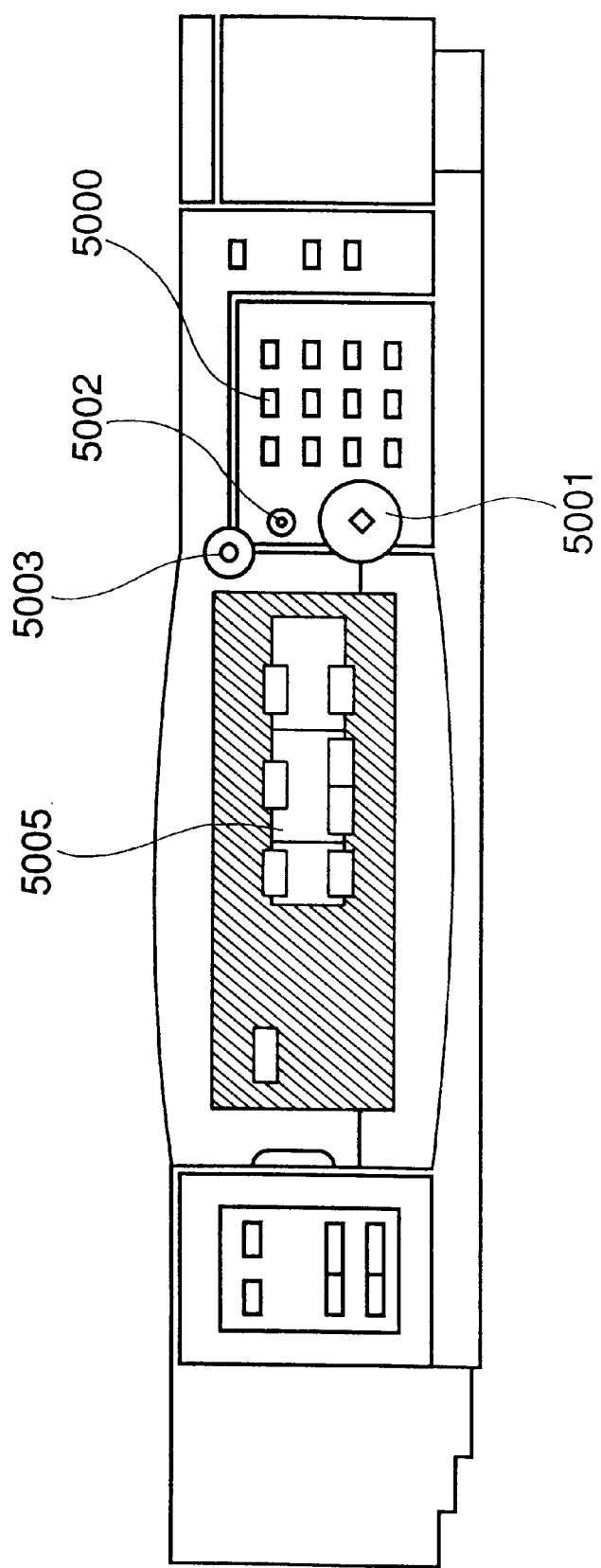

FIG. 28
STATION NUMBER
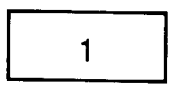 STATION WHICH CAN BE SET
 STATION WHICH ALREADY SET
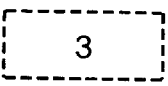 NOT CONNECTED
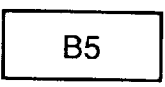 STATION WITHOUT PAPER (B5)
 STATION WITH ERROR, JAMMING OR DEPLETED TONER
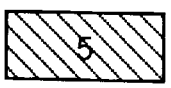 STATION CURRENTLY PERFORMING COPYING
 STATION WHICH CANNOT BE SET DURING JOB EXECUTION

FIG. 33

| CODE | COMMAND | CONTENTS |
|---|---|---|
| 10 | INTERFACE CLEAR | ISSUED BY MASTER STATION AFTER IT HAS BEEN INITIALIZED |
| 01 | PRINT START | ISSUED BY SOURCE OF DATA TRANSFER. CONTAINS ADDRESS OF TRANSFER SOURCE, ADDRESS OF TRANSFER DESTINATION, PAPER SIZE, NUMBER OF SHEETS, ETC. |
| 03 | STATUS REQUEST | ISSUED BY MASTER AT FIXED INTERVALS. CONTAINS ADDRESS OF REQUEST DESTINATION |
| 05 | STATUS TRANSFER | ISSUED BY SLAVE WITHIN FIXED PERIOD OF TIME IN RESPONSE TO STATUS REQUEST FROM MASTER. CONTAINS OWN ADDRESS FOLLOWED BY PRINTER STATUS, ABSENCE OR PRESENCE OF ERROR, ETC. |
| 06 | END OF TRANSFER | ISSUED BY SOURCE OF DATA TRANSFER AFTER END OF TRANSFER |
| 07 | DOUBLE-SIDE MODE SETTING | ISSUED BY MASTER AT TIME OF CASCADE MODE |

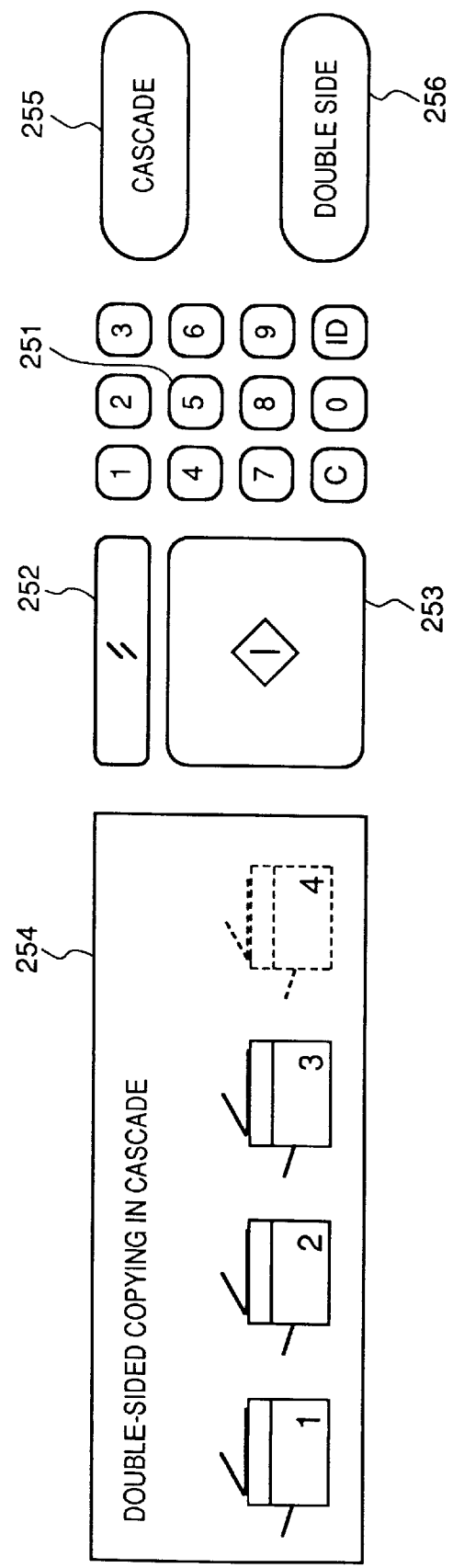

FIG. 42

| CODE | COMMAND | CONTENTS |
|---|---|---|
| 10 | INTERFACE CLEAR | ISSUED BY MASTER STATION AFTER IT HAS BEEN INITIALIZED |
| 01 | PRINT START | ISSUED BY SOURCE OF DATA TRANSFER. CONTAINS ADDRESS OF TRANSFER SOURCE, ADDRESS OF TRANSFER DESTINATION, PAPER SIZE, NUMBER OF SHEETS, ETC. |
| 03 | STATUS REQUEST | ISSUED BY MASTER AT FIXED INTERVALS. CONTAINS ADDRESS OF REQUEST DESTINATION |
| 05 | STATUS TRANSFER | ISSUED BY SLAVE WITHIN FIXED PERIOD OF TIME IN RESPONSE TO STATUS REQUEST FROM MASTER. CONTAINS OWN ADDRESS FOLLOWED BY PRINTER STATUS, ABSENCE OR PRESENCE OF ERROR, ETC. |
| 06 | END OF TRANSFER | ISSUED BY SOURCE OF DATA TRANSFER AFTER END OF TRANSFER |
| 08 | PAPER / MAGNIFICATION SETTING | ISSUED BY MASTER WHEN CASCADE MODE IS IN EFFECT. CONTAINS MAGNIFICATION, PAPER SELECTION AND SET MODE, ETC. |

IMAGE PROCESSING SYSTEM WITH INDEPENDENT CONTROL OF IMAGE FORMING APPARATUSES

This application is a continuation of application Ser. No. 08/300,489 filed Sep. 2, 1994 now abandoned.

BACKGROUND OF THE INVENTION

This invention relates to an image processing method and apparatus. By way of example, the invention relates to an image processing system in which a plurality of image processing apparatus are interconnected and output the same image simultaneously, or in which identical images are outputted simultaneously in individual groups obtained by organizing the connected plurality of image processing apparatus.

An image processing apparatus presently available has a function which allows the apparatus to print images on both sides of recording paper. With this type of apparatus, different images can be formed on the front and reverse sides of a single sheet of recording paper. An apparatus having such a double-sided printing function is capable of operating only individually, and at present there is no system available in which images can be formed on both sides of recording paper in a arrangement in which a plurality of such apparatus are interconnected.

An image processing system (hereinafter referred to as a "cascade system") has been proposed in which images are outputted in large quantity at high speed. This is obtained by constructing an image processing system in which an image processing apparatus of the kind described above is provided with an image memory and a function for communicating with external devices, with a plurality of these apparatus being connected in parallel. In a case where a copying operation is performed by a copier, the user performs an operation to set whether copying is to be performed on one side or both sides and an operation to set the image enlargement/reduction magnification ratio. The same holds in a cascade system as well, in which the operator must make the single-side/double-side copy setting and the enlargement/reduction magnification ratio setting for each apparatus of the system at each and every apparatus. As a result, operation is troublesome and the settings involve a great amount of labor.

Further, the reader and the printer which constitute a digital copier are capable of being utilized independently as an image reading device and an image output device, respectively. Accordingly, a system has been proposed in which, by way of example, a digital copier is connected to a general computer system using an external I/F so that the reader and printer can be utilized as the image input and output unit of the computer system. In another proposed system, a plurality of readers and printers are divided up and connected, central control means is provided for controlling the readers and printers and a plurality of printers are used simultaneously to assure a high CV. In a system of this kind, the number of sets of readers and printers that can be connected must be decided when the construction of the central control means is taken into consideration. This imposes a limitation in terms of the capability to expand the system flexibly as needed.

SUMMARY OF THE INVENTION

An object of the present invention is to provide an image processing method and apparatus in which a plurality of image processing apparatus are connected and capable of outputting the same image simultaneously.

According to the present invention, the foregoing object is attained by providing an image processing system to which a plurality of image processing apparatus are connected, each image processing apparatus having reading means for reading an image of an original and outputting image data indicative of the read image, communicating means for transmitting the image data outputted by said reading means to other image processing apparatus and receiving image data from said other image processing apparatus, and forming means for forming an image based upon the image data outputted by said reading means or upon the image data received by said communicating means, one of said image processing apparatus freely setting image forming conditions regarding some or all of said other image processing apparatus and transmitting image data of an original read by its own reading means to said other image processing apparatus, where the image is formed based upon the set image forming conditions.

Another object of the present invention is to provide an image processing system having reading means for reading an image processing method and apparatus in which the aforementioned cascade system is equipped with a plurality of modes in which different methods are used to set conditions for deciding an output image and recording medium for the purpose of outputting the same image from a plurality of image processing apparatus, such as a mode in which enlargement/reduction magnification ratio and recording-paper selecting conditions are set en masse at any iimage processing apparatus, and a mode in which the enlargement/reduction magnification ratio and recording-paper selecting conditioins ar set independently for each apparatus.

According to the present invention, the foregoing object is attained by providing an image processing system having reading means for reading an image of an original and outputting image data indicative of the read image, communicating means for transmitting the image data outputted by said reading means to other image processing apparatus and receiving image data from said other image processing apparatus, and forming means for forming an image on one side or both sides of a recording medium based upon the image data outputted by said reading means or upon the image data received by said communicating means, the other image processing apparatus forming images in accordance with image forming conditions set by one of said plurality of image processing apparatus.

The foregoing object is attained also by providing an image processing system having reading means for reading an image of an original and outputting image data indicative of the read image, communicating means for transmitting the image data outputted by said reading means to other image processing apparatus and receiving image data from said other image processing apparatus, and forming means for forming an image on one side or both sides of a recording medium based upon the image data outputted by said reading means or upon the image data received by said communicating means, said system having a plurality of modes for setting, through different methods, image forming conditions for carrying out image formation based upon identical image data in each of said plurality of image processing apparatus.

Another object of the present invention is to provide an image processing method and apparatus in which a plurality of image processing apparatus in the aforementioned cascade system are organized into any number of groups and images are formed on a group-by-group basis.

According to the present invention, the foregoing object is attained by providing an image processing system to which a plurality of image processing apparatus are connected for forming images, comprising: organizing means for organizing one group or a plurality of groups into which any number of the image processing apparatus have been grouped, and group-image forming means for forming images in group units.

The foregoing object is attained also by providing an image processing apparatus used in an image processing system to which a plurality of image processing apparatus are connected for forming images, comprising reading means for reading an image of an original and outputting an image signal indicative of the read image, revising means for revising the image signal outputted by the reading means, forming means for forming an image on a recording medium based upon the image signal revised by the revising means, interface means for performing an exchange of signals with an external device, and setting means for setting group operation of other image processing apparatus connected to the system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a block diagram showing the construction of a processing circuit for image editing;

FIG. 10 is a diagram showing the form of a cascade system in which a plurality of image processing apparatus of this embodiment are connected;

FIG. 11 is a diagram showing the general features of a control panel on the image processing apparatus of this embodiment;

FIG. 12 is a diagram showing a printing-mode setting window displayed on the display panel depicted in FIG. 11;

FIG. 20 is a diagram showing an example of a cascade system in this embodiment;

FIG. 21 is a diagram showing the manner in which image signals are connected in the cascade system depicted in FIG. 20;

FIG. 23 is a timing chart of each signal shown in FIG. 22;

FIG. 24 is a diagram showing the principal commands used in serial communication according to this embodiment;

FIG. 25 is a diagram showing the construction of the control panel depicted in FIG. 16;

FIG. 28 is a diagram showing a general example of touch-key display states depicted in FIG. 27;

FIG. 33 is a diagram showing the principal commands used in serial communication in the cascade system according to this embodiment;

FIGS. 40 and 41 are examples of displays on a master-station display unit in a second modification;

FIG. 42 is a diagram showing the principal commands used in serial communication in the cascade system according to a fourth embodiment;

DESCRIPTION OF THE PREFERRED EMBODIMENTS

An image processing apparatus and an image processing system according to embodiments of the present invention will now be described in detail with reference to the accompanying drawings.

A digital color copier is described below as an example of the image processing apparatus. However, it goes without saying that the invention is not limited to a digital color copier. For example, the invention can be realized also by combining an image forming device such as a printer and an image reading device such as a reader.

First Embodiment

Description of image forming process

Figure 1:
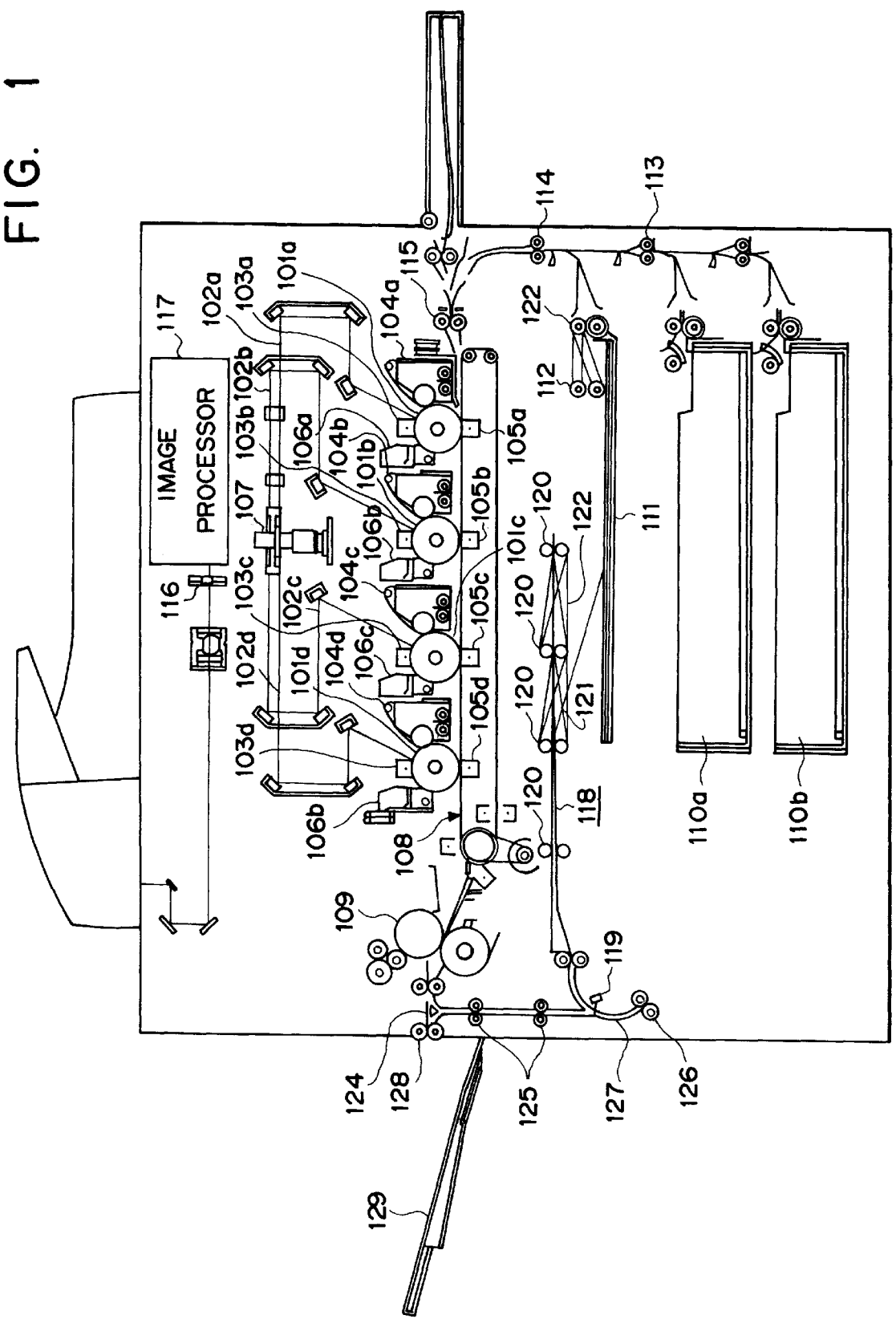
FIG. 1 is an overall view of an image processing apparatus according to an embodiment of the present invention.

FIG. 1 is an overall view of an image processing apparatus according to a first embodiment of the present invention.

The image processing apparatus according to this embodiment, which is capable of forming a full-color image using toners of the four colors magenta, cyan, yellow and black, has four image forming stations provided independently for respective ones of the four colors. The stations have respective photosensitive drums 101a~101d serving as image carriers, and the surfaces of the photosensitive drums are charged uniformly by primary high-voltage corona discharge devices and grid high-voltage devices 103a~103d.

After the charging operation, electrostatic latent-images of the images corresponding to the respective colors are formed on the photosensitive drums 101a~101d by laser beams 102a~102d based upon each item of image information obtained by laser-beam scanning using a laser optical system 107. The latent images formed are developed by developing units 104a~104d having the magenta, cyan, yellow and block toners, respectively. The developed toner images are transferred to recording paper conveyed in by a transfer belt 108 serving an means for conveying an original. The residual toner on the photosensitive drums is then cleaned off by cleaning devices 106a~106d, respectively.

Description of double-sided image formation sequence

A double-sided image formation process according to this embodiment constructed as set forth above will now be describe for a case in which recording paper is supplied by an upper cassette 110a. However, the sequence is substantially the same in a case where the recording paper is supplied from a lower cassette 110b.

A first paper-supply roller solenoid (not shown) is driven into operation at the same time that an image-forming start signal is turned on, thereby starting the supply of recording paper stored in the cassette 110a. The recording paper supplied from the cassette 110a is conveyed by conveying rollers 113, 114 until the leading edge of the paper arrives at a position at which it abuts against first resistance rollers 115. The recording paper is stopped temporarily once it has been formed into a prescribed loop.

Meanwhile, the image of the original placed upon a platen is read by a CCD 116 at the same time that the image-forming start signal is turned on. This image signal is sent to an image processor 117 having an internal image memory in which the image data is stored. The drive of the first resistance rollers 115 starts after a state is attained in which laser scanning for forming an image in an image forming section becomes possible. As a result of driving the rollers 115, the recording paper is conveyed upon being attracted to the transfer belt 108 at a prescribed position in order for an image to be formed on the paper.

As set forth above in the image forming process, the toner image of the respective colors are transferred to the recording paper one after another. At such time the image information indicative of the original stored in the image memory is written on the respective photosensitive drums by the laser optical system 107 in such a manner that the information will be transferred to the recording paper in superimposed form at the timing at which the recording paper passes through each of the stations for magenta, cyan, yellow and black.

Thus, the images in the respective colors are transferred to the recording paper in superimposed form by passing the paper through the four stations in successive fashion. The recording paper is then sent to a fixing unit 109, where the toner images are fixed.

When copying is performed on the front side of the recording paper, a solenoid (not shown) for releasing a paper-resupply roller 112 is driven into operation at the same time the image-forming start signal is turned on. This raises the paper-resupply roller 112 to prepare for formation of images on both sides of the recording paper. Further, a solenoid (not shown) for a conveyance-path changing plate 124 is driven into operation to actuate the plate 124, thereby forming a paper conveying path 118 for double-sided image formation. At the same time, a solenoid (not shown) for a paper stopper plate (not shown) located in an intermediate tray 111 is driven into operation to actuate the stopper plate inside in the intermediate tray 111. At the same time, a solenoid (not shown) for driving a second conveyance section is driven into operation to start the rotation of conveying rollers 125 in the second conveyance section.

The recording paper is then sent to the fixing unit 109 so that the image formed on its front side is fixed, after which the recording paper is sent to the conveyance rollers 125 of the second conveyance section by the conveyance-path changing plate 124. When the recording paper passes by a paper-reversal sensor 119 provided on a switch-back (paper-reversal) portion 127, reversing rollers 126 rotate, whereby the recording paper is switched back so as to be fed to conveying rollers 120 of the second conveyance section. Numerals 121, 122 denote conveyance-path changing plates for recording paper of different sizes. A solenoid (not shown) is driven in dependence upon the size of the recording paper, thereby changing the conveyance path to the intermediate tray 111.

When the first sheet of recording paper has been conveyed to the intermediate tray 111, drive of the solenoid for releasing the paper-resupply roller is suspended temporarily so that the rotating paper-resupply roller 112 is lowered down to the recording paper to make the conveyed recording paper abut against the paper stopper plate. By virtue of this series of operations, sheets of recording paper on the front-sides of which images have been formed are stacked successively in the intermediate tray 111 to prepare for image formation on the reverse sides. In this state the paper-resupply roller 112 is lowered onto the recording paper stacked in the intermediate tray 111.

When a reverse-side image forming signal is turned on under these conditions, an operation for forming an image on the reverse side starts. First, the solenoid of the second conveyance section is driven into operation and the paper-resupply roller 112 is rotated so that one sheet of recording paper from the top of the stack in the intermediate tray 111 is again supplied to the image forming section. When the supply of the first sheet of recording paper begins, namely when conveyance by the conveying rollers 122 starts, the paper-resupply roller 112 is raised. When the supply of the first sheet of recording paper ends, the rotting paper-resupply roller 112 is lowered at a prescribed timing to supply the next sheet (second sheet) of recording paper. In other words, owing to this repetitive up-and-down motion of the paper-resupply roller 112, the recording paper stacked in the intermediate tray 111 is supplied to the image forming section one sheet at a time.

Recording paper thus resupplied is conveyed by the paper conveying rollers 114. When the leading edge arrives at the first resistance rollers 115, as mentioned above, a prescribed loop is formed and conveyance is stopped temporarily. Thereafter, just as in image formation on the front side, the recording paper is affixed to and conveyed by the transfer belt 108 at a prescribed timing so as to pass through the first through fourth stations, whereby an image is formed on the reverse side of the recording paper. The paper is then sent to the fixing unit 109 to fix the image on the reverse side.

When the formation of the image on the reverse side starts, the drive of the solenoid for the conveyance-path changing plate is suspended. As a result, the sheets of recording paper having images formed on and fixed to the reverse side thereof are led to paper-discharge rollers 128 so that the sheets are discharged into a paper-discharge tray 129. When the final sheet of recording paper has been discharged, the series of operations is terminated.

Description of image processing unit

Figure 2:
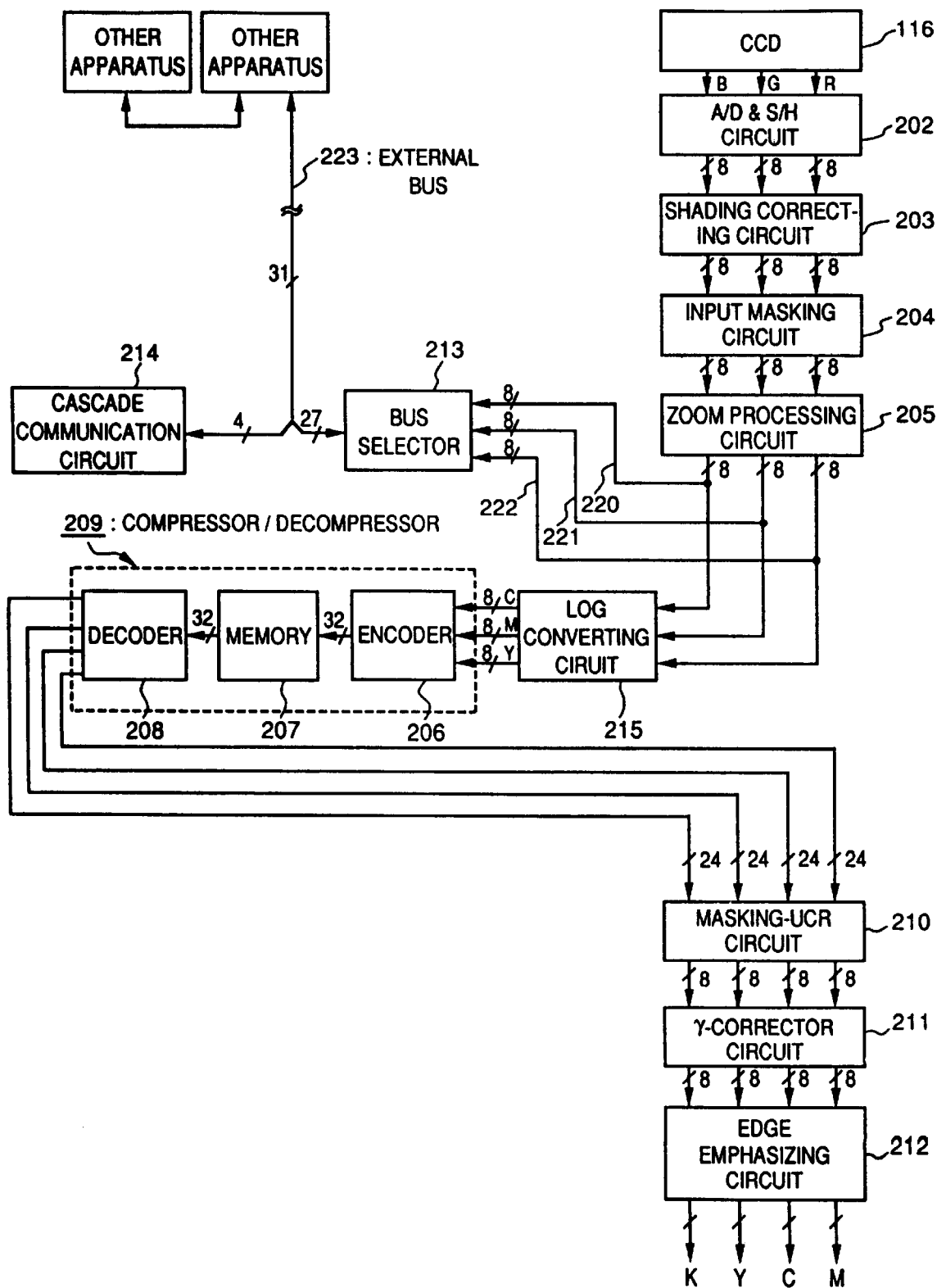
FIG. 2 is a block diagram showing the construction of an image processing section illustrated in FIG. 1.

FIG. 2 is a block diagram showing the construction of the image processor 117. FIG. 2 illustrates image signal flow in which image information read by the CCD 116 is processed as an electric signal and outputted as a print signal.

In FIG. 2, the image signal outputted by the CCD 116 is sampled and held and A/D-converted by an A/D & S/H circuit 202 to obtain digital image signals of eight bits for each of three color signals, namely R, G, B signals. The color-separated image signals are subjected to shading and black correction by a shading correction circuit 203, after which the resulting data is converted to an NTSC signal by an input masking circuit 204. The output of the circuit 204 is enlarged or reduced to a prescribed size as necessary by a zoom processing circuit 205 whose outputs are image signals 220, 221, 222.

Thereafter, the signals 220, 221, 222 enter a LOG converting circuit 215, at which a conversion is made from RGB luminance signals to MCY density signals. These signals are sent to a compression/decompression unit 209. The latter compresses the input image data by an encoder 206 and stores the compressed image data in a memory 207. The compressed image data stored in the memory 207 is read out by a decoder 208 and decompressed.

The image signal outputted by the compression/decompression unit 206 is subjected to undercolor removal and masking processing by a masking-UCR circuit 210 to obtain M, C, Y, K image signals of eight bits each. These signals are gamma-corrected by a gamma-corrector circuit 211 and then subjected to edge emphasis by an edge emphasizing circuit 212, after-which the resulting signals are sent to the image forming section.

In addition to the above-described image processing function, this embodiment of the invention has a function for input and output of signals with respect to other apparatus in order to realize a cascade function for interconnecting a plurality of image processing apparatus.

More specifically, in a case where image signals are outputted to an external unit, the eight-bit image signals 220~222 that have been subjected to zoom processing are outputted to an external bus 223 via a bus selector 213. The image signals outputted to the external bus 223 are sent to another apparatus connected to the same bus. The external bus 223 is composed of a total of 31 lines, namely four communication lines described later and 27 signal lines which include 24 image signal lines for respective ones of 24 bits and three control lines for controlling the image signals.

When a signal sent from an external apparatus via the external bus 223 is received, the 27-bit image signal and the control signals are accepted by the bus selector 213. Since the bus selector 213 sends image signals received from the external bus 223 to the LOG conversion circuit 215, MCY images signals obtained by a luminance-to-density conversion are compressed and stored by the compression/decompression unit 209 just as in the case described above.

Numeral 214 denotes a cascade communication circuit for communication with external apparatus. This circuit performs communication with an external apparatus using the four communication control lines, namely the lines other than the aforementioned 27 signal lines related to the image signals, achieves synchronization in various sequences and performs an exchange of information.

Figure 3:
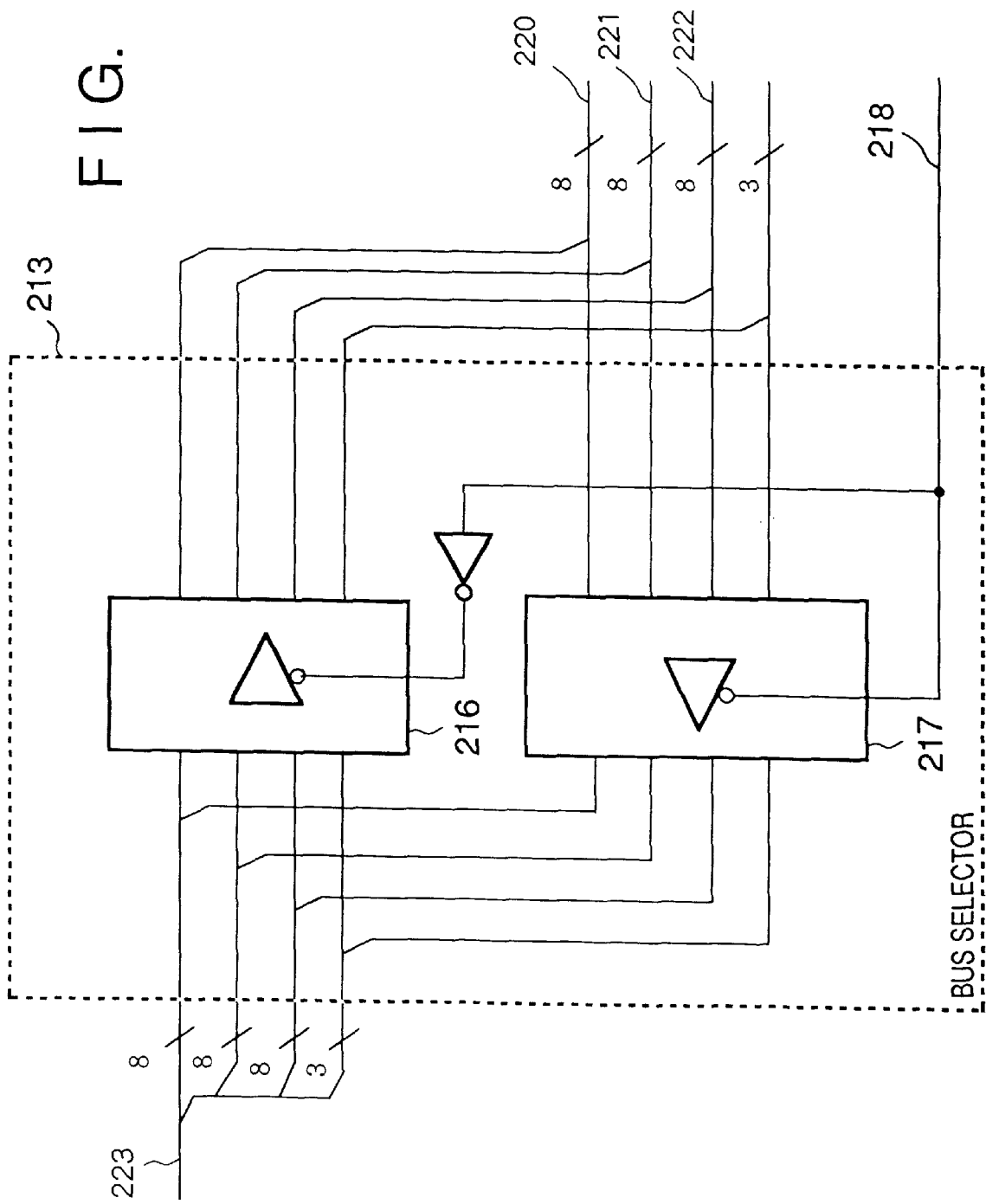
FIG. 3 is a block diagram showing the construction of a bus selector depicted in FIG. 2.

FIG. 3 is a block diagram illustrating the construction of the bus selector 213 in detail. The bus selector is constituted by one set of tri-state gates 216, 217. When a signal line 218 controlled by a CPU (not shown) is at the LOW level, signals flow from the external bus 223 into the exterior (to the signal lines 220~222). When the signal line 218 is at the HIGH level, signals flow from the interior to the exterior.

Figure 4:
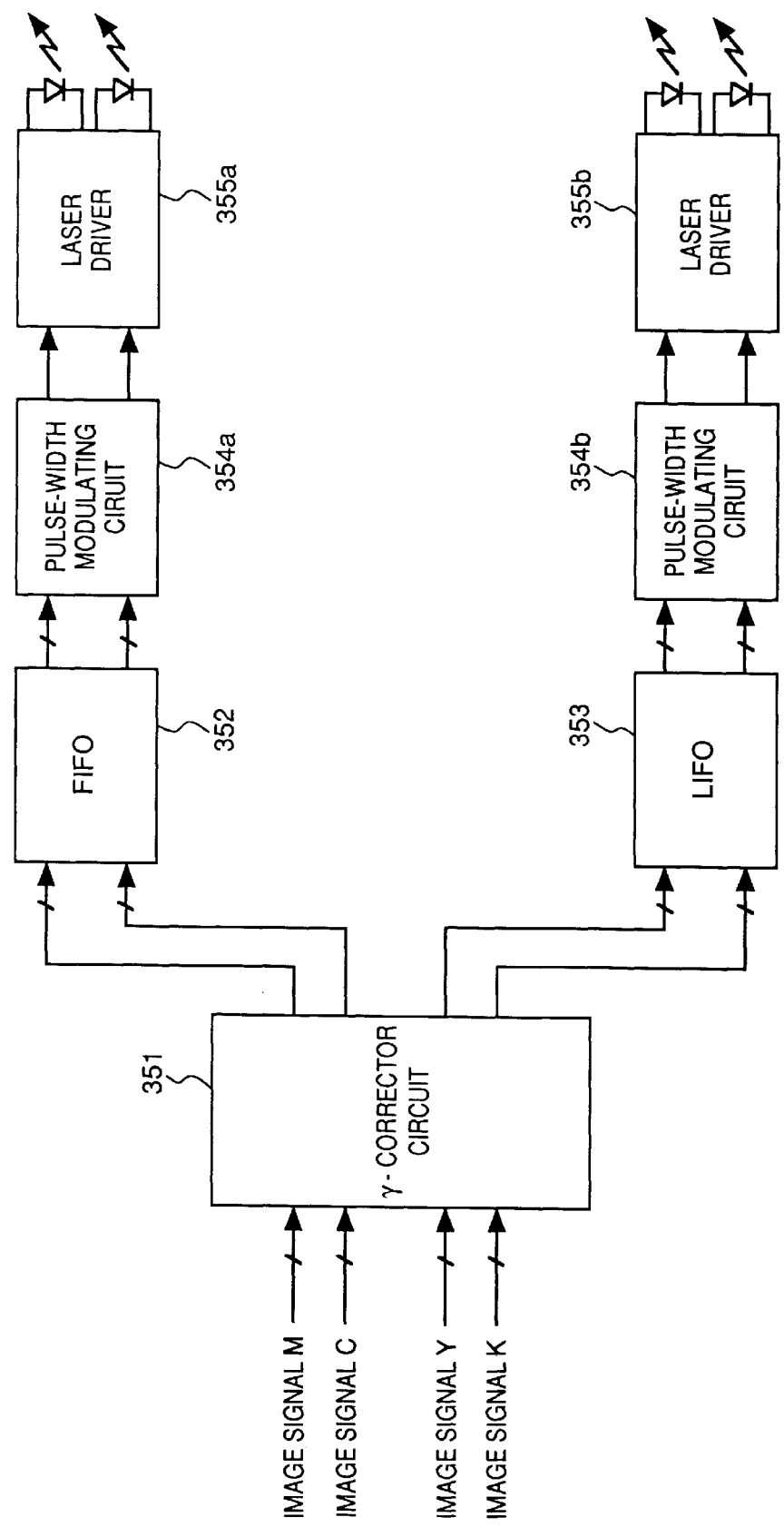
FIG. 4 is a block diagram showing the details of image signal processing in an image forming section.

FIG. 4 is a block diagram showing the details of image signal processing in the image forming section.

The MCYK image signals sent from the edge emphasizing circuit 212 shown in FIG. 2 enter a g-correcting circuit 351, where the signals are subjected to a g correction conforming to the sensitivity of each photoreceptor. Thereafter, the M and C image data is outputted as is in the order of the main-scan data by a FIFO 352, the outputted data is converted to pulse-width signals conforming to gray-level data by a pulse-width converting circuit 354a and laser beams conforming to these pulse widths are emitted by a laser driver 355a. In this embodiment, the Y, K laser beams and the M, C laser beams are scanned alternately in a mirror-image relationship. In order to achieve this, the Y and K image data is applied to a LIFO 353, where the order of the main-scan data is reversed. The data outputted by the LIFO 353 is converted to pulse-width signals conforming to gray-level data by a pulse-width converting circuit 354b and laser beams conforming to these pulse widths are emitted by a laser driver 355b.

Description of image synchronizing control

Figure 5:
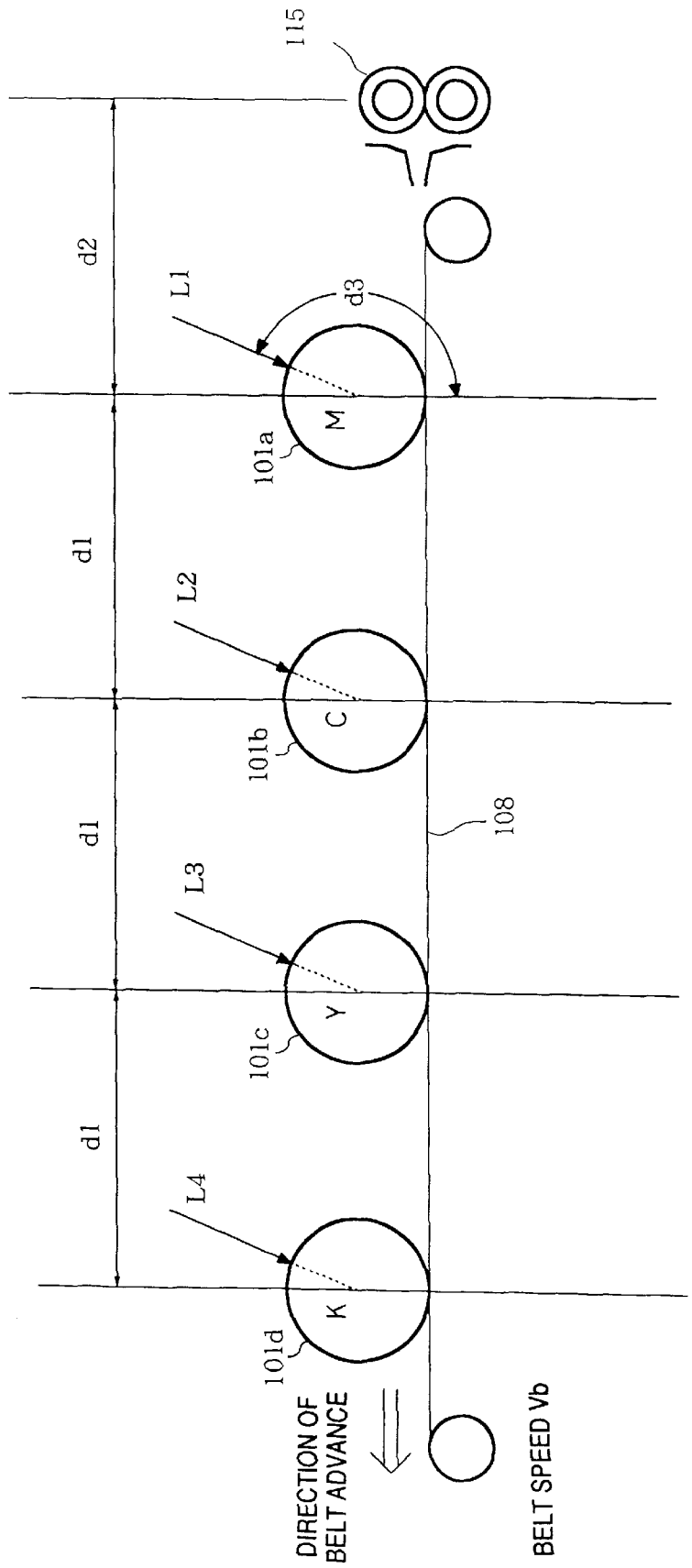
FIG. 5 is a diagram showing the positional relationship of photosensitive drums.

FIG. 5 is a diagram illustrating the positional relationship of the photosensitive drums 101a~101d. The photosensitive drums are arranged at an equal spacing of distance d1, and the transfer belt 108 conveys the recording paper at a speed of Vb. Further, The distance from the exposure position of each of laser beams L1~L4 (102a~102d in FIG. 1) to the position at which each photosensitive drum contacts the transfer belt 108 is d3. The distance from the center point of the resistance rollers 115 to the center of the photosensitive drum 101a is d2.

Figure 6:
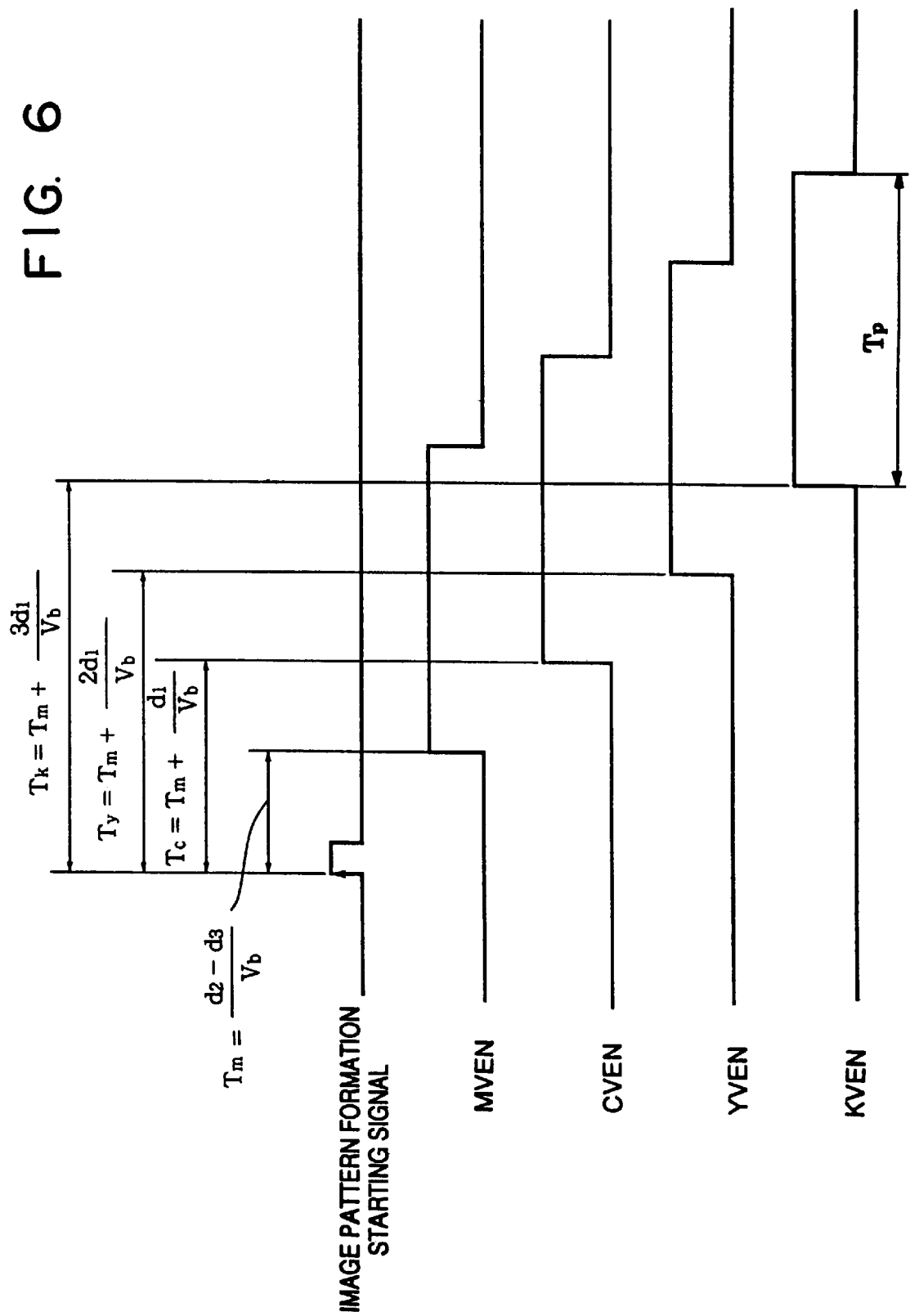
FIG. 6 is a timing chart showing latent-image write timing.

It is necessary that a latent image be formed on each photosensitive drum and developed in such a manner that the image information of the original stored in the memory 207 will be transferred to the recording paper in superimposed form at the timing at which the recording paper passes through each of the stations for the colors M, C, Y and K. FIG. 6 is a timing chart showing the timing for writing the latent images. In order for recording paper which has been stopped at the resistance rollers 115 to be sent to the transfer belt 108, a signal for starting the formation of an image pattern is turned on at the same time that the resistance rollers 115 are started. In addition, enable signals (MVEN, CVEN, YVEN, KVEN) for the respective colors must rise at the respective timings Tm, Tc, Ty, Tk, obtained by the following equations, with the leading edges of the above-mentioned image-pattern forming signal serving as a reference, and the enable signals must decay upon elapse of a time Tp conforming to the length of the recording paper in the sub-scan direction:

$Tm=(d2-d3)/Vb$ $Tc=Tm+d1/Vb$ $Ty=Tc+d1/Vb$ $Tk=Ty+d1/Vb$

Figure 7:
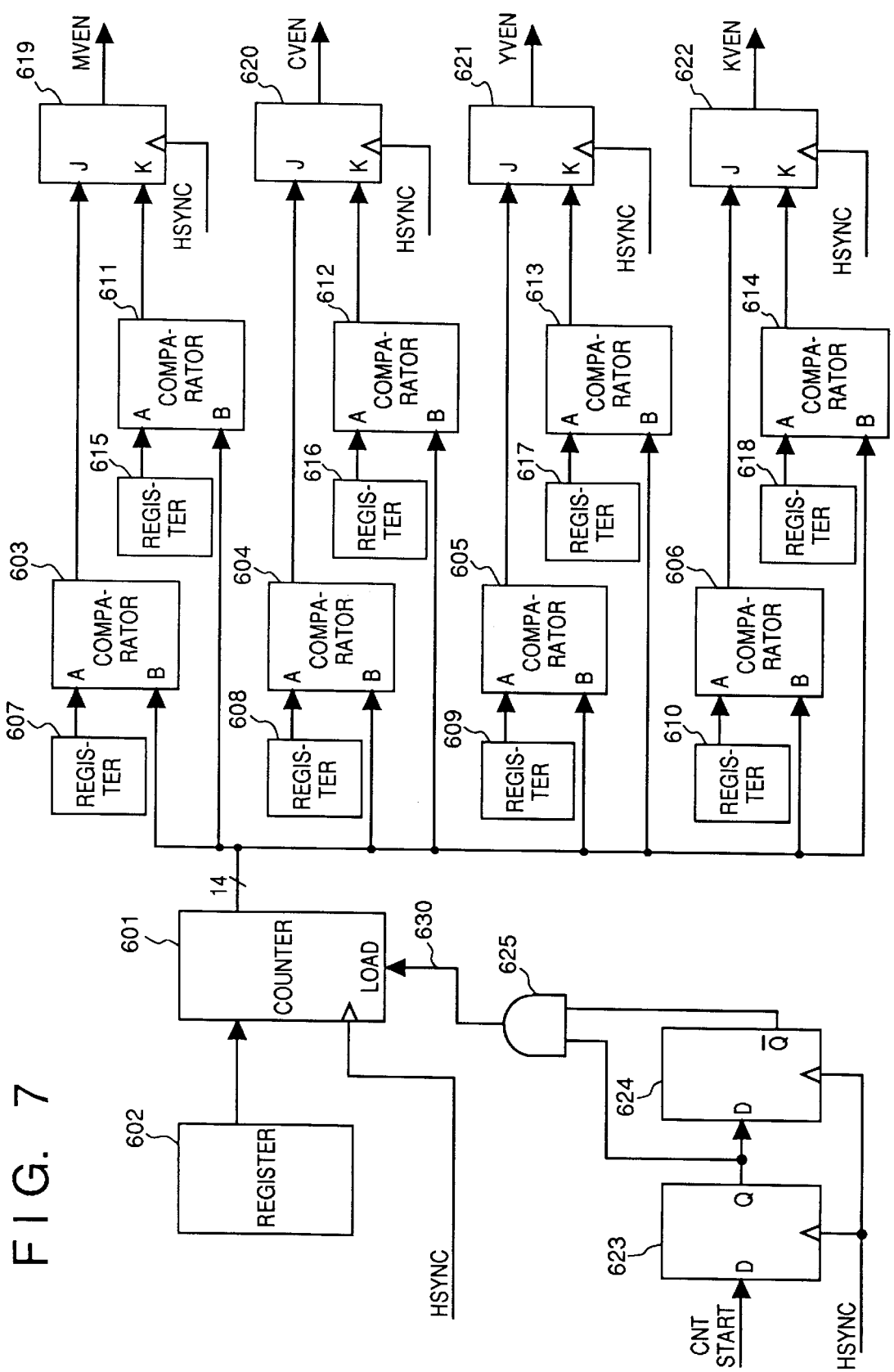
FIG. 7 is a block diagram showing the construction of a circuit for generating enable signals of respective colors.

FIG. 7 is a block diagram illustrating the construction of a circuit for generating the enable signal of each color. Counting of time is performed utilizing a main-scan synchronizing signal HSYNC generated each time a laser beam is scanned one line.

As shown in FIG. 7, a 14-bit counter 601 counts HSYNC, and a register 602 stores a value loaded in the counter 601 when a LOAD signal 630 is generated. It should be noted that the value stored by the register 602 is set by a CPU (not shown). Ordinarily, "0" is set in advance. Numerals 603~606 denote comparators and numerals 607~610 represent registers. Counts of HSYNC corresponding to Tm, Tc, Ty, Tk are set in the registers 607~610, respectively, by a CPU (not shown). The comparators 603~606 compare the set value A with the count output B of the counter 601 and output "1" when AiB is attained, namely at the leading edge of the image enable signal of each color.

Similarly, numerals 611~614 denote comparators and numerals 615~618 denote registers. Counts of HSYNC corresponding to Tm+Tp, Tc+Tp, Ty+Tp, Tbk+Tp are set in the registers 615~618, respectively, by a CPU (not shown). The comparators 611~614 compare the set value A with the count output B of the counter 601 and output "1" when AiB is attained, namely at the trailing edge of the image enable signal of each color. Here Tp is represented by L/Vb where the length of the recording paper is represented by L.

The above-mentioned signal for starting the formation of the image pattern enters as a signal CNT START in FIG. 7. The LOAD signal 630 is generated at the leading edge of the signal CNT START by a latch, which is composed of two D-type flip-flops 623, 624, and an AND gate 625. When the signal 630 enters the LOAD terminal of the counter 601, the counter 601 is cleared to the initial value and begins the counting operation.

The counter 601 counts HYSNC and sends its output to logical "1" when the count attains a value for raising the magenta enable signal. The "1" signal enters the J terminal of a JK-type flip-flop 619 so that the magenta sub-scan enable signal MVEN rises in synchronism with the signal HYSNC. As counting proceeds and the count attains a value for lowering the signal MVEN, the output of the comparator 611 goes to logical "1" and this signal enters the K terminal of the JK-type flip-flop 619 so that the signal MVEN decays in synchronism with the signal HYSNC. Though the details are omitted, a similar operation is performed with regard to the colors cyan, yellow and black so that the sub-scan enable signals CVEN, YVEN, KVEN are generated by the JK-type flip-flops 620~622.

Description of image-area editing control

Figure 14:
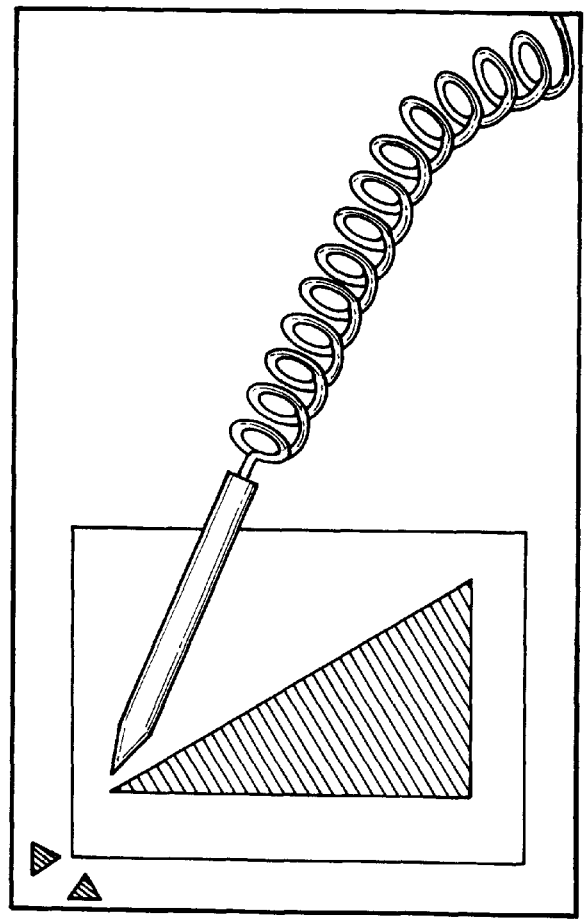
FIG. 14 is a diagram showing a method of designating an editing area.

In order to perform image area processing in this embodiment, it is possible to designate an area in the manner shown in FIG. 14 and to assign different functions to different areas.

Figure 8:
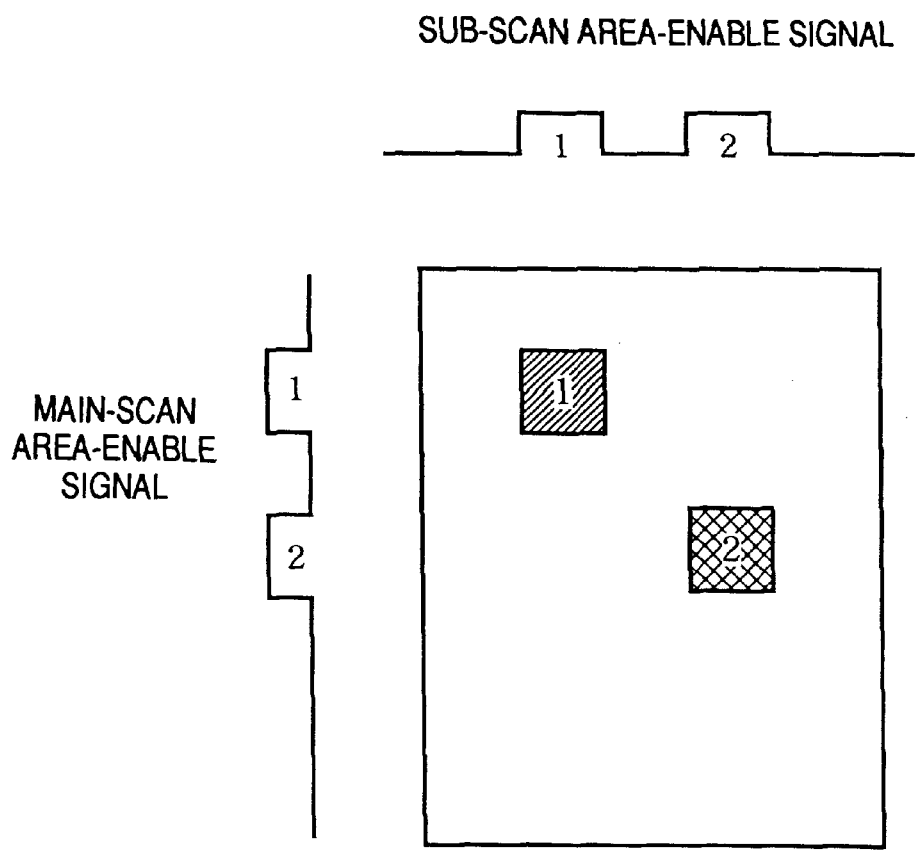
FIG. 8 is a diagram showing the timings at which image-area enable signals are generated as well as the functions of the respective areas.

FIG. 8 is a diagram showing the timings at which image-area enable signals are generated, as well as the function of each area. FIG. 8 illustrates the generation of main- and sub-scan area-enable signals when areas 1 and 2 are selected by the method of FIG. 14, as well as the output state of a function code in each area.

FIG. 9 is a block diagram showing the construction of a processing circuit for image editing. As shown in FIG. 9, an input image signal enters an A terminal of a selector 802 as thru-data which does not undergo any image processing, as well as a LIFO 803 for creating mirror-image data. The data outputted by the LIFO 803 enters a B terminal of the selector 802. Data that has been set in a register 804 by a CPU (not shown) enters a C terminal of the selector 802.

An area editing signal generating circuit 801 counts the main-scan synchronizing signal HSYNC and an image clock VCLK and internally generates the main- and sub-scan area enable signals as shown in FIG. 8. Further, a function code is generated for each area and is sent to a selection terminal S of the selector 802, whereby the selector 802 selects an input conforming to this code and is capable of outputting, for each area, data which does not undergo processing, mirror-image data and fixed-value data, etc. The signal outputted by the selector 802 enters a FIFO 805, which proceeds to deliver the signal as an edited image signal.

Example of application

FIG. 10 is a diagram showing the form of a cascade system in which a plurality of the above-described image processing apparatus are connected.

As shown in FIG. 1, numerals 1001~1004 denote the above-described image processing apparatus, namely one set of digital copiers. Numerals 1005~1007 denote cables connecting the apparatus. These cables accommodate the external bus 223 shown in FIG. 2. As shown at 1010, each cable includes three control signal lines related to image signals, namely the image clock VCLK, the main-scan horizontal synchronizing signal HSYNC and the sub-scan enable signal VE, eight image signal lines for each of the colors R, G, B, and four communication lines (ATN*, SiD*, DACK*, OFFER*). In other words, each cable includes the external bus 223.

An example of an application will now be described in which two single-sided originals are read in by the reader of apparatus 1001, two single-sided copies are outputted by the apparatus 1001 and a double-sided copy is outputted by each of the apparatus 1002 and 1003.

FIG. 11 is a diagram showing the general features of a control panel on the image processing apparatus of this embodiment. When a "CASCADE" key 1101 is pressed on the control panel of the apparatus 1001 at such time that the panel presents the display shown in FIG. 11, a printing-mode setting window shown in FIG. 12 appears on the control panel. After a key 1102 for designating the apparatus 1001 is pressed in this window, pressing a "SINGLE SIDE" key 1106 sets the apparatus 1001 to the single-sided printing mode. By pressing a "DOUBLE SIDE" key 1105 after the key 1104 for designating the apparatus 1002 is pressed, the apparatus 1002 is set to the double-sided printing mode. Similarly, by pressing the "DOUBLE SIDE" key 1105 after the key 1104 for designating the apparatus 1003 is pressed, the apparatus 1003 is set to the double-sided printing mode.

Figure 13:
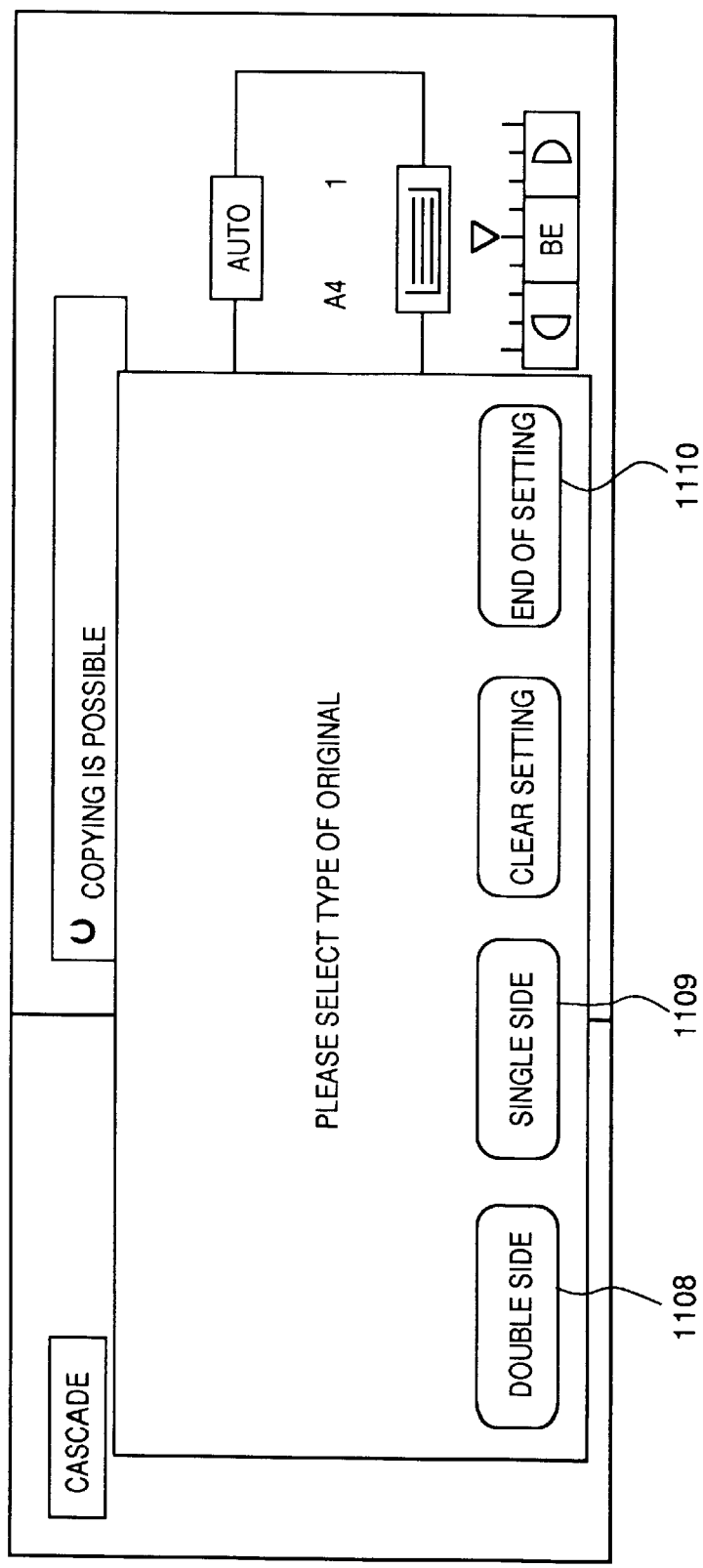
FIG. 13 is a diagram showing an original-type selecting window displayed on the display panel depicted in FIG. 11.

Since this ends the setting of the printing mode, a "END OF SETTING" key 1007 is pressed, whereupon a window, shown in FIG. 13, for selecting the type of original appears on the panel. Since a single-sided original is read in this example, a "SINGLE SIDE" key 1109 is pressed to select the single-sided original. Since this ends the selection of the type of original, the operator now presses a "END OF SETTING" key 1110.

By virtue of the foregoing operation, the original-type selecting window shown in FIG. 13 vanishes and the display returns to the state shown in FIG. 11. At this time the CPU (not shown) of the apparatus 1001 notifies the apparatus 1002 and 1003, via the cascade communication circuit 214, of the fact that copies are to be outputted in the double-sided printing mode, and notifies the apparatus 1004 via the circuit 214 of the fact that no copy is to be produced. These notification signals are transmitted from the apparatus 1001 to the apparatus 1004 in succession via the cables 1005~1007. The apparatus 1002 and 1003 set the printing mode in accordance with the notification received from the apparatus 1001.

When two single-sided originals are placed upon the original feeder of the apparatus 1001, the number of copies is set to three and a "COPY START" button is pressed, reading of the originals starts. At this time the image data of the originals read by the apparatus 1001 is sent to the apparatus 1002 and 1003 via the bus selector 213. Each of the apparatus 1002 and 1003 inputs the received image data to its LOG converting circuit 215 via its own bus selector 213.

In the apparatus 1001, three sheets of recording paper on which the image of the first original has been formed, namely three single-sided copies, are stacked on the paper-discharge tray 129. In each of the apparatus 1002 and 1003, three sheets of recording paper on the front side of each of which the image of the first original has been formed are stacked in the intermediate tray 111. When the apparatus 1002 and 1003 have sensed stacking of the three sheets of recording paper, these apparatus notify the apparatus 1001 of the fact that the three sheets of recording paper have reached the intermediate tray 111. Upon being so notified, the apparatus 1001 starts reading the second original placed upon the original feeder.

Since the apparatus 1001 has been set to the single-sided printing mode, here three sheets of recording paper on which the image of the second original has been formed are sent to the paper-discharge tray 129 so that three single-sided copies are stacked on the paper-discharge tray 129. In the apparatus 1002 and 1003, on the other hand, the image of the second original is formed on the reverse side of each sheet of recording paper supplied from the intermediate tray 111, after which three double-sided copies are stacked on the paper-discharge tray 129. Thus, six single-sided copies are outputted by the apparatus 1001 and three double-sided copies are outputted by each of the apparatus 1002 and 1003.

It should be noted that the apparatus which sets the printing mode and the apparatus which reads the original are not limited to the apparatus 1001 mentioned above; these operations may be performed by any of the other apparatus 2002 through 2004.

Other application

An example of a second application will now be described in which two double-sided originals are read in by the reader of apparatus 1001, four single-sided copies are outputted by the apparatus 1001 and two double-sided copies are outputted by each of the apparatus 1002 and 1003.

When the "CASCADE" key 1101 is pressed on the control panel of the apparatus 1001 at such time that the panel presents the usual display shown in FIG. 11, the printing-mode setting window shown in FIG. 12 appears on the control panel, as mentioned above. After the key 1102 for designating the apparatus 1001 is pressed in this window, pressing the "SINGLE SIDE" key 1106 sets the apparatus 1001 to the single-sided printing mode. By pressing the "DOUBLE SIDE" key 1105 after the key 1103 for designating the apparatus 1002 is pressed, the apparatus 1002 is set to the double-sided printing mode. Similarly, by pressing the "DOUBLE SIDE" key 1105 after the key 1104 for designating the apparatus 1003 is pressed, the apparatus 1003 is set to the double-sided printing mode.

Since this ends the setting of the printing mode in each apparatus, the "END OF SETTING" key 1007 is pressed, whereupon the window, shown in FIG. 13, for selecting the type of original appears on the panel. Since a double-sided original is read in this example, a "DOUBLE SIDE" key 1108 is pressed to select the double-sided original. Since this ends the selection of the type of original, the operator now presses the "END OF SETTING" key 1110.

By virtue of the foregoing operation, the original-type selecting window shown in FIG. 13 vanishes and the display returns to the state shown in FIG. 11. At this time the CPU (not shown) of the apparatus 1001 notifies the apparatus 1002 and 1003, via the cascade communication circuit 214, of the fact that copies are to be outputted in the double-sided printing mode. The apparatus 1002 and 1003 set the printing mode in accordance with the notification received from the apparatus 1001.

When the two sheets of double-sided originals are placed upon the original feeder of the apparatus 1001, the number of copies is set to three and the "COPY START" button is pressed, reading of the originals starts. At this time the image data of the originals read by the apparatus 1001 is sent to the apparatus 1002 and 1003 via the bus selector 213. Each of the apparatus 1002 and 1003 inputs the received image data to its own LOG converting circuit 215.

In the apparatus 1001, three sheets of recording paper on which the image on the front side of the first original has been formed, namely three single-sided copies, are stacked on the paper-discharge tray 129. In each of the apparatus 1002 and 1003, three sheets of recording paper on the front side of each of which the image on the front side of the first original has been formed are stacked in the intermediate tray 111. When the apparatus 1002 and 1003 have sensed stacking of the three sheets of recording paper, these apparatus notify the apparatus 1001 of the fact that the three sheets of recording paper have reached the intermediate tray 111. Upon being so notified, the apparatus 1001 starts reading the reverse side of the first original placed upon the original feeder.

Since the apparatus 1001 has been set to the single-sided printing mode, here three sheets of recording paper on which the image on the reverse side of the first original has been formed are sent to the paper-discharge tray 129 so that three single-sided copies are stacked on the paper-discharge tray 129. In the apparatus 1002 and 1003, on the other hand, the image on the reverse side of the first original is formed on the reverse side of each sheet of recording paper supplied from the intermediate tray 111, after which three double-sided copies are stacked on the paper-discharge tray 129.

Through a similar procedure, the front side of the second original placed upon the original feeder is read, this image is formed on recording paper, the reverse side of the second original is read and this image is formed on recording paper.

Thus, 12 single-sided copies are outputted by the apparatus 1001 and six double-sided copies are outputted by each of the apparatus 1002 and 1003.

Thus, in accordance with this embodiment, a plurality of image processing apparatus are connected in cascade and the printing modes of some or all of the cascade-connected apparatus are set at will using one of the apparatus and image of an original is read by the reader of this apparatus. As a result, single- or double-sided copies can be obtained at some or all of the cascade-connected apparatus. Accordingly, whether copies are to be single or double sided need not be set at each and every apparatus. This not only facilitates operation and shortens setting time but also makes it possible to obtain double-sided copies and single-sided copies simultaneously from a single original. Thus, copies desired by the user can be obtained in a short period of time.

Second Embodiment

The recent increase in the speed of digital copiers has been accompanied by the development of digital copiers having page memories for storing image signals read within the copier. With a digital copier of this kind, the read image signal is stored in the page memory temporarily, the image signal is read out and printed. As a result, there is more flexibility in terms of the timing of the image reading operation and the timing of the printing operation in comparison with a copier not having a page memory.

If such digital copiers having a page memory are so adapted that control signals for writing the image signal in the page memory are obtained also from outside the apparatus, means are provided for switching between input/output of the image signal and control signals with respect to the external unit and an image signal other than one generated by the copier itself, namely an image signal obtained from an external device, is stored in the page memory, then it will be possible to construct a flexible, easily expanded system in which the number of components constituting the system can be changed in dependence upon the necessary CV. Furthermore, by organizing the copiers into one or a plurality of groups and performing operation on a group basis, the overall system can be operated efficiently.

An image processing apparatus and image processing system of an embodiment for realizing this function will now be described in detail with reference to the drawings. It should be noted that components in the second embodiment that are similar to those of the first embodiment are designated by like reference characters and need not be described again in detail.

Figure 15:
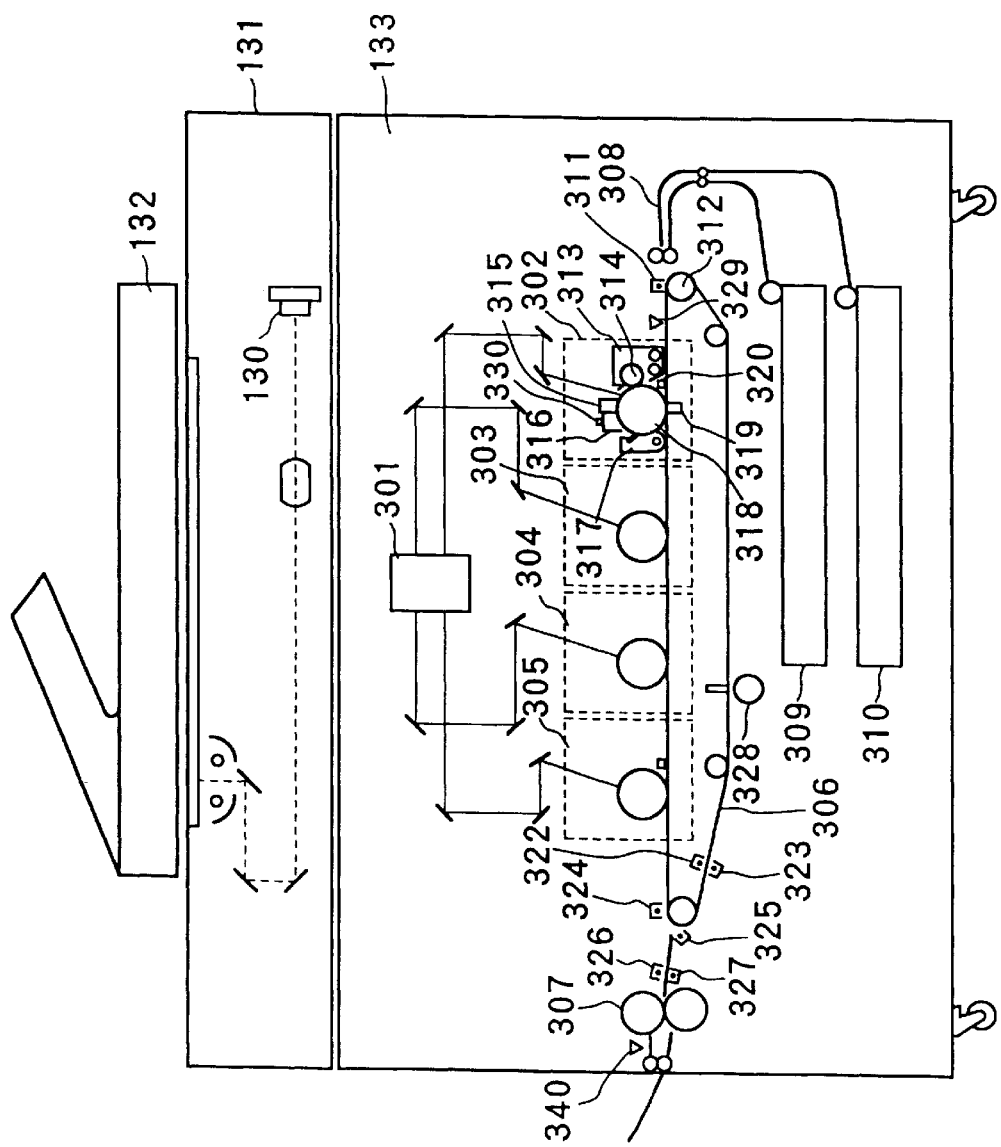
FIG. 15 is an overall view of an image processing apparatus according to a second embodiment of the present invention.

FIG. 15 is an overall view of a digital copier constituting the image processing apparatus according to the second embodiment of the present invention.

The digital copier shown in FIG. 15 is divided generally into a reader 131 and a printer 133. Further, an original feeder 132 is a well-known optional device which automatically conveys originals to the original reading area of the reader 131.

Reader

Figure 16:
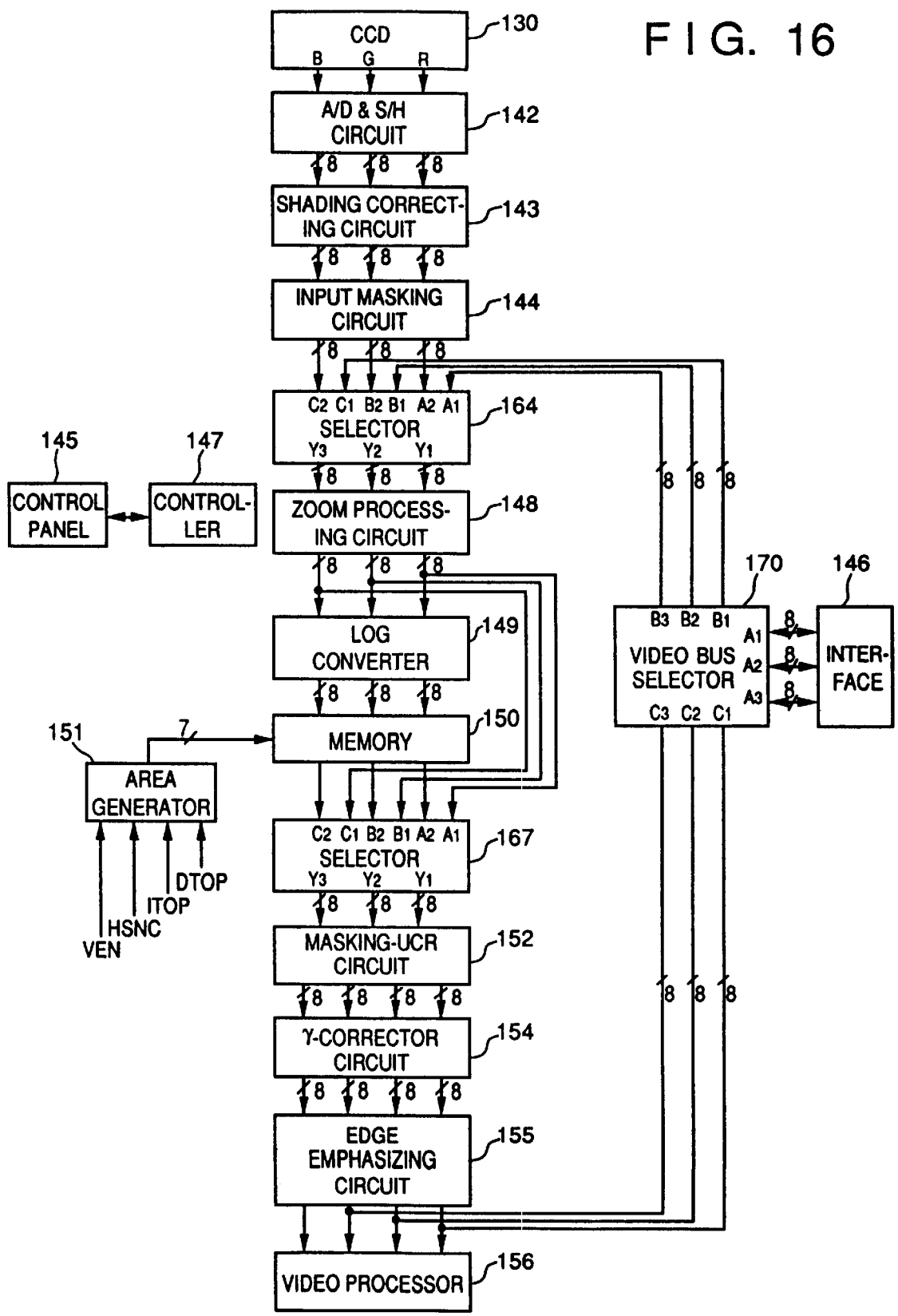
FIG. 16 is a block diagram showing the construction of a reading section depicted in FIG. 15.

FIG. 16 is a block diagram illustrating the construction of the reader 131.

Numeral 147 denotes a controller as constituted by a CPU, a ROM and a RAM for performing overall control of the apparatus via a control bus (not shown) in accordance with a program that has been stored in the ROM.

An original placed upon a platen (not shown) is exposed by a halogen lamp (not shown) and the reflected image is formed on a CCD 130. Image signals indicative of the original outputted by the CCD 130 are sampled and held by an A/D & S/H 142, after which the analog signals are converted to digital signals to produce R, G, B eight-bit image signals.

The R, G, B image signals outputted by the A/D & S/H 102 are subjected to shading and black correction by a shading unit 143, and the resulting signals are converted to NTSC signals by an input masking unit 144.

Numeral 164 denotes a selector which, in dependence upon a command from the controller 147, selects either the image signal from the input masking unit 144 or an image signal applied externally. A zoom processor 148 enlarges or reduces, in the main-scan direction, the image represented by the image signal selected by the selector 164 and outputs the results of processing to a LOG converter 149 and a selector 167.

The LOG converter 149 converts the R, G, B image signals representing luminance to M, C, Y image signals representing density and applies the converted image signals to a memory 150, where the signals are stored. It should be noted that the image data stored in the memory 150 is read out in conformity with the timing of each of four drums, described later.

In dependence upon a command from the controller 147, the selector 167 selects either the image signal from the zoom processor 148 or the image signal from the memory 150.

A masking-UCR unit 152 applies masking processing and UCR processing to the MCY image data input from the selector 167 and outputs eight-bit image data in each of the colors M, C, Y, K.

The image data outputted by the masking-UCR unit 152 is g-corrected by a g-corrector and then subjected to edge emphasizing processing by an edge emphasizing circuit 155, after which the resulting data is applied to a video processor 156. The latter drives a semiconductor laser (not shown) in conformity with the MCYK image data input from the edge emphasizing circuit 155, whereby a modulated laser beam is produced.

On the basis of four signals, namely an output signal DTOP from an image-edge sensor, a horizontal synchronizing signal HSNC1 produced internally of the reader 131 or a horizontal synchronizing signal HSNC2 produced externally of the reader 131, a paper-edge sensor output ITOP1 and a sub-scan write-enable signal VEN from outside the reader 131, an area generator 151 generates a signal for controlling the read/write operation of the memory 150. This signal is composed of seven signals, namely a main-scan write-enable signal, a main-scan read-enable signal, a sub-scan write-enable signal and four sub-scan read-enable signals which correspond to respective ones of the four colors.

Numeral 145 denotes a control panel, the details of which will be described later, for displaying information from the controller 147 and outputting commands from the operator to the controller 147.

Numeral 170 denotes a video bus selector for outputting image signals to an external device and inputting image signals from the external device via an interface 146.

Bus selector

Figure 17:
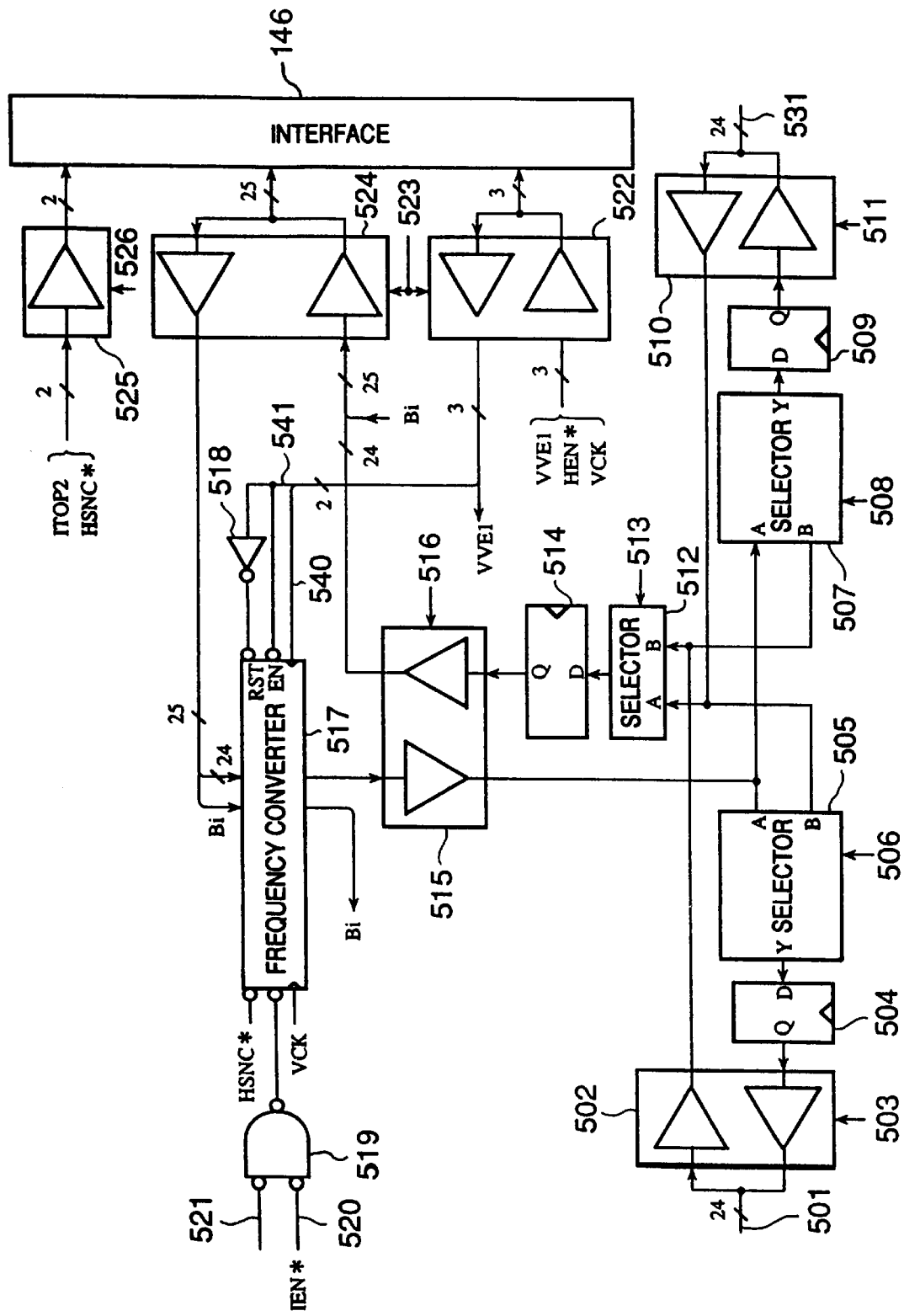
FIG. 17 is a block diagram showing the construction of a video-bus selector depicted in FIG. 16.

FIG. 17 is a block diagram showing the construction of the video bus selector 170.

As shown in FIG. 17, a bidirectional buffer 502 is controlled by a signal 503 from the controller 147 and is connected to the selector 164 via a signal line 501. Further, a bidirectional buffer 510 is controlled by a signal 511 from the controller 147 and is connected to the edge emphasizing circuit 155 via a signal line 531. A bidirectional buffer 515 is controlled by a signal 516 from the controller 147.

A selector 505 selects an output from either the bidirectional buffer 510 or the bidirectional buffer 515 in dependence upon a signal 506 from the controller 147 and outputs the selected signal to a D-type flip-flop (D-F/F) 504. The D-F/F 504 sends the input image signal to the bidirectional buffer 502 in synchronism with the video clock VCK.

A selector 507 selects an output from either the bidirectional buffer 502 or the bidirectional buffer 515 in dependence upon a signal 508 from the controller 147 and outputs the selected signal to a D-F/F 509. The D-F/F 509 sends the input image signal to the bidirectional buffer 510 in synchronism with the video clock VCK.

A selector 512 selects an output from either the bidirectional buffer 502 or the bidirectional buffer 510 in dependence upon a signal 513 from the controller 147 and outputs the selected signal to a D-F/F 514. The D-F/F 514 sends the input image signal to the bidirectional buffer 515 in synchronism with the video clock VCK.

A bidirectional buffer 524 controls the flow of image signals between the interface 146 and the bidirectional buffer 515 by a signal 523 from the controller 147. It should be noted that the signal which passes through the buffer 524 contains eight-bit R, G, B signals and a one-bit binary signal Bi. The signal Bi is for the exchange of binary image signals between this embodiment and another apparatus.

A bidirectional buffer 522 controls the flow of control signals and the like between the apparatus and the interface 146 by the signal 523 from the controller 147. It should be noted that the signal which passes through the buffer 522 contains a sub-scan write-enable signal VVE1, a main-scan enable signal HEN* and a video clock VCK that are directed to another apparatus, as well as a sub-scan write-enable signal VVE1, a video clock 540 and a main-scan enable signal (low-active) 541 from another apparatus.

A frequency converter 517, which is constituted by a FIFO, converts the synchronizing frequency of the image signal outputted by the bidirectional buffer 524 and outputs the result to the bidirectional buffer 515. It should be noted that the frequency converter 517 is enabled for writing by the main-scan enable signal 541, stores the image signal, which is outputted by the bidirectional buffer 524, in synchronism with the video clock 540, and is write-reset by a signal which is the result of inverting the main-scan enable signal 541 by an inverter 518. Further, the frequency converter 517 is enabled for reading by a signal which is the logical product of a signal IEN* 520 and a signal 521 from the controller 147, outputs a stored image signal in synchronism with the video clock VCK and is read-reset by a signal which is the inverse of the main-scan synchronizing signal HSNC*.

Numeral 526 denotes an output buffer controlled by a signal 526 from the controller 147 and sends a sub-scan synchronizing signal ITOP2 of a memory unit (IPU) and the main-scan synchronizing signal HSNC* to the interface 146.

Flow of image signals

The flow of image signals and the setting of control signals in each mode will now be described.

(Ordinary copying)

The flow of image signals in this case is as follows: CCD 130 → A/D & S/H unit 142 → shading unit 143 → input masking unit 144 → selector 164 → zoom processor 148 → LOG converter 149 → memory 150 → selector 167 → masking-UCR unit 152 → g-corrector 154 → edge emphasizing circuit 155 → video processor 156.

The setting of the video bus selector 170 and control signals is performed as set forth below. It should be noted that the "X" symbol below represents "DON'T CARE". This is controlled by the controller 147 in such a manner that the transmitted signals will not collide.

| | | |
|---|---|---|
| Control signal 503 of bidirectional buffer 502 | → | "1" |
| Control signal 506 of selector 505 | → | "X" |
| Control signal 508 of selector 507 | → | "X" |
| Control signal 511 of bidirectional buffer 510 | → | "1" |
| Control signal 513 of selector 512 | → | "X" |
| Control signal 516 of bidirectional buffer 515 | → | "X" |
| Control signal 523 of bidirectional buffers 522, 524 | → | "1" |
| Control signal 526 of output buffer 525 | → | "1" |
| Control signal 521 input to gate 519 | → | "1" |
| (Outputting to interface 146) | | |

The flow of image signals in this case is as follows: CCD 130 → A/D & S/H unit 142 → shading unit 143 → input masking unit 144 → selector 164 → zoom processor 148 → selector 167 → masking-UCR unit 152 → g-corrector 154 → edge emphasizing circuit 155 → video selector 170 → interface 146.

The setting of the video bus selector 170 and control signals is performed as follows:

| | | |
|---|---|---|
| Control signal 503 of bidirectional buffer 502 | → | "1" |
| Control signal 506 of selector 505 | → | "X" |
| Control signal 508 of selector 507 | → | "X" |
| Control signal 511 of bidirectional buffer 510 | → | "1" |
| Control signal 513 of selector 512 | → | "0" |
| Control signal 516 of bidirectional buffer 515 | → | "0" |
| Control signal 523 of bidirectional buffers 522, 524 | → | "0" |
| Control signal 526 of output buffer 525 | → | "0" |
| Control signal 521 input to gate 519 | → | "1" |
| (Inputting from interface 146) | | |

The flow of image signals in this case is as set forth below. It should be noted that the sub-scan write-enable signal VEN from the outside is used as the sub-scan write-enable signal of the memory 150.

Interface 146 → video bus selector 170 → selector 164 → zoom processor 148 → LOG converter 149 → memory 150 → selector 167 → masking-UCR unit 152 → g-corrector 154 → edge emphasizing circuit 155 → video processor 156.

The setting of the video bus selector 170 and control signals is performed as follows:

| | |
|---|---|
| Control signal 503 of bidirectional buffer 502 | "0" |
| Control signal 506 of selector 505 | "0" |
| Control signal 508 of selector 507 | "X" |
| Control signal 511 of bidirectional buffer 510 | "1" |
| Control signal 513 of selector 512 | "0" |
| Control signal 516 of bidirectional buffer 515 | "1" |
| Control signal 523 of bidirectional buffers 522, 524 | "1" |
| Control signal 526 of output buffer 525 | "0" |
| Control signal 521 input to gate 519 | "0" |

Printer

Figure 18:
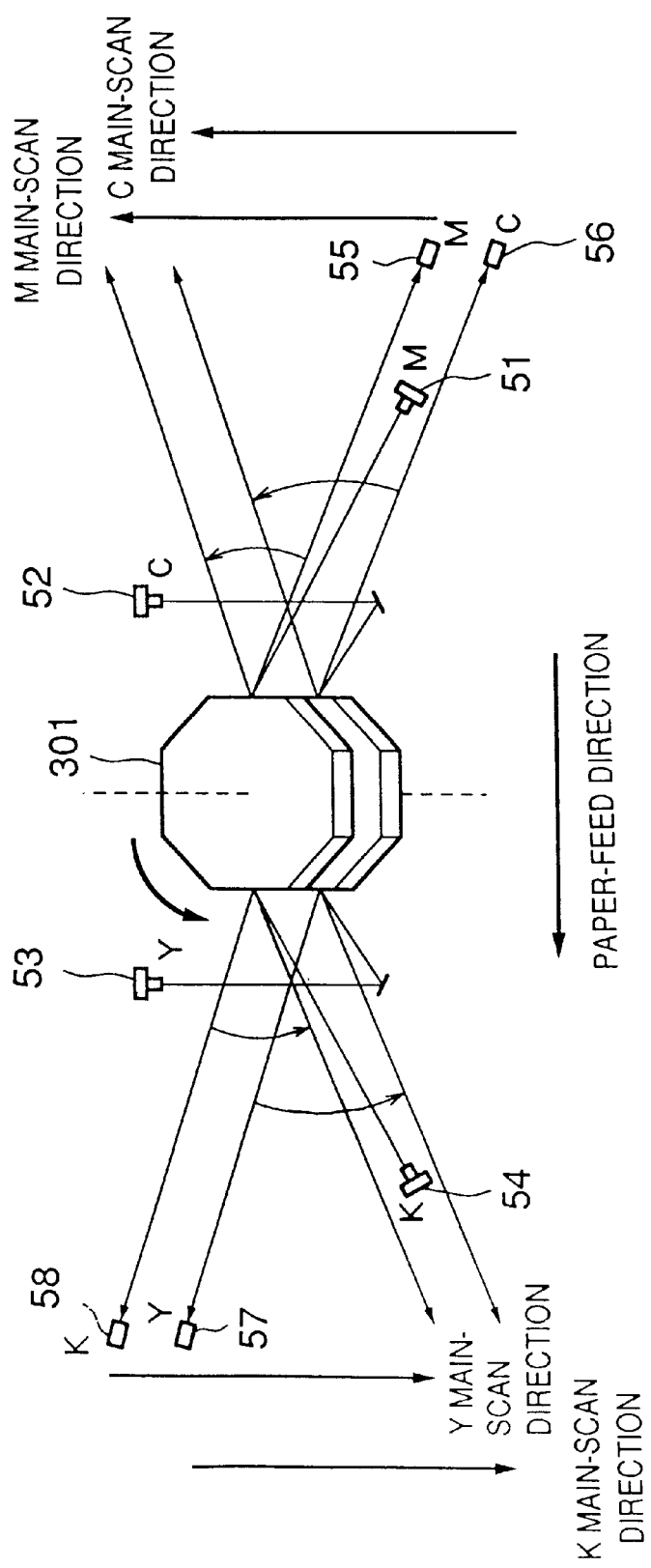
FIG. 18 is a diagram for describing operation in a case where two polygon mirrors are arranged on the same axis and rotated by one motor.

The printer 133 shown in FIG. 15 includes a polygon scanner 301 which scans laser beams emitted from a laser control unit (not shown) so as to sensitize prescribed positions on photosensitive drums in image forming sections 302~305, described below. As shown in FIG. 18, the polygon scanner 301 is so adapted that photosensitive drums of image forming sections corresponding to respective ones of the colors are scanned by laser beams from laser elements 51~54 driven independently for the colors M, C, Y, K by a laser control unit. Numerals 55~58 denote beam sensors (hereinafter referred to as "BD sensors") for sensing the scanned laser beams and generating the main-scan synchronizing signals.

In a case where two polygon mirrors are arranged coaxially and rotated by one motor, as shown in FIG. 18, the laser beams of M, C and the laser beams of Y, K have mutually opposing scanning directions in terms of the main-scan direction. As a consequence, ordinarily it is arranged so that the Y, K image data becomes a mirror image, in the main-scan direction, of the MC image data.

With reference again to FIG. 15, numeral 302 denotes an M-image forming section, 303 a C-image forming section, 304 a Y-image forming section and 305 a K-image forming section. These sections form images of the corresponding colors. Since the image forming sections 302~305 are identically constructed, only the details of the M-image forming section 302 will be described and a description of the other image forming sections will be omitted.

The M-image forming section 302 includes a photosensitive drum 318 on the surface of which a latent image is formed by the laser beam from the polygon scanner 301. A primary corona discharge device 315 charges the surface of the photosensitive drum 318 to a prescribed potential to prepare for formation of a latent image. A developing unit 313 develops the latent image on the photosensitive drum 318 to form a toner image. The developing unit 313 includes a sleeve 314 which performs development by applying a developing bias. A transfer corona discharge device 319 discharges a transfer belt 306 from the back side thereof to transfer the toner image on the photosensitive drum 318 to the recording paper on the transfer belt 306. After the transfer the photosensitive drum 318 has its surface cleaned by a cleaner 317, charge is removed by an auxiliary corona discharge device 316 and residual electric charge is erased by a pre-exposure lamp 330, after which appropriate charging is achieved again by the primary corona discharge device 315.

The procedure for forming an image on recording paper will now be described.

Numeral 308 denotes a paper-supply unit for supplying the transfer belt 306 with recording paper stored in cassettes 309, 310. Recording paper supplied from the paper-supply unit 308 is charged by an attracting corona discharge device 311. Numeral 312 denotes a transfer-belt roller which rotates the transfer belt 306 and cooperates with the attracting corona discharge device 311 to cause the recording paper to be electrically attracted to the transfer belt.

Numeral 329 denotes a paper-edge sensor for sensing the leading edge of the recording paper on the transfer belt 306. The output signal from the paper-edge sensor 329 is sent from the printer 133 to the reader 131 and is used as the sub-scan synchronizing signal in the reader 131.

Thereafter, the recording paper is conveyed by the transfer belt 306 and toner images are formed on the recording paper in the order of the colors M, C, Y, K by the image forming sections 302, 303, 304, 305, respectively.

The recording paper which has passed through the K-image forming section 305 is deelectrified by a deelectrifying corona discharge device 324 in order to facilitate the separation of the recording paper from the transfer belt 306. The recording paper is separated from the transfer belt 306 after deelectrification is performed.

A peel-off corona discharge device 325 prevents disturbance of the image due to peel-off discharge when the recording paper is separated from the transfer belt 306.

To prevent disturbance of the image by strengthening the fixing force of the toner, the separated recording paper is deelectrified by pre-fixing corona discharge devices 326, 327, after which the toner image is thermally fixed by the fixing unit 307. The recording paper is then discharged from the machine. Numeral 340 denotes a paper-discharge sensor for sensing that the recording paper has been discharged from the machine.

Meanwhile, the transfer belt 306 from which the recording paper has been separated is deelectrified and electrostatically initialized by transfer-belt deelectrifying corona discharge devices 322, 323, contaminants are removed by a belt cleaner 328 and preparations are made for attracting recording paper again.

Interface

Figure 19:
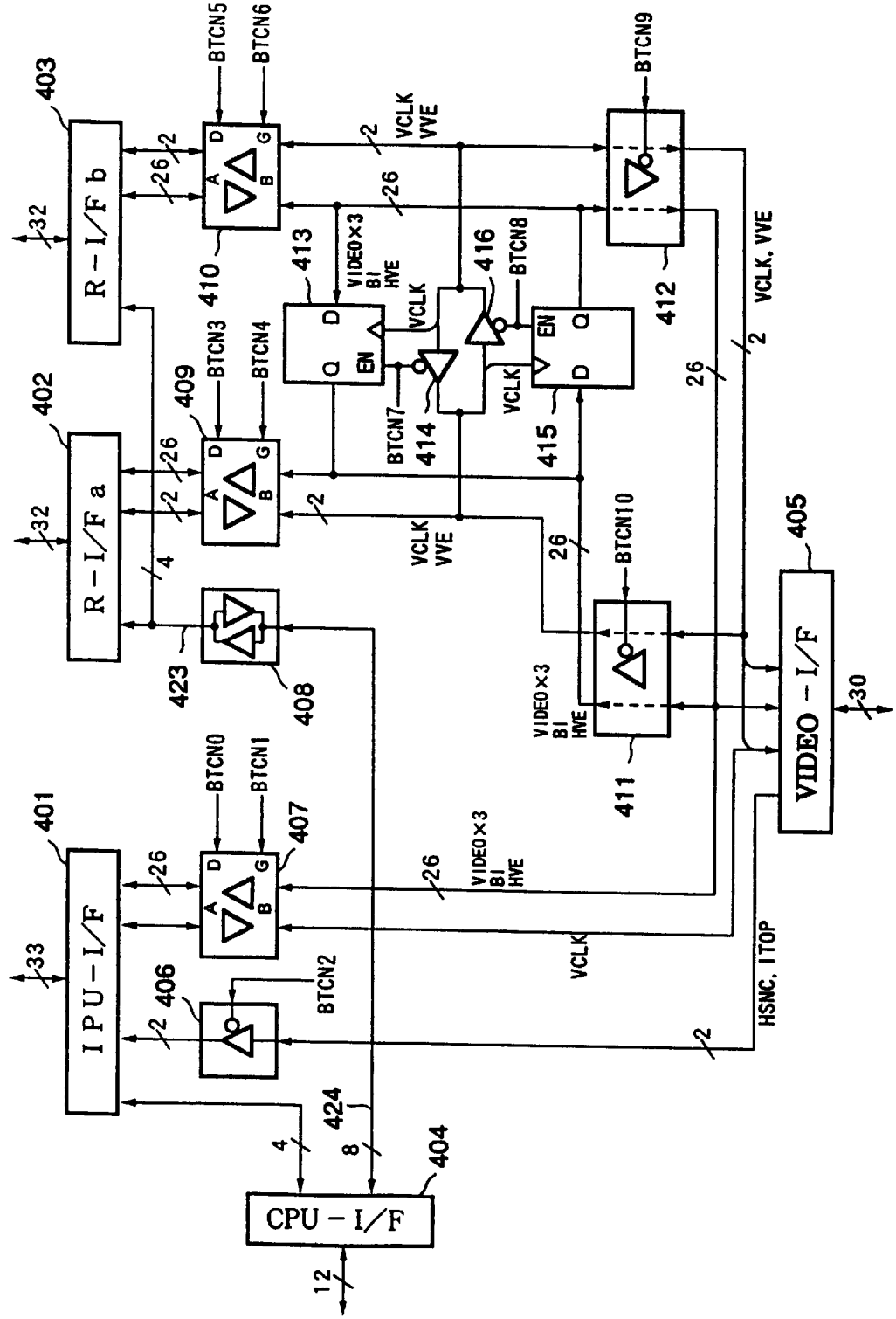
FIG. 19 is a block diagram showing the detailed construction of an interface section depicted in FIG. 16.

FIG. 19 is a block diagram showing the detailed construction of the interface 146.

Shown in FIG. 19 are an IPU interface (hereinafter referred to as an "IPU-I/F") 401 for interfacing an external image processing unit (hereinafter referred to as an "IPU"), R-I/Fs 402 and 403 for interfacing other devices, a CPU-I/F 404 for supervising communication with other devices, and a video-I/F 405 for interfacing an image processor.

Tri-state buffers 406, 411, 412, 414, 416 are enabled when their respective control signals are "0" and raised to a high impedance when their control signals are "1".

Numerals 407, 409, 410 denote bidirectional buffers. The bidirectional buffers are realized by a logic element such as an LS245, by way of example. When terminals G and D are both at "0", the flow of data is terminal B → terminal A. When terminal G is at "0" and terminal D at "1", the flow of data is terminal A → terminal B. The isolation state is attained when terminal G is at "1".

Numerals 413, 415 denote D-F/Fs having a tri-state function. These are enabled if the terminal EN is "0" and raised to a high impedance if the terminal EN is "1".

These buffers and F/Fs are controlled by signals BTCN0~BTCN10 outputted from the I/O port of the controller 147.

Numeral 408 denotes a special bidirectional buffer the details of which will be described later.

A communication line (four bits) for performing communication between the IPU and the controller 147 is connected between the IPU-I/F 401 and the CPU-I/F 404.

Three signal lines are connected between the IPU-I/F 401 and the video-I/F 405. The first is a signal line, which is connected via the tri-state buffer 406, for transmitting the one-bit main-scan synchronizing signal HSNC and the one-bit sub-scan synchronizing signal ITOP from the video-I/F 405 to the IPU-I/F 401. The second is a signal line (26 bits), which is connected via the bidirectional buffer 407, for transmitting three sets of eight-bit video signals VIDEO, a one-bit binary signal BI and a one-bit main-scan synchronizing signal HVE bidirectionally between the video-I/F 405 and the IPU-I/F 401. The third is a signal, which is connected via the bidirectional buffer 407, for transmitting the one-bit image clock VCLK bidirectionally between the video-I/F 405 and the IPU-I/F 401.

A communication line for performing communication between another device (e.g., a copier) and the controller 147 is connected between the R-I/Fs 402, 403 and the CPU-I/F 404 via the bidirectional buffer 408. Though the details are described later, an eight-bit communication line 424 is connected between the CPU-I/F 404 and the bidirectional buffer 408, and a four-bit communication line 423 is connected between the bidirectional buffer 408 and the bidirectional buffers 402, 403.

Four signal lines are connected between the video-I/F 405 and the R-I/F 402. The first is a signal line, which is connected via the tri-state buffer 411 and bidirectional buffer 409, for transmitting three sets of signals VIDEO and signals BI, HVE from the video-I/F 405 to the R-I/Fa 402. The second is a signal line, which is connected via the bidirectional buffer 409, D-F/F 413 and tri-state buffer 412, for transmitting three sets of signals VIDEO and the signals BI, HVE from the R-I/Fa 402 to the video-I/F 405. The third is a signal line, which is connected via the tri-state buffer 411 and the bidirectional buffer 409, for transmitting the one-bit signal VCLK and the one-bit sub-scan video-enable signal VVE from the video-I/F 405 to the R-I/Fa 402. The fourth is a signal line, which is connected via the bidirectional buffer 409, tri-state buffer 416 and tri-state buffer 412, for transmitting the signal VCLK and the signal VVE from the R-I/Fa 402 to the video-I/F 405.

Four signal lines are also connected between the video-I/F 405 and the R-I/Fb 403. The first is a signal line, which is connected via the tri-state buffer 411, D-FF 415 and bidirectional buffer 410, for transmitting three sets of signals VIDEO and signals BI, HVE from the video-I/F 405 to the R-I/Fb 403. The second is a signal line, which is connected via the bidirectional buffer 410 and tri-state buffer 412, for transmitting three sets of signals VIDEO and the signals BI, HVE from the R-I/Fb 403 to the video-I/F 405. The third is a signal line, which is connected via the tri-state buffer 411, tri-state buffer 416 and bidirectional buffer 410, for transmitting the signal VCLK and the signal VVE from the video-I/F 405 to the R-I/Fb 403. The fourth is a signal line, which is connected via the bidirectional buffer 410 and tri-state buffer 412, for transmitting the signal VCLK and the signal VVE from the R-I/Fb 403 to the video-I/F 405.

Control and the flow of signals in each mode will now be described. Each mode is set by the controller 147.

Mode 1

This is a mode in which a signal is transmitted from the IPU-I/F 401 to the R-I/Fa 402. The control signals in this case are as shown below. The symbol "X" represents "DON'T CARE". This is controlled by the controller 147 in such a manner that the transmitted signals will not collide.

| | | |
|---|---|---|
| BTCN0 | ‥ | "1" |
| BTCN1 | ‥ | "0" |
| BTCN2 | ‥ | "0" |
| BTCN3 | ‥ | "0" |
| BTCN4 | ‥ | "0" |
| BTCN5 | ‥ | X |
| BTCN6 | ‥ | X |
| BTCN7 | ‥ | "1" |
| BTCN8 | ‥ | X |
| BTCN9 | ‥ | "1" |
| BTCN10 | ‥ | "0" |

Mode 2

This is a mode in which a signal is transmitted from the IPU-I/F 401 to the R-I/Fb 403. The control signals in this case are as shown below.

| | | |
|---|---|---|
| BTCN0 | ‥ | "1" |
| BTCN1 | ‥ | "0" |
| BTCN2 | ‥ | "0" |
| BTCN3 | ‥ | X |
| BTCN4 | ‥ | "1" |
| BTCN5 | ‥ | "0" |
| BTCN6 | ‥ | "0" |
| BTCN7 | ‥ | "1" |
| BTCN8 | ‥ | "0" |
| BTCN9 | ‥ | "1" |
| BTCN10 | ‥ | "0" |

Mode 3

This is a mode in which a signal is transmitted from the IPU-I/F 401 to the video-I/F 405. The control signals in this case are as shown below.

| | | |
|---|---|---|
| BTCN0 | ‥ | "1" |
| BTCN1 | ‥ | "0" |
| BTCN2 | ‥ | "0" |
| BTCN3 | ‥ | X |
| BTCN4 | ‥ | X |
| BTCN5 | ‥ | X |
| BTCN6 | ‥ | X |
| BTCN7 | ‥ | X |
| BTCN8 | ‥ | X |
| BTCN9 | ‥ | "1" |
| BTCN10 | ‥ | "0" |

Mode 4

This is a mode in which a signal is transmitted from the R-I/Fa 402 to the R-I/Fb 403. The control signals in this case are as shown below.

| | | |
|---|---|---|
| BTCN0 | ‥ | X |
| BTCN1 | ‥ | X |
| BTCN2 | ‥ | X |
| BTCN3 | ‥ | "1" |
| BTCN4 | ‥ | "0" |
| BTCN5 | ‥ | "0" |
| BTCN6 | ‥ | "0" |
| BTCN7 | ‥ | "1" |
| BTCN8 | ‥ | "0" |
| BTCN9 | ‥ | X |
| BTCN10 | ‥ | "1" |

Mode 5

This is a mode in which a signal is transmitted from the R-I/Fa 402 to the video-I/F 405. The control signals in this case are as shown below.

| | | |
|---|---|---|
| BTCN0 | .. | X |
| BTCN1 | .. | "1" |
| BTCN2 | .. | X |
| BTCN3 | .. | "1" |
| BTCN4 | .. | "0" |
| BTCN5 | .. | X |
| BTCN6 | .. | "1" |
| BTCN7 | .. | "1" |
| BTCN8 | .. | "0" |
| BTCN9 | .. | "0" |
| BTCN10 | .. | "1" |

Mode 6

This is a mode in which a signal is transmitted from the R-I/Fb 403 to the R-I/Fa 402. The control signals in this case are as shown below.

| | | |
|---|---|---|
| BTCN0 | .. | X |
| BTCN1 | .. | X |
| BTCN2 | .. | X |
| BTCN3 | .. | "0" |
| BTCN4 | .. | "0" |
| BTCN5 | .. | "1" |
| BTCN6 | .. | "0" |
| BTCN7 | .. | "0" |
| BTCN8 | .. | "1" |
| BTCN9 | .. | X |
| BTCN10 | .. | "1" |

Mode 7

This is a mode in which a signal is transmitted from the R-I/Fb 403 to the video-I/R 405. The control signals in this case are as shown below.

| | | |
|---|---|---|
| BTCN0 | .. | X |
| BTCN1 | .. | "1" |
| BTCN2 | .. | X |
| BTCN3 | .. | X |
| BTCN4 | .. | X |
| BTCN5 | .. | "1" |
| BTCN6 | .. | "0" |
| BTCN7 | .. | X |
| BTCN8 | .. | "1" |
| BTCN9 | .. | "0" |
| BTCN10 | .. | X |

Mode 8

This is a mode in which a signal is transmitted from the video-I/F 405 to the IPU-I/F 401. The control signals in this case are as shown below.

| | | |
|---|---|---|
| BTCN0 | .. | "0" |
| BTCN1 | .. | "0" |
| BTCN2 | .. | "0" |
| BTCN3 | .. | X |
| BTCN4 | .. | X |
| BTCN5 | .. | X |
| BTCN6 | .. | X |
| BTCN7 | .. | X |
| BTCN8 | .. | X |
| BTCN9 | .. | "1" |
| BTCN10 | .. | X |

Mode 9

This is a mode in which a signal is transmitted from the video-I/F 405 to the R-I/Fa 402. The control signals in this case are as shown below.

| | | |
|---|---|---|
| BTCN0 | .. | X |
| BTCN1 | .. | "1" |
| BTCN2 | .. | X |
| BTCN3 | .. | "0" |
| BTCN4 | .. | "0" |
| BTCN5 | .. | X |
| BTCN6 | .. | X |
| BTCN7 | .. | "0" |
| BTCN8 | .. | X |
| BTCN9 | .. | "1" |
| BTCN10 | .. | "0" |

Mode 10

This is a mode in which a signal is transmitted from the video-I/F 405 to the R-I/Fb 403. The control signals in this case are as shown below.

| | | |
|---|---|---|
| BTCN0 | .. | X |
| BTCN1 | .. | "1" |
| BTCN2 | .. | X |
| BTCN3 | .. | X |
| BTCN4 | .. | "1" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 11

This is a mode which is a combination of modes 1 and 2, namely a mode in which a signal is transmitted from the IPU-I/F 401 to the R-I/Fa 402 and R-I/Fb 403. The control signals in this case are as shown below.

| | | |
|---|---|---|
| BTCN0 | .. | "1" |
| BTCN1 | .. | "0" |
| BTCN2 | .. | "0" |
| BTCN3 | .. | "0" |
| BTCN4 | .. | "0" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 12

This is a mode which is a combination of modes 1 and 3, namely a mode in which a signal is transmitted from the IPU-I/F 401 to the R-I/Fa 402 and video-I/F 405. The control signals in this case are as shown below.

| | | |
|---|---|---|
| BTCN0 | .. | "1" |
| BTCN1 | .. | "0" |
| BTCN2 | .. | "0" |
| BTCN3 | .. | "0" |
| BTCN4 | .. | "0" |
| BTCN5 | .. | X |
| BTCN6 | .. | "1" |
| BTCN7 | .. | "1" |
| BTCN8 | .. | X |
| BTCN9 | .. | "1" |
| BTCN10 | .. | "0" |

Mode 13

This is a mode which is a combination of modes 2 and 3, namely a mode in which a signal is transmitted from the IPU-I/F 401 to the R-I/Fb 403 and video-I/F 405. The control signals in this case are as shown below.

| | | |
|---|---|---|
| BTCN0 | .. | "1" |
| BTCN1 | .. | "0" |
| BTCN2 | .. | "0" |
| BTCN3 | .. | X |
| BTCN4 | .. | "1" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 14

This is a mode which is a combination of modes 1, 2 and 3, namely a mode in which a signal is transmitted from the IPU-I/F 401 to the R-I/Fa 402, R-I/Fb 403 and video-I/F 405. The control signals in this case are as shown below.

| | | |
|---|---|---|
| BTCN0 | .. | "1" |
| BTCN1 | .. | "0" |
| BTCN2 | .. | "0" |
| BTCN3 | .. | "0" |
| BTCN4 | .. | "0" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 15

This is a mode which is a combination of modes 4 and 5, namely a mode in which a signal is transmitted from the R-I/Fa 402 to the R-I/Fb 403 and video-I/F 405. The control signals in this case are as shown below.

| | | |
|---|---|---|
| BTCN0 | .. | X |
| BTCN1 | .. | X |
| BTCN2 | .. | "1" |
| BTCN3 | .. | "1" |
| BTCN4 | .. | "0" |
| BTCN5 | .. | "0" |
| BTCN6 | .. | "0" |
| BTCN7 | .. | "1" |
| BTCN8 | .. | "0" |

-continued

| | | |
|---|---|---|
| BTCN9 | .. | "0" |
| BTCN10 | .. | "1" |

Mode 16

This is a mode which is a combination of modes 6 and 7, namely a mode in which a signal is transmitted from the R-I/Fb 403 to the R-I/Fa 402 and video-I/F 405. The control signals in this case are as shown below.

| | | |
|---|---|---|
| BTCN0 | .. | X |
| BTCN1 | .. | "1" |
| BTCN2 | .. | X |
| BTCN3 | .. | "0" |
| BTCN4 | .. | "0" |
| BTCN5 | .. | "1" |
| BTCN6 | .. | "0" |
| BTCN7 | .. | "0" |
| BTCN8 | .. | "1" |
| BTCN9 | .. | X |
| BTCN10 | .. | "1" |

Mode 17

This is a mode which is a combination of modes 8 and 9, namely a mode in which a signal is transmitted from the video-I/F 405 to the IPU-I/F 401 and R-I/Fa 402. The control signals in this case are as shown below.

| | | |
|---|---|---|
| BTCN0 | .. | "0" |
| BTCN1 | .. | "0" |
| BTCN2 | .. | "0" |
| BTCN3 | .. | "0" |
| BTCN4 | .. | "0" |
| BTCN5 | .. | X |
| BTCN6 | .. | X |
| BTCN7 | .. | "1" |
| BTCN8 | .. | X |
| BTCN9 | .. | "1" |
| BTCN10 | .. | "0" |

Mode 18

This is a mode which is a combination of modes 8 and 10, namely a mode in which a signal is transmitted from the video-I/F 405 to the IPU-I/F 401 and R-I/Fb 403. The control signals in this case are as shown below.

| | | |
|---|---|---|
| BTCN0 | .. | "0" |
| BTCN1 | .. | "0" |
| BTCN2 | .. | "0" |
| BTCN3 | .. | X |
| BTCN4 | .. | "1" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 19

This is a mode which is a combination of modes 9 and 10, namely a mode in which a signal is transmitted from the video-I/F 405 to the R-I/Fa 402 and R-I/Fb 403. The control signals in this case are as shown below.

| | | |
|---|---|---|
| BTCN0 | .. | X |
| BTCN1 | .. | "1" |
| BTCN2 | .. | X |
| BTCN3 | .. | "0" |
| BTCN4 | .. | "0" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Mode 20

This is a mode which is a combination of modes 8, 9 and 10, namely a mode in which a signal is transmitted from the video-I/F 405 to the IPU-I/F 401, R-I/Fa 402 and R-I/Fb 403. The control signals in this case are as shown below.

| | | |
|---|---|---|
| BTCN0 | .. | "0" |
| BTCN1 | .. | "0" |
| BTCN2 | .. | "0" |
| BTCN3 | .. | "0" |
| BTCN4 | .. | "0" |
| BTCN5 | .. | "0" |
| BTCN6 | .. | "0" |
| BTCN7 | .. | "1" |
| BTCN8 | .. | "0" |
| BTCN9 | .. | "1" |
| BTCN10 | .. | "0" |

Construction of cascade system

FIG. 20 is a diagram showing an example of a cascade system.

As shown in FIG. 20, numerals 1001~1004 denote the digital copiers (hereinafter referred to as "stations") of this embodiment. Each station has its own system address. The system addresses of the stations are all different, and it is required that one address be "0". The order in which the system addresses are connected is decided in order that video signals may be changed over. In this embodiment, the station of address "0" is placed at one end of the system, and the other system addresses are connected in ascending order starting from this position.

Connecting cables 1005~1007 are for connecting these stations to the cascade system and, as shown at numeral 1010, each includes a total of 24 image signal lines, or eight for each of the colors R, G, B, three video control lines and four serial communication lines. An IPU (or PS-IPU) 1008 is for connecting these digital copiers to an ordinary computer 1009.

FIG. 21 is a diagram showing the manner in which image signals are connected in this cascade system.

In FIG. 21, numerals 1111~1114 denote video I/Fs of the stations 1001~1004, respectively, and numerals 1115~1117 denote the image signal lines of the above-mentioned connection cables.

In the system of this embodiment, as mentioned above, the relationship between system addresses and contacts with other stations is such that a station having a lower address than that of a given station is connected to a first contact of the given station, while a station having an address higher than that of the given station is connected to a second contact of the given station. If this relationship is observed, no particular inconvenience will arise even if the system addresses are not always continuous.

Figure 22:
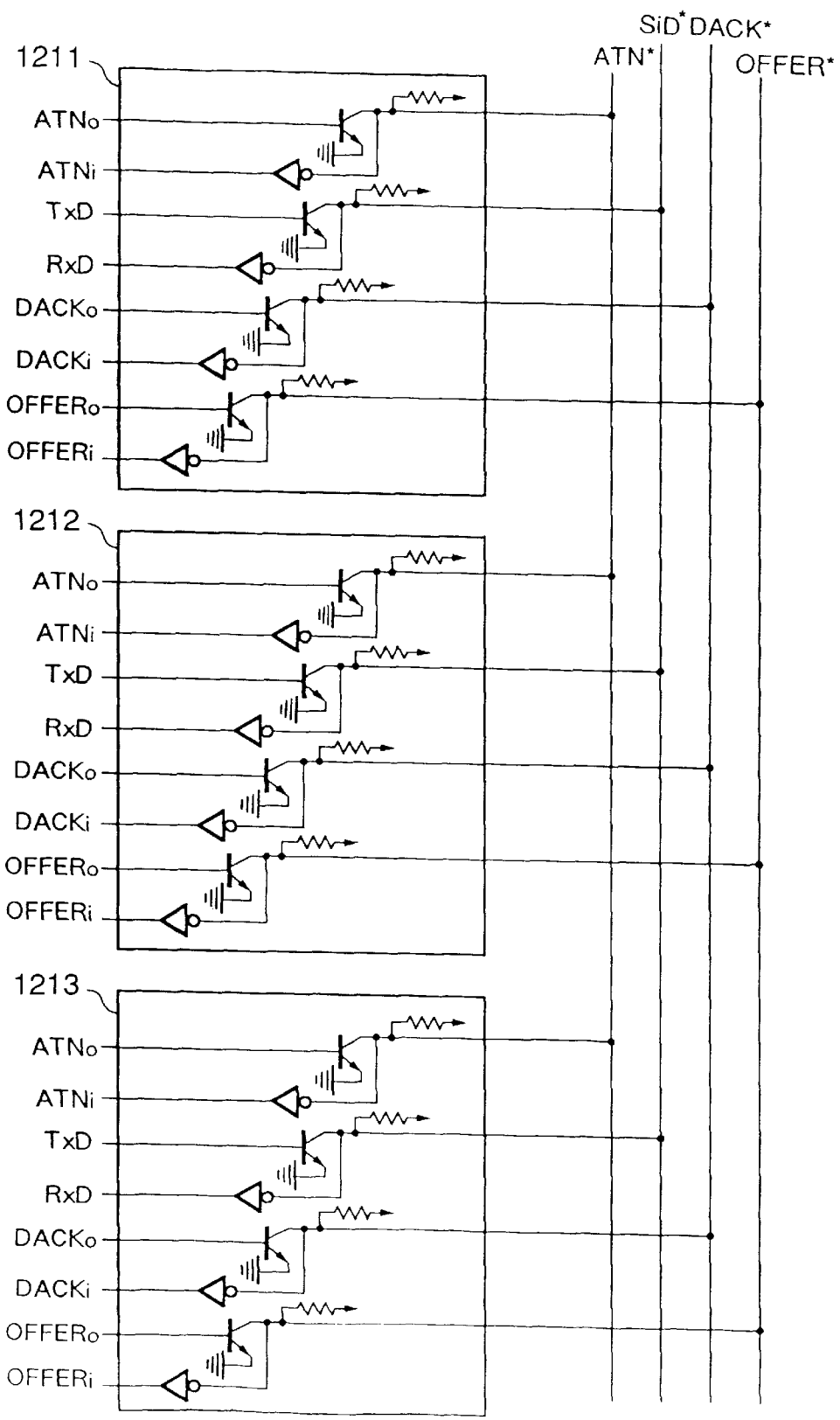
FIG. 22 is a diagram showing the manner in which serial communication lines are connected in the cascade system depicted in FIG. 20.

FIG. 22 is a diagram showing the manner in which serial communication lines are connected in this cascade system.

In FIG. 22, numerals 1211~1213 denote serial communication I/Fs of the stations 1001~1003, respectively. There are four signal lines for serial communication, namely lines ATN*, SiD*, DACK* and OFFER*.

The signal ATN* is a synchronizing signal indicating that a data transfer from a master station (defined as the station at system address "0") is in progress. A data transfer is carried out when ATN*=LOW holds. Stations other than the master station (these stations shall be referred to as "slave stations" hereinafter) never output the same signal merely by receiving the signal ATN*.

The signal OFFER* is a signal representing data transfer from a slave station to the master station. A data transfer is carried out if OFFER*=LOW holds. Master stations never output the same signal merely by receiving the signal OFFER*. The signal lines OFFER* among a plurality of slave stations are connected in the form of a wired OR.

The signal DACK* is a signal for given notice, from the receiving side, of the fact that data reception has been completed. The signal lines DACK* among a plurality of slave stations are connected in the form of a wired OR. Accordingly, in a case where a plurality of stations are receiving sides, DACK*=LOW is attained when data reception is completed at all of the stations. As a result, data-reception timing between stations is synchronized.

The signal SiD* is bidirectional serial data. Data is exchanged in synchronism with the signals ATN* and OFFER*. The method of data transfer is half-duplex start-stop synchronization. The baud rate and data format are set beforehand at system start-up.

The serial communication I/Fs and controllers of respective stations are connected by eight signal lines. Signals TxD and RxD are connected respectively to transmit/receive serial communication; signals ATNo, DACKo, OFFERo are connected to the controller 147 at I/O ports for input; and signals ATNi, DACKi, OFFERi are connected to the controller 147 at I/O ports for output. The serial communication I/Fs are the same as the bidirectional buffer 408 shown in FIG. 19. The signal line 423 shown in FIG. 19 includes the four bits of signals ATN*, SiD*, DACK*, OFFER*, and the signal line 24 includes the eight bits of signals TxD, RxD, ATNo, DACKo, OFFERo, ATNi, DACKi, OFFERi.

FIG. 23 is a timing chart of each of the signals shown in FIG. 22.

When the signal ATN* or OFFER* assumes the LOW level, as shown in FIG. 23, the signal SID* is outputted. The signal DACK* assumes the LOW level at the station where the signal SiD* is received earliest. Next, when the data transfer is completed, the signal DACK* attains the HIGH level at the station where the signal SiD* is received last.

FIG. 24 is a diagram showing the main commands used in serial communication.

In FIG. 24, an interface-clear command having a code 10 is a command that resets parameter data associated with the cascade system. The master station defined to have the system address "0" issues this command after it itself has been initialized (as when its power supply is turned on). The master station fixes the signal OFFER* at the input only. Each slave station which has received this command fixes the signal ATN* at the input only and initializes internal parameters.

A status-request command having a code 03 is a polling command for acquisition of information such as the status of the slave stations connected to the cascade system. After the master station has issued the interface-clear command, the master station issues the status-request command to each slave station at fixed times. This command includes a request-destination address as a parameter for designating a slave.

A status-transfer command having a code 05 is a command by which the slave station designated by the status-request command informs other stations of its own status. In a case where a slave station has been designated by the master station, the slave must issue this command within a fixed period of time. This command includes the system address of the particular slave, various flags representing the absence or presence of an error, whether the slave is waiting or whether copying is in progress, and parameters indicating the type of recording paper, whether paper is available or has run out, etc. In a case where a designated slave station fails to issue a status-transfer command upon elapse of the fixed time period, the master station renders a decision to the effect that the designated slave station is not connected to the cascade system.

A print-start command having a code 01 is a command for causing transfer-destination stations to prepare for reception of image data or the like by designating the transfer-destination stations as well as the manner in which numbers of printed sheets are to be distributed among the stations of the transfer destination. This command includes parameters such as the address of the source of the image transfer, the address of the transfer destination, recording paper size and number of sheets.

A transfer-end command having a code 06 is a command by which the station which is the source of image transfer notifies other stations of the fact that transfer has ended.

Operation of cascade system

A procedure will now be described in which the image of an original placed upon a certain reader is outputted from a plurality of printers using the cascade system.

In a cascade system having four stations A, B, C, D connected thereto as shown in FIG. 20, it is assumed that an original has been placed on the reader of station A. The control panel at station A is operated to verify that the other stations are operating normally and are capable of being used. Thereafter, a setting is made so that a copy output is obtained using all of the stations A, B, C, D, and the number of copies is set as well. When a copy starting key at station A is pressed, the station A distributes the set copy number to each of the stations and sends the print-start command to all stations.

Upon receiving the print-start command, the stations B, C, D set such parameters as the number of copies and recording paper size sent together with this command, perform an image-signal changeover based upon the system address of the source of the command and their own system addresses, change over the control signals for writing image signals in their own memories 150 to control signals VCLK, HSYNC, VE sent via the video control lines and make a transition to a state in which they await an image signal.

Meanwhile, the station A performs a setting for reading the image, effects a changeover in such a manner that control signals for writing image signals in its own memory 150 emerge on the video control lines and starts the image reading operation.

The stations B, C, D write image signals in their memories 150 using the control signals outputted by the station A.

When the image reading operation is completed, the image transfer-end command is issued by the station A, and the stations A–D each undergo a transition to a printout operation.

In a case where an original is placed on the reader of any of the stations A, B, C, D, outputs utilizing a plurality of the stations can be obtained through the same procedure by operating the control panel of the station having the original.

Next, a procedure will be described in which a plurality of stations are used to obtain an output from a host computer connected to the cascade system via an external I/F device such as an IPU.

The states of all stations connected to the cascade system can be ascertained by the host computer 1009 via the IPU 1008. The host computer 1009 is operated to set the stations used, the number of copies and the recording paper, etc., in conformity with the states of the stations, and to subsequently transfer an image signal to the IPU 1008.

The IPU 1008 notifies the connected station (station A in FIG. 20) of these settings. Upon receiving this notification, the station A issues the print-start command to the other stations used. In response to reception of the print-start command, these stations stand by for an image signal through a procedure similar to that for the above-described case in which an output of an original placed upon the reader is obtained.

The station A changes over the operating mode of the interface 146 to mode 1 (or modes 2, 11, 13, 14) or the like, after which the station A issues a command so as to send an image to the IPU 1008. Control signals used in reading the image out of the IPU 1008 and in writing the image in the other stations are all generated by the station A to which the IPU is connected. Accordingly, the image data read out of the IPU 1008 is written in the memory 150 of the station A and, at the same time, is written in the memories 150 of the other stations.

The station A issues the image transfer-end command after the image writing operation, whereby each station starts performing printout.

In any of the cases described above, the print-start command is sent also to any station not selected for use. At a station not selected, the interface 146 is changed over to arrange it so that the image signal will arrive at a selected station. In other words, since the print-start command contains the address of the transfer source and the address of transfer destination, how the interface 146 should be changed over can be judged by the station by comparing these addresses with its own address. By sending a print-start command containing "NUMBER OF COPIES: 0" to an unselected station, it can be arranged so that the printing operation will now be performed at this station.

When copying is being performed individually at one station connected to the cascade system, an interrupt based upon serial communication in the cascade system is masked. In a case where this station is the master station, the master station issues its own status-transfer command and a status-request command, which is directed to each slave station, at fixed time intervals. If this station is a slave station, the station issues only its own status-transfer request at a fixed time interval. As a result, the occurrence of unnecessary interrupt processing during an individual copying operation is prevented and it is possible for a station to inform other stations of its own status.

When individual copying ends, interrupt processing based upon serial communication in the cascade system is allowed again and processing is restored for issuing a status-transfer command in response to a status-request command issued by the master station.

In the description given above, four stations are used to print out the same image. This is an arrangement in which Ns=4 stations are consolidated into one group and operate as a cascade system. However, any number Ns of stations can be consolidated into one group. In general, therefore, G1 (G1<Ns) stations among Ns (Ns ≧2) stations can be designated as a first group and operate as a cascade system. Similarly, G2 (G2<Ns) stations can be designated as a second group and operate as a cascade system. In this way stations can be organized successively until Gm (Gm<Ns) stations are designated as an M-the group. By organizing the M groups and operating them in cascade, a system can be provided in which M-types of image output can be executed in parallel.

Of course, all Ns of the stations need not be organized. Some of the Ns stations can be organized into one or a plurality of groups, each group can be made to operate in cascade and the remaining stations can be operated independently without being organized.

A case in which group operation is performed in a cascade system will be described below in detail.

Control Panel

FIG. 25 is a diagram showing the construction of the control panel 145, in which numeral 5000 denotes numeric keys, 5001 a copy start key, 5002 a stop key, 5003 a preheat key and 5005 a display unit using a liquid-crystal panel.

Figure 26:
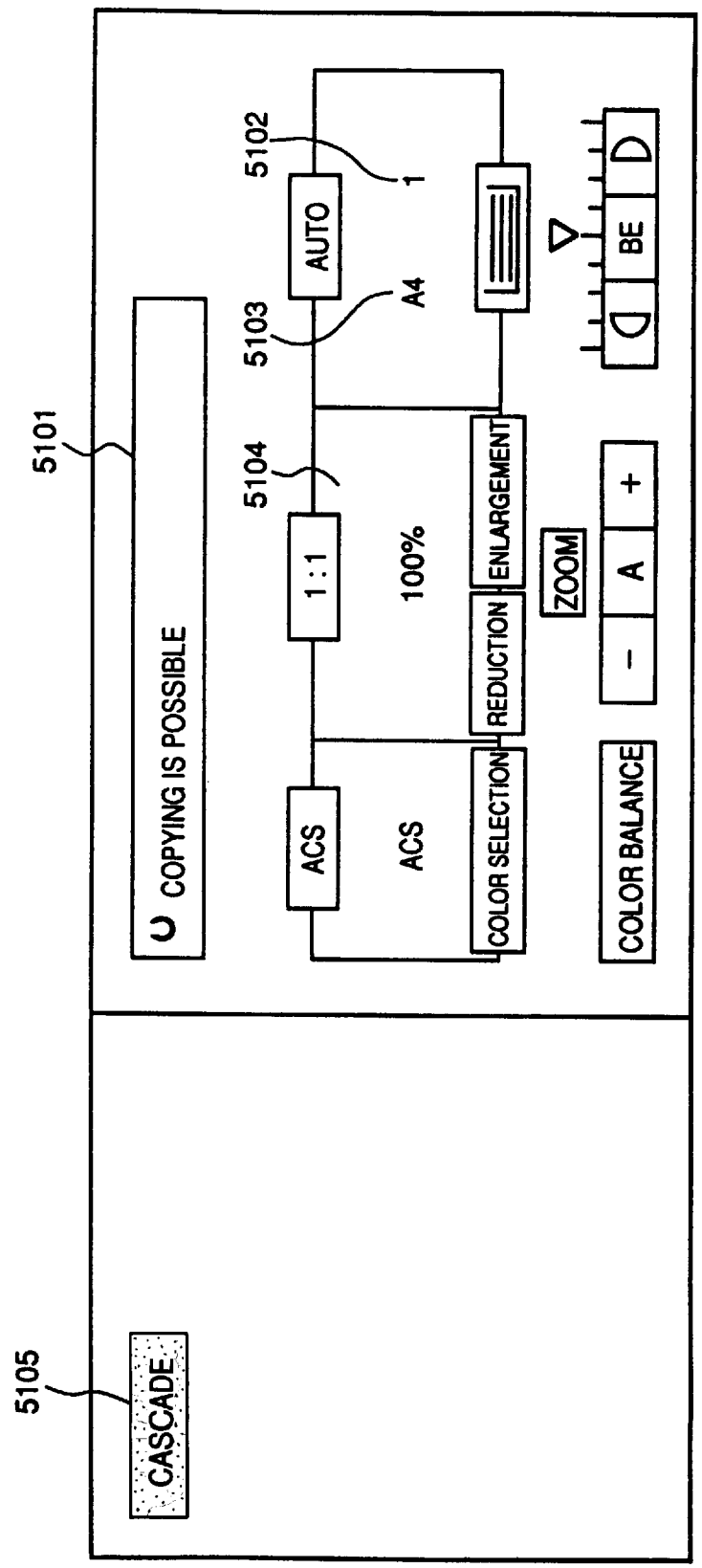
FIG. 26 is a diagram showing an example of a basic screen which appears on a display depicted in FIG. 25.

FIG. 26 is a diagram showing an example of a basic screen on the display unit 5005. Numeral 5101 denotes the status of the apparatus, 5102 the number of copies, 5103 the size of the recording paper and 5104 the value set for the copy magnification ratio. Numeral 5105 denotes a key for setting the cascade mode.

Figure 27:
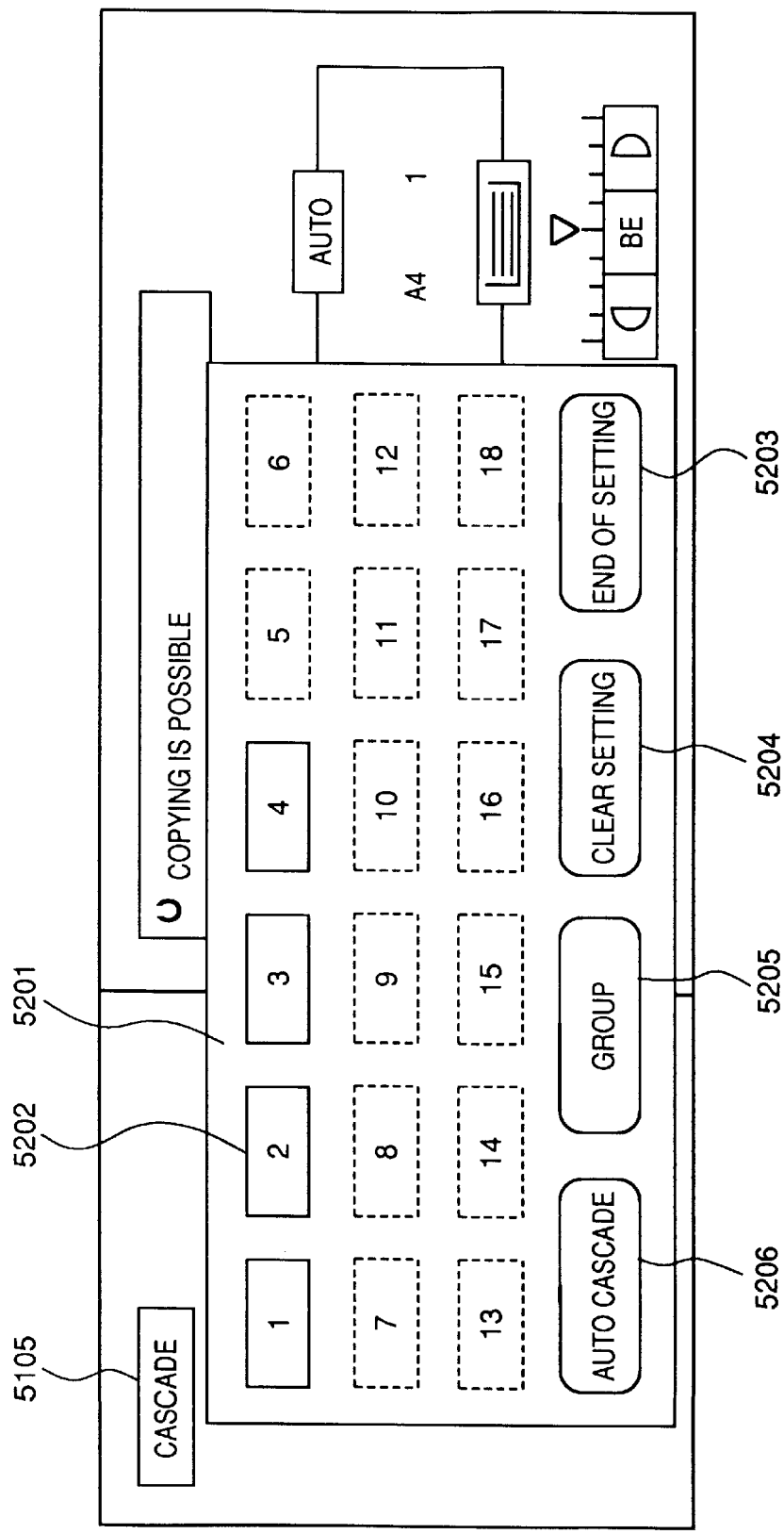
FIG. 27 is a diagram showing an example of a basic screen which appears on a display depicted in FIG. 25.

FIG. 27 is a diagram showing an example of a setting screen on the display unit 5005. This is one example of a cascade-station setting window 5201 displayed when the cascade-mode setting key 5105 shown in FIG. 26 is pressed. A general example of the display states of touch keys 5202 is shown in FIG. 28.

AS shown in FIG. 27, cascade-connected stations are indicated as touch keys 5202. For example, station A is indicated at a "1" touch key, station B at a "2" touch key, station C at a "3" touch key and station D at a "4" touch key. The status of each station is indicated on the touch keys 5202. That is, as in the example of FIG. 28, an indication to the effect that a station has been set, an indication that a station has not been connected, an indication of a station does not possess the selected recording paper size (e.g., B5), an indication to the effect that a station is exhibiting an error, is jammed or lacks toner, and an indication that a station is currently performing a copying operation are displayed on the touch keys 5202. For example, if a touch key 5202 indicating that a station is currently performing copying is pressed when it is being attempted to set this station for cascaded operation, the new setting will not be accepted. Further, if an "AUTO-CASCADE" key 5206 is pressed, all of the cascade-connected stations are set for cascaded operation in one group.

Cascade setting procedure

Figure 29:
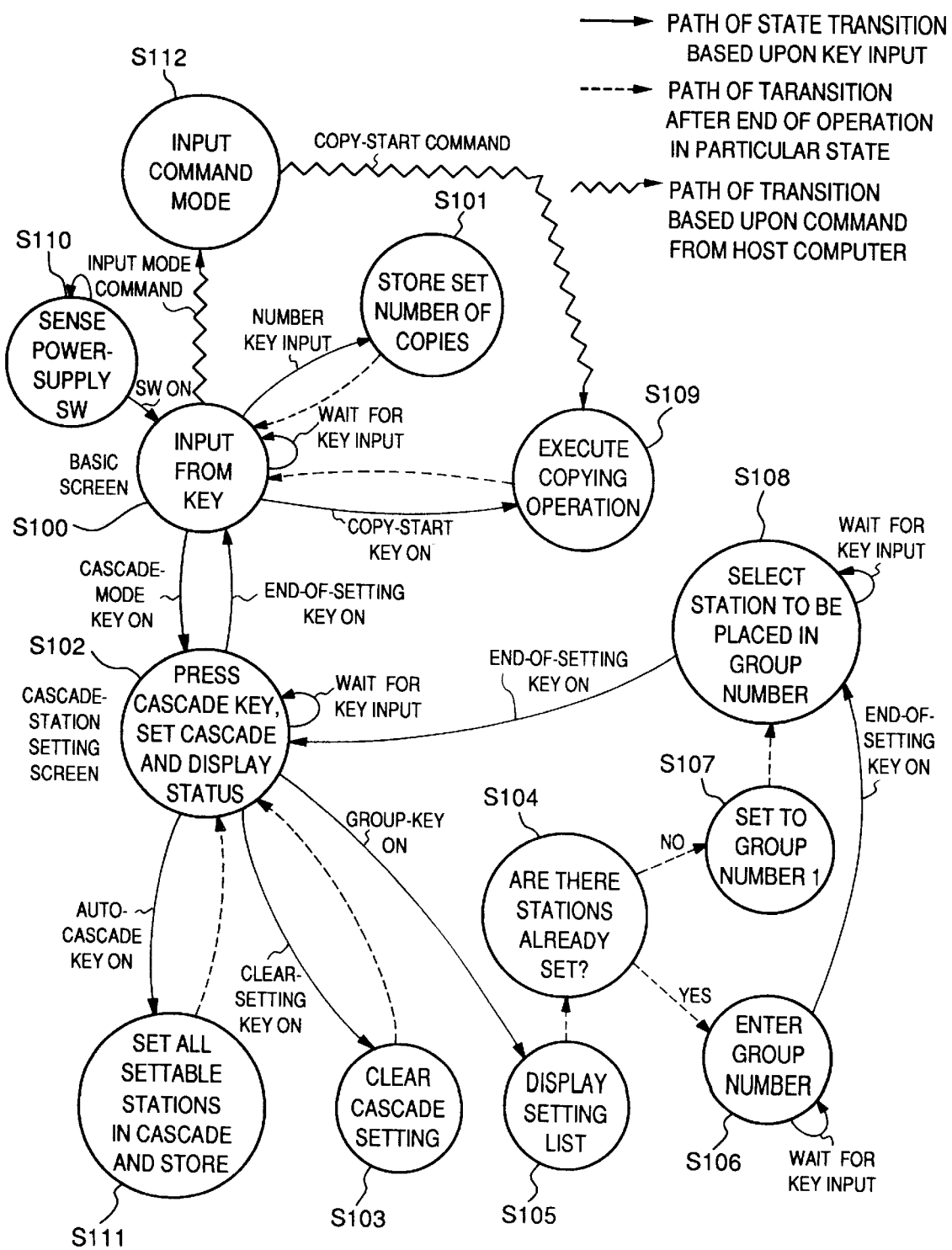
FIG. 29 is a status-transition diagram showing a cascade setting procedure according to this embodiment.

FIG. 29 is a status-transition diagram showing the cascade setting procedure. This procedure is executed by the controller 147.

By way of example, assume that four stations are cascade-connected, as shown in FIG. 20, and that an original has been placed upon the reader of each of stations A and C.

The number of copies is set (S101) by pressing a numeric key 5000 on the control panel 145 of station A, the cascade mode is selected using the basic screen (S100) of station A, and the state of connection, the state of the cascade setting and the status of the apparatus at each station are checked using the cascade-station setting screen (S102). That is, when the cascade-mode setting key 5105 on the control panel 145 of station A is pressed, the window for setting the cascade station shown in FIG. 27 is displayed (S102). The station numbers are displayed in the manner "1", "2", "3", "4" on the keys corresponding to the stations A, B, C, D. In FIG. 27, the display shows that stations A~D are capable of being set in cascade and that the stations other than stations A~D are not connected. If the "CLEAR SETTING" key 5204 is pressed, the cascade setting is cleared.

By way of example, assume that the "1" and "2" keys indicate that these stations are capable of being set, thus giving confirmation of the fact that stations A and B can be set in cascade and can be used without any abnormality, and that the "GROUP" key 5205 is then pressed. When this is accomplished, a group setting list is displayed (S105) and it is determined from the list whether there are any stations that have been set in cascade (S104). In a case where there are no stations set in cascade when the "GROUP" key 5205 is pressed, a group is set automatically as Group 1 (S107) and the operator presses the key (S108) corresponding to the station desired to be placed in Group 1 while observing the setting list and the status of the key display. A key corresponding to a selected station presents a flashing display and the key is displayed in the group setting list. Since a key begins to flash once it has been pressed, the operator can easily recognize that the numbers of the stations to be placed in the group are "1" and "2". When the operator presses the "END OF SETTING" key 5203 after verifying that no input errors have been made, the cascade setting using the stations A, B as Group 1 ends and the display returns to the screen for setting cascade stations (S102).

It should be noted that when the setting is finished, the display presented by the keys of station numbers "1" and "2" returns to the continuously lit display from the flashing display and the indication presented is that of the stations that have been set. This makes it possible for the operator to easily recognize that station numbers "1" and "2" have been set.

Upon completion of the cascade setting, the display will return to the basic screen shown in FIG. 26 if the operator presses the "END OF SETTING" 5203 again using the cascade-station setting screen (S102). It should be noted that the display of the "CASCADE" mode setting key 5105 is inverted to indicate that this station has been set in cascade. Further, a message such as one reading "CASCADE COPYING OPERATION POSSIBLE" is displayed as the apparatus status 5105.

If the copy start key 5001 at station A is pressed, the copying operation starts (S109). More specifically, station A assigns the set number of copies to the cascaded stations and issues the print-start command to station B. Upon receiving the print-start command, station B sets parameters such as the number of copies and recording paper size that are sent together with the command, changes over the image signal based upon the system address of the command source and its own system address, changes over the control signals for writing the image signal to its own memory 150 to the control signals VCLK, HSNC, VE sent in via the video control lines and then waits for the image signal.

Meanwhile, station A executes settings for reading the image, performs a changeover in such a manner that the control signals for writing the image signal to its own memory 150 are outputted on the video control lines and starts the image reading operation.

Station B writes the image signal to its own memory 150 using the control signals outputted by station A.

When the image reading operation is completed, station A issues the transfer-end command and both stations undergo a transition to a printout operation.

Thus, in a case where stations set in cascade already exist, if the operator at the control panel 145 of station C, for example, presses a numeric key 5000 to set the number of copies (S101), selects the cascade mode using the basic screen (S100), checks the connected state, cascade setting state and apparatus status at each station and then presses the "GROUP" key 5205, the group numbers that have been set and station numbers belonging to each group are displayed in a list (S105). After entering the new group number (S106) and pressing the "END OF SETTING" key 5203, the operator presses the key corresponding to the station desired to be placed in this group number (S108).

For example, by entering Group Number 1, which has already been set, and pressing the key corresponding to the station, the station to be placed in this group can be added on. If a group number not yet set is entered, a group can be set anew. That is, if the "GROUP" key 5205 is pressed, the fact that stations "1" and "2" belong to group 1 is verified from the list display and the "1" and "2" keys are displayed as stations indicating that a copying operation is in progress, as a result of which the operator confirms that a cascade copying operation is currently being performed. Accordingly, the operator enters Group Number 2 as a new group number, presses the "3" and "4" keys, which are the keys of stations capable of being set in cascade, thereby placing stations C and D in group 2, and then presses the "END OF SETTING" key 5203, thereby ending the cascade setting operation and returning the screen to the cascade-station setting screen.

Thus, four stations can be set in cascade upon being divided into groups 1 and 2.

While the image signal of the original placed upon station A is in the course of being stored in the memory 150 of each of stations A and B in the series of cascaded copying operations in group 1, the interfaces for the cascade connection are occupied with image transfer. As a consequence, the image signal of the original placed upon station C cannot be transferred to the memory 150 of station D. Accordingly, even if the operator at the control panel 145 of station C presses the copy start key 5001 upon completion of the cascade setting for group 2, a copying operation, namely transfer of the image signal to the memory 150 of each of stations C and D, is not performed immediately. The cascaded copying operation in group 2 starts after the transfer-end command is issued by station A.

In other words, station C assigns the set number of copies to stations C and D and sends the print-start command to station D. Thereafter, a cascaded copying operation is executed in group 2 in a manner similar to the cascaded copying operation of group 1. Since cascaded copying operation in group 2 is the same as that in group 1, a description thereof is omitted.

Thus, cascaded copying can be executed upon dividing four stations into two groups.

By following the same procedure, an original can be placed upon the reader of any station and printouts can be obtained utilizing a plurality of organized stations by operating the control panel of the station on which the original has been placed.

Thus, in accordance with this embodiment, a plurality of digital copiers connected in a system can be organized into one group or a plurality of groups by commands and signals, related to group operation, sent and received between digital copiers connected in a cascade system via communication I/Fs, thereby making it possible to provide an image processing apparatus capable of cascaded operation on a group-by-group basis, as well as an image processing system composed of these image processing apparatus. This eliminates the problem encountered in the prior art, namely the fact that the system cannot be expanded flexibly as necessary, and makes it possible to obtain copies efficiently while operability is improved.

Other applications

Figure 30:
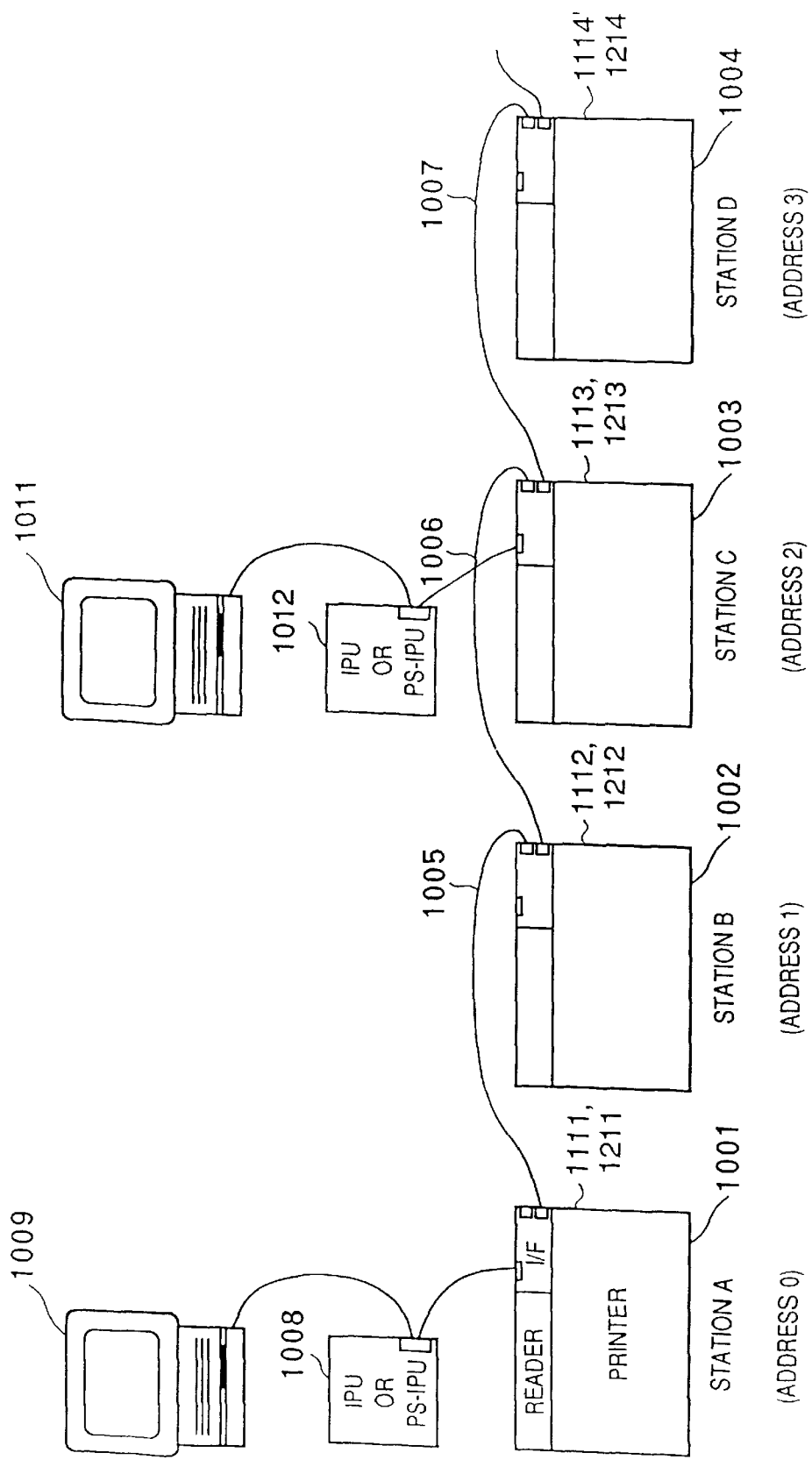
FIG. 30 is a diagram for describing another application of this embodiment.

A procedure will now be described in which an output from a host computer connected via an external I/F device such as an IPU to a digital copier constituting a cascade system is obtained from a plurality of cascade groups using a plurality of stations. In order to simplify the description, a case will be described in which stations A and B belong to group 1, as shown in FIG. 30, the computer 1009 is connected to station A via the IPU 1008, stations C and D belong to group 2, and a computer 1011 is connected to station C via an IPU 1012.

The computer 1009 ascertains, via the IPU 1008, the states of all stations connected to the cascade system. Similarly, the computer 1009 ascertains, via the IPU 1012, the states of all stations connected to the cascade system.

The operator operates the computer 1009 to set, in dependence upon the status of the cascade system, the stations used in group 1, the number of copies and the size of the recording paper, etc., and sends an image signal to the IPU 1008 along with these settings. The IPU 1008 informs the station A of these settings, in response to which station A sends the print-start command to the other station B used in the group. Upon receiving this command, the station B waits for the image signal through a procedure similar to that described above for printing out the image of the original placed upon the reader.

Station A changes over the operating mode of the interface 146, e.g., to mode 14 (from IPU-I/F 401 to R-I/Fs 402, 403 and video-I/F 405), after which it requests the IPU 1008 for the image signal. At this time the video control signals used in reading the image signal out of the IPU 1008 and writing the image in station B are generated by station A.

The image signal outputted by the IPU 1008 is written in memory 150 of station A and in the memory 150 of station B at the same time. When the writing of the image signal ends, station A issues the transfer-end command and both stations start printing.

Thus, cascaded operation is executed in group 1.

If a cascade system setting is performed at the computer 1011 during the cascaded operation of group 1, operation is as follows:

When the status of the cascade system is verified by an operation performed at computer 1011, a display is presented to the effect that stations A and B have already been set in cascade and that cascaded operation is currently in progress. This allows the operator to ascertain that neither of these stations can be used. In conformity with this status of the cascade system, the operator sets stations C and D as group 2, sets the number of copies and the size of the recording paper and sends the image signal to the IPU 1012 along with these settings. The IPU 1012 notifies the station C of these settings and, in response, the station C sends the print-start command to the other station D used. Upon receiving this command, station D waits for the image signal through a procedure similar to that described above for printing out the image of the original placed upon the reader.

Station C changes over the operating mode of the interface 146, e.g., to mode 14 (from IPU-I/F 401 to R-I/Fs 402, 403 and video-I/F 405), after which it requests the IPU 1012 for the image signal. At this time the video control signals used in reading the image signal out of the IPU 1012 and writing the image in station D are generated by station C.

The image signal outputted by the IPU 1012 is written in memory 150 of station C and in the memory 150 of station D at the same time. When the writing of the image signal ends, station C issues the transfer-end command and both stations start printing.

Thus, cascaded operation is executed in group 2 and, by virtue of operating the computers 1009 and 1011, printouts can be obtained utilizing a plurality of organized stations.

Thus, in accordance with this embodiment, efficient cascaded operation is possible even in a case where an image signal from a computer connected to a cascade system via an external I/F device is printed out.

Third Embodiment

An image processing apparatus and an image processing system according to a third embodiment of the invention will now be described. Components of the third embodiment similar to those of the foregoing embodiments are designated by like reference characters and need not be described in detail again.

Figure 31:
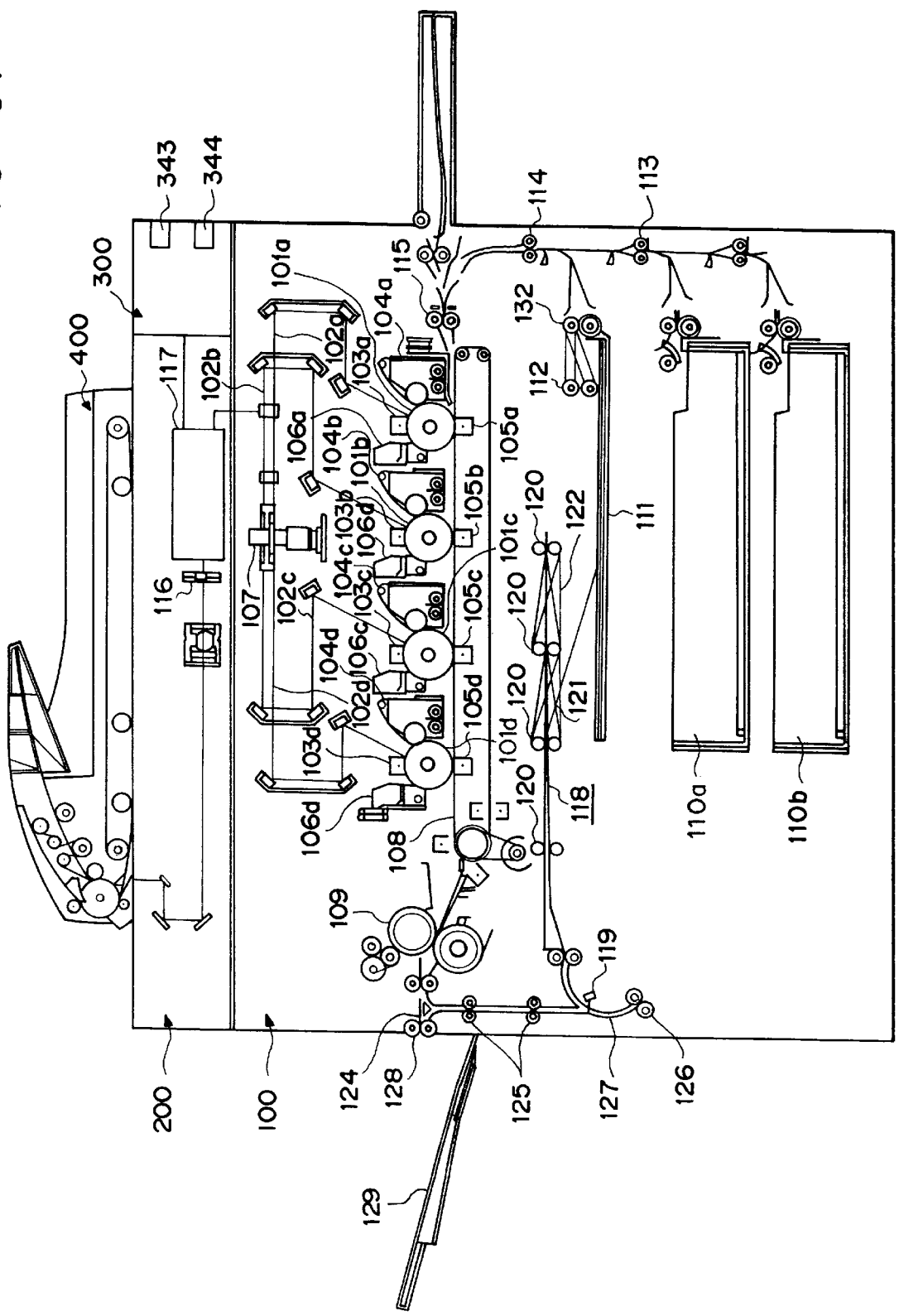
FIG. 31 is a diagram showing the construction of an image processing apparatus (a digital copier) according to a second embodiment of the present invention.

FIG. 31 is a diagram showing the construction of an image processing apparatus (a digital copier) according to this embodiment.

As shown in FIG. 31, the apparatus includes a printer 100, a reader 200, an interface 300 and an original feeder 400. The interface 3000 has an external input terminal 343 and an external output terminal 344 for connection to another station. A cascade system is constructed by using these terminals to output image information read by the reader 200 to an external device and input image information, which has been sent from the external device, to the apparatus' own image processing section.

The printer 100 has a construction similar to that of the printer of the first embodiment shown in FIG. 1 and the details thereof need not be described again. The interface 300 has a construction similar to that of the second embodiment described with reference to FIGS. 21 and 22 and the details thereof need not be discussed again.

Construction of reader

Figure 32:
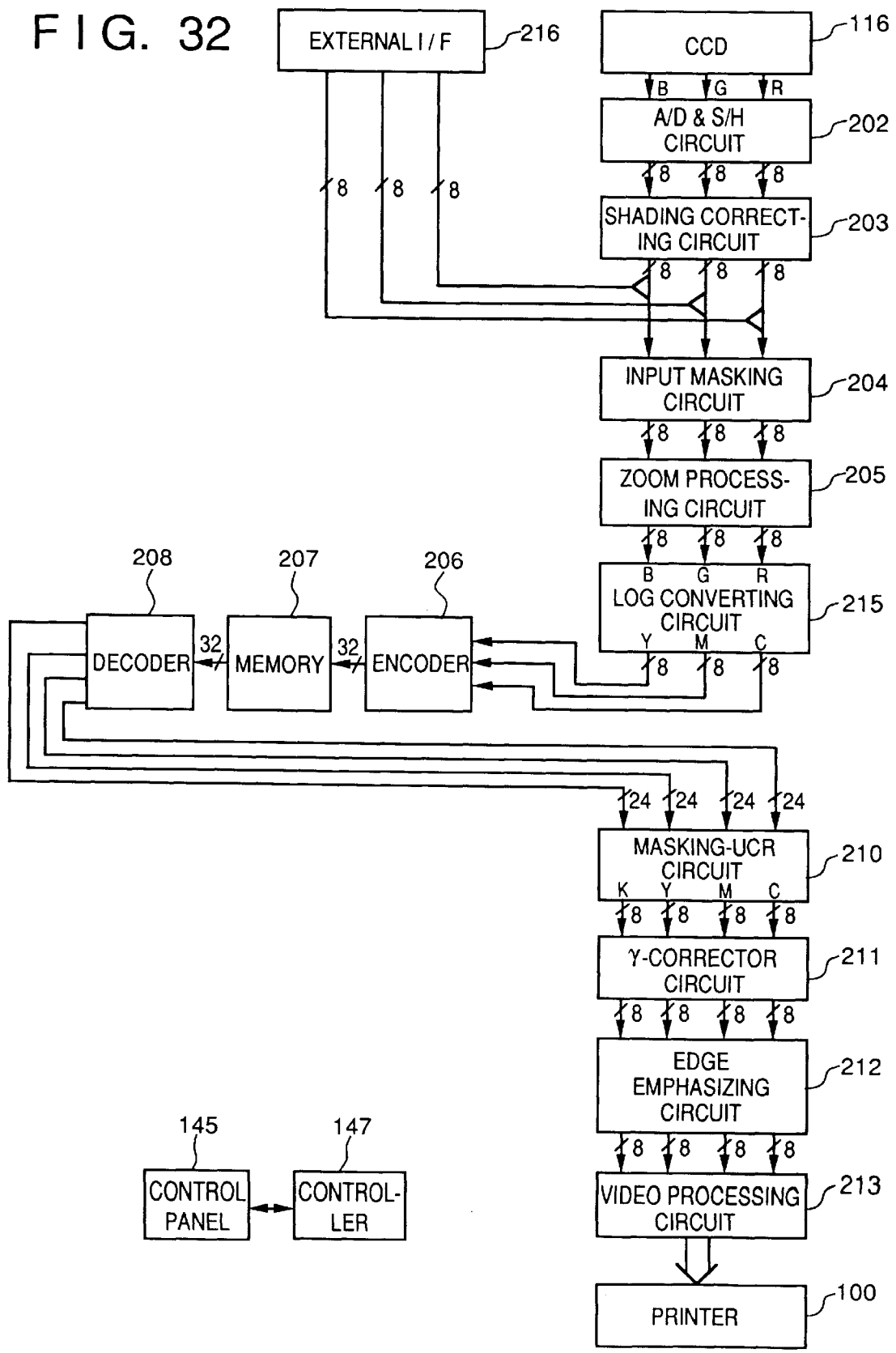
FIG. 32 is a block diagram showing the construction of a reading section depicted in FIG. 31.

FIG. 32 is a block diagram showing the construction of the reader 200.

The reader 200 has a construction substantially the same as the image processor 117 shown in FIG. 2 and processing blocks having the same functions need not be described in detail again. The reader 200 shown in FIG. 32 differs from the image processor 117 of FIG. 2 in terms of the interface for exchanging image signals with external devices. That is, the reader 200 is equipped with an external I/F 216 for transmitting RGB image signals outputted by the shading correcting circuit 203 to the external device and entering RGB image signals received from the external device to the input masking circuit 204.

Construction of cascade system

The system configuration obtained by cascade-connecting digital copiers in this embodiment is similar to that of the second embodiment of FIG. 20 and need be described again in detail.

FIG. 33 is a diagram showing the main commands used in serial communication in the cascade system of this embodiment. These commands are substantially the same as those described earlier in connection with FIG. 24 of the second embodiment. Here, however, an additional command is a double-side mode setting command which the master issues in order to set the entirety of a cascade-connected station group (or a station group capable of operating in cascade) to the double-sided printing mode.

Double-sided copying in cascade system

Figure 34:
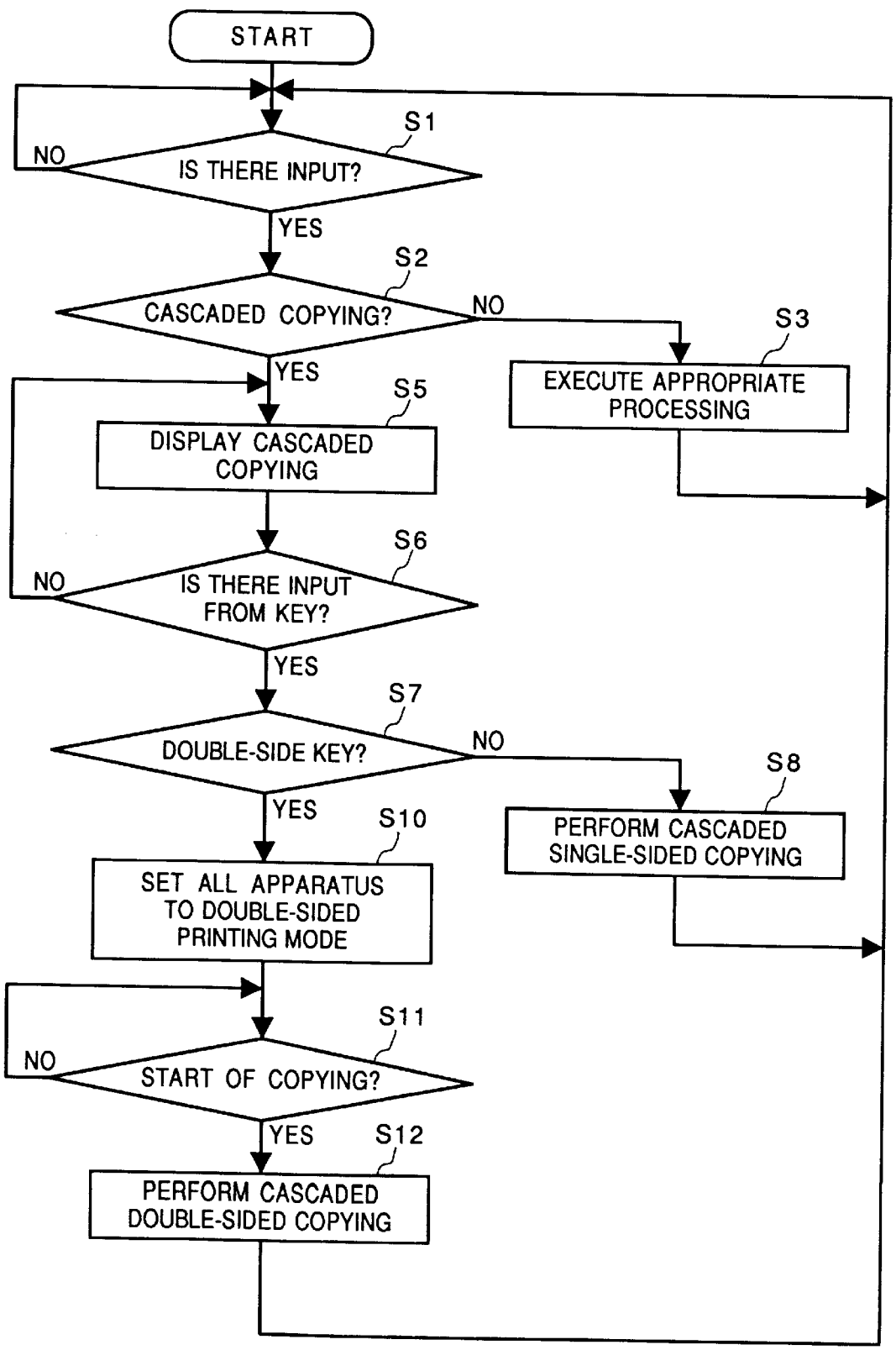
FIG. 34 is a flowchart for describing a double-sided copying procedure performed by the cascade system of this embodiment.

FIG. 34 is a flowchart for describing a double-sided copying procedure performed by the cascade system of this embodiment. This procedure is executed by the controller 47 after the power supply is turned on or upon completion of initializing processing after a resetting operation.

Figure 35:
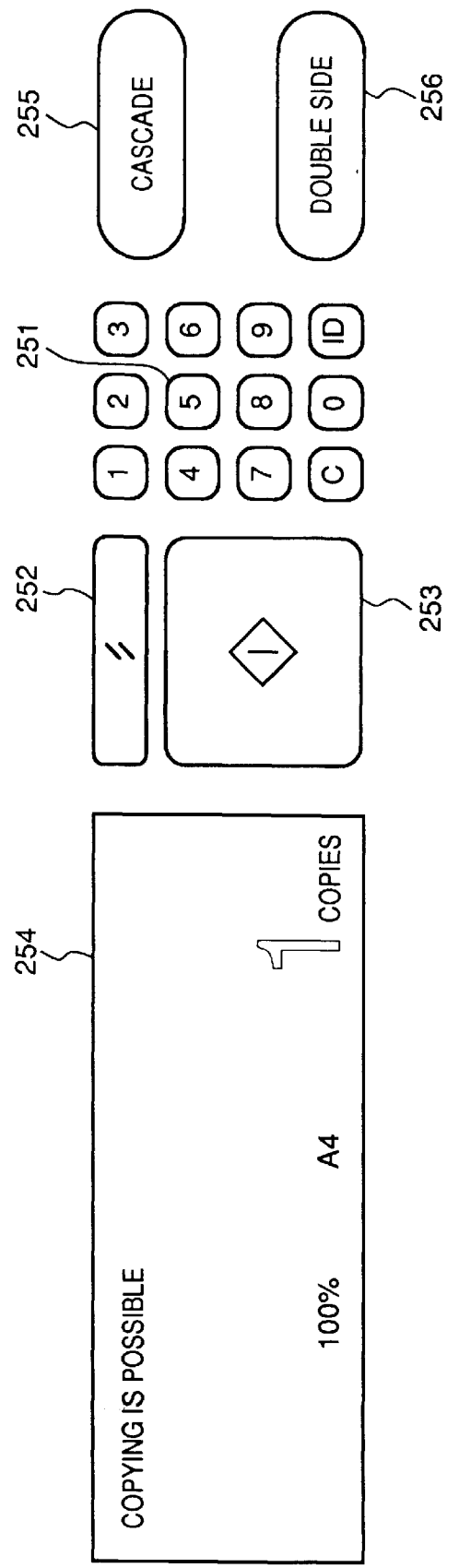
FIG. 35 shows an example of a display on a master-station display unit at step S1 in FIG. 34.

As step S1 in FIG. 34, monitoring is performed to determine whether there has been an input from the control panel 145 or reception of a signal from another station. FIG. 35 shows an example of a display presented on the control panel 145 of the master station under these conditions. Shown in FIG. 35 are numeric keys 251, a reset key 252, a copy start key 253 and a display unit 254 which uses an LCD. The display shown in FIG. 35 is one example. Also shown are a "CASCADE" key 255 for performing a cascaded operation, and a "DOUBLE SIDE" key 256 for establishing the double-sided copying mode. Further, the display unit 254 has touch-panel keys corresponding to the display. Inputs from the touch-panel keys are handled no differently from inputs entered by the hardware keys such as the numeric keys 251 and copy start key 253.

If there is an input from the control panel 215 or a reception request from another station when the prevailing display is as illustrated, the program proceeds to step S2, where it is determined whether the "CASCADE" key has been pressed, i.e., whether cascaded copying has been designated. If cascaded copying has not been designated, then the program proceeds to step S3, at which control in accordance with the particular input or request is executed. The program then returns to step S1.

Figure 36:
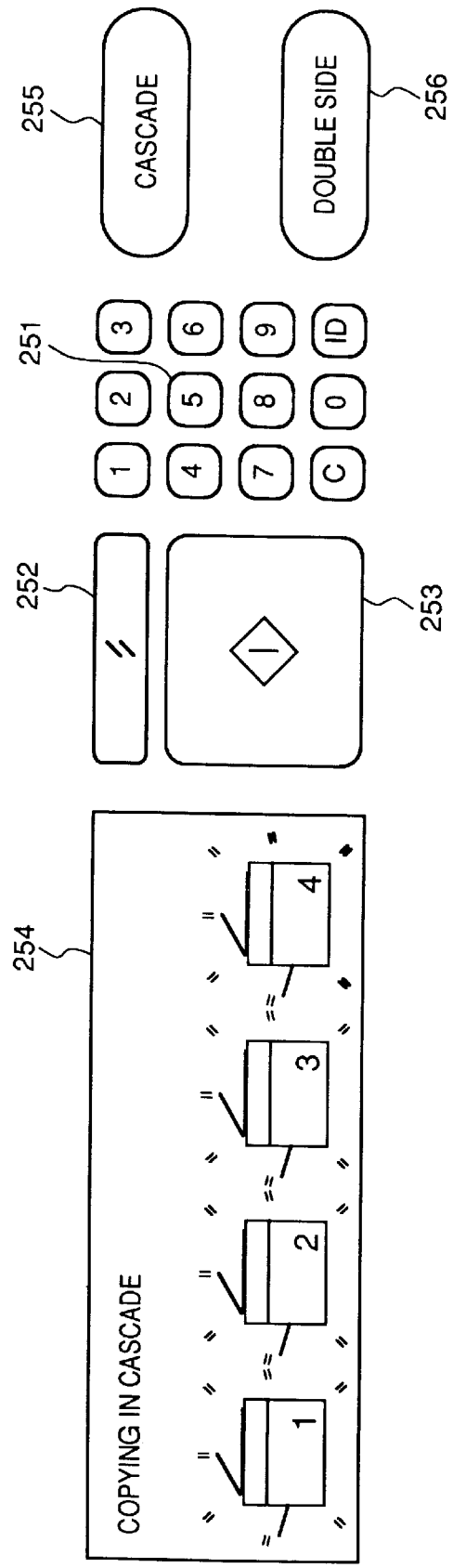
FIG. 36 shows an example of a display on a master-station display unit at step S5 in FIG. 34.

If cascaded copying has been designated, the program proceeds to step S5, at which a screen for designating cascaded copying shown in FIG. 36 is presented on the display unit 254. This is followed by step S6, at which the next input is awaited. More specifically, icons of a group of cascade-connected stations and a message reading "COPYING IN CASCADE" are displayed on the display unit 254. At this time all of the icons are in the flashing state.

The operator sets an original to be copied on the reader 200 of the master station and either presses the copy start key to designate the start of copying or selects the double-sided copy mode by pressing the "DOUBLE SIDE" key 256 and then designates the start of copying. In other words, if there is a key input at step S6, it is determined at step S7 whether the copy start key 253 or "DOUBLE SIDE" key 256 has been pressed. If the copy start key 253 has been pressed, then the program proceeds to step S8, at which the master station executes a cascaded single-sided copying operation and all of the other stations execute a cascaded single-sided printing operation, after which the program returns to step S1.

If the "DOUBLE SIDE" key 256 has been pressed, then the program proceeds to step S10, at which the master station issues a double-sided mode setting command to set the entire group of cascade-connected stations to the double-sided printing mode. This is followed by step S11, at which the apparatus waits for the copy start key 253 to be pressed.

Figure 37:
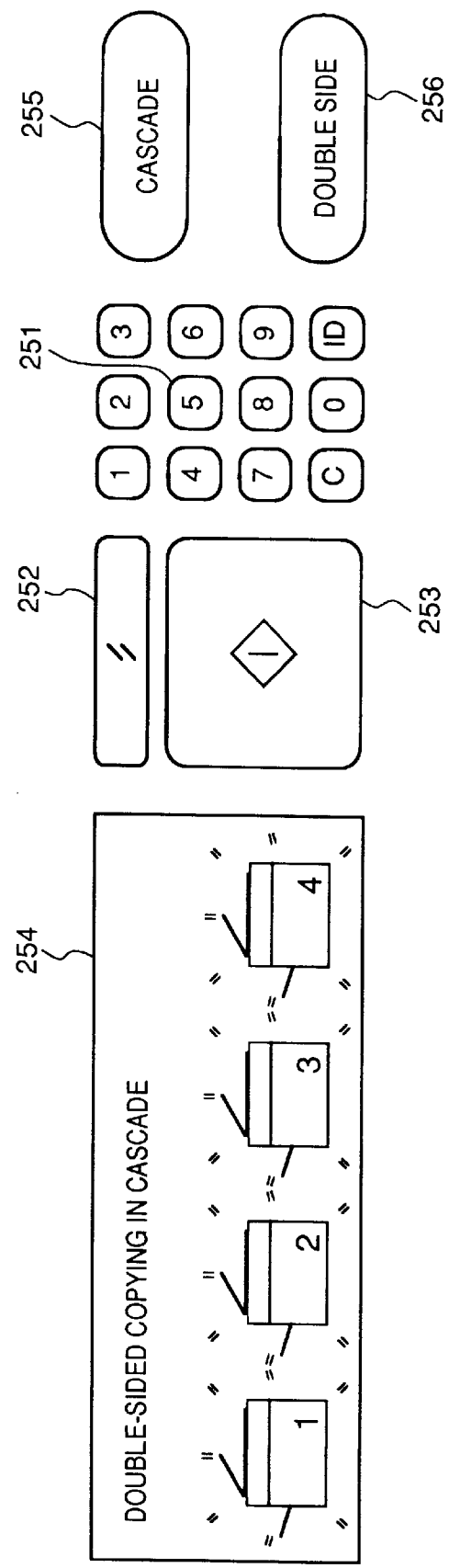
FIG. 37 shows an example of a display on a master-station display unit at step S12 in FIG. 34.

When the copy start key 253 is pressed, the program proceeds to step S12, at which the master station starts a cascaded double-sided copying operation and the other stations all start operating in the double-sided printing mode. At this time a message reading "DOUBLE-SIDED COPYING IN CASCADE" shown in FIG. 37 is presented on the display unit 254.

When double-sided copying is thus executed and all processing ends, the program returns to step S1 and the apparatus waits for the next input. At this time each station set to the double-sided printing mode is restored to the ordinary mode.

Thus, in accordance with this embodiment, all of the stations in a cascade-connected group can be utilized for double-sided copying by designating double-sided copying at the master station of the cascade system. Accordingly, the operability of the cascade system can be improved and the copying speed can be raised. Furthermore, double-sided copying can be executed with ease. This makes it possible exploit paper resources effectively.

First Modification

In the third embodiment, an example is described in which, when double-sided copying is designated at the master station, all of the other stations are set to the double-sided printing mode automatically. However, the invention is not limited to this embodiment. Even if a group of cascade-connected stations includes a mixture of apparatus capable of double-sided printing and apparatus not having this capability, a copying operation conforming to the nature of each apparatus can be executed. Such an image processing system will now be described as a first modification.

In this modification also, processing other than that relating to double-sided copying in the cascade mode is the same as that of the procedure shown in FIG. 34. In other words, the processing of steps S10 through S12 in FIG. 34 are different in this modification. More specifically, if it is determined at step S7 that the "DOUBLE SIDE" key has been pressed, then the master station at which the key has been pressed searches the group of cascade-connected stations for stations capable of double-sided copying (or the stations may be searched for in advance). If there are stations that are incapable of double-sided copying, then the icon of this station on the display unit 254 is changed from the flashing state to the extinguished state, as shown in FIG. 38.

Figure 38:
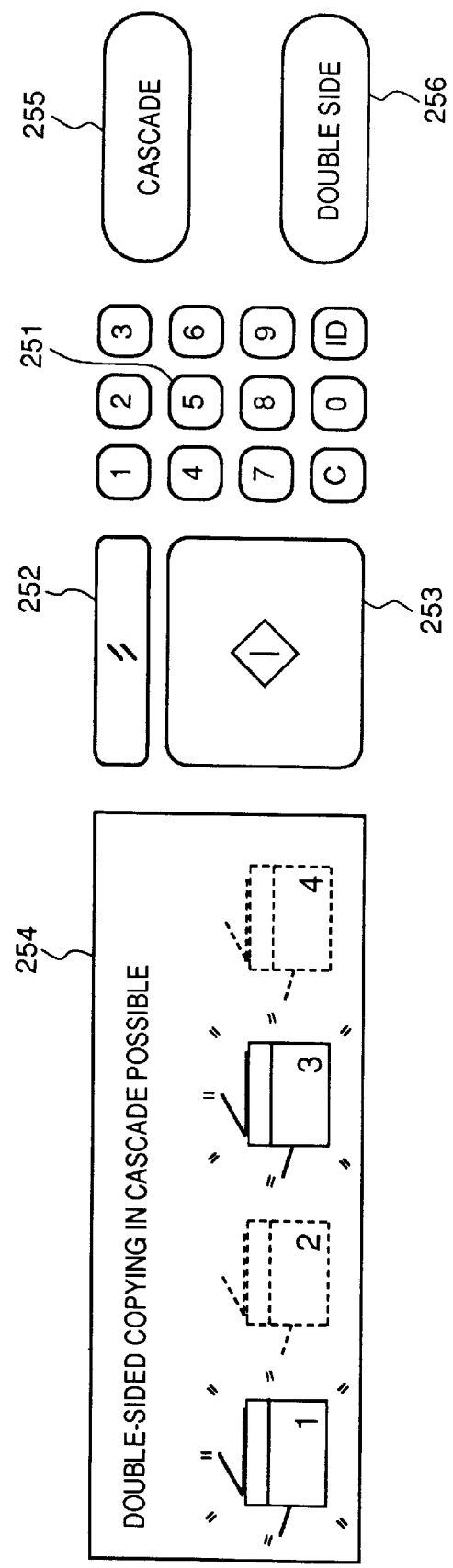
FIGS. 38 and 39 are examples of displays on a master-station display unit in a first modification.

In the example of FIG. 38, stations "1" and "3" are capable of double-sided copying but stations "2" and "4" are not and these icons are extinguished.

When the copy start key 253 is pressed, the cascaded double-sided copying operation is executed by the stations capable of double-sided copying, namely by the stations "1" and "3". At this time the message presented on the display unit 254 changes from "DOUBLE-SIDED COPYING IN CASCADE POSSIBLE" shown in FIG. 38 to "DOUBLE-SIDED COPYING IN CASCADE" shown in FIG. 39.

Thus, even in a cascade system which includes stations incapable of double-sided copying, these stations are specified and the specified stations can be excluded from the double-sided copying operation automatically.

Second Modification

In the third embodiment described above, all cascade-connected stations are selected automatically to produce outputs. In the first modification as well, all stations capable of performing output processing are selected automatically to produce outputs. However, the invention is not limited to this example, for any cascade-connected station can be adopted to produce an output. Such an image processing system will now be described as a second modification.

Figure 40:
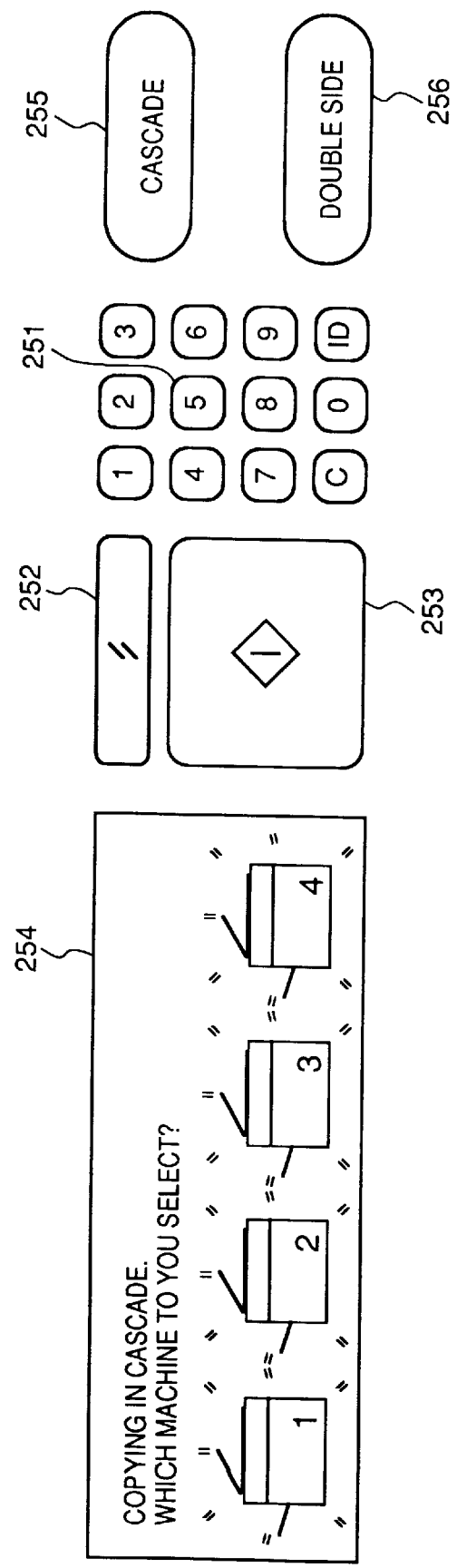

In this modification, the display shown in FIG. 40 is presented at the time of the cascade copying display of step S5 shown in FIG. 34, and the operator is made to select the station that is to perform the copying operation. In other words, the operator checks the icons flashing on the display unit 254. If, say, the operator wishes to have the copying operation performed by the three stations "1", "2" and "3" among the four stations that are connected in cascade, then the operator presses the icon positions of these stations, thereby designating these stations for the copying operation. It should be noted that the same setting operation can be performed by pressing the "1", "2" and "3" keys of the numeric keys 251 instead of pressing the icons.

When the copy start key 253 is pressed, the display unit 254 becomes as shown in FIG. 41. Here the icons corresponding to the three stations "1", "2" and "3" are displayed and the cascaded copying operation is executed by these stations. The icon of the unselected station "4" is extinguished.

It should be noted that the icons in FIG. 40 may be placed in the extinguished state (except that the station numbers are displayed) and the icons of the selected stations made to flash.

Thus, the operability of a cascade system can be improved further by selecting any cascade-connected station to produce an output. Furthermore, in a case where the double-sided copying operation has been designated and a selected station is incapable of double-sided copying, this station is excluded automatically. This is the same as in the second modification.

Fourth Embodiment

An image processing apparatus and an image processing system according to a fourth embodiment of the invention will now be described. Components of the fourth embodiment similar to those of the foregoing embodiments are designated by like reference characters and need not be described in detail again.

The system configuration and the constructions of the reader 200, printer 100, interface 300 and control panel 145 of this embodiment are similar to those in the first, second or third embodiment and the details thereof need not be described again.

FIG. 42 is a diagram showing the main commands used in serial communication in the cascade system of this embodiment. These commands are substantially the same as those described earlier in connection with FIG. 24 of the second embodiment. Here, however, an additional command is a paper/magnification setting command issued by the master and containing information relating to enlargement/reduction magnification ratio, paper selection and set mode.

Figure 43:
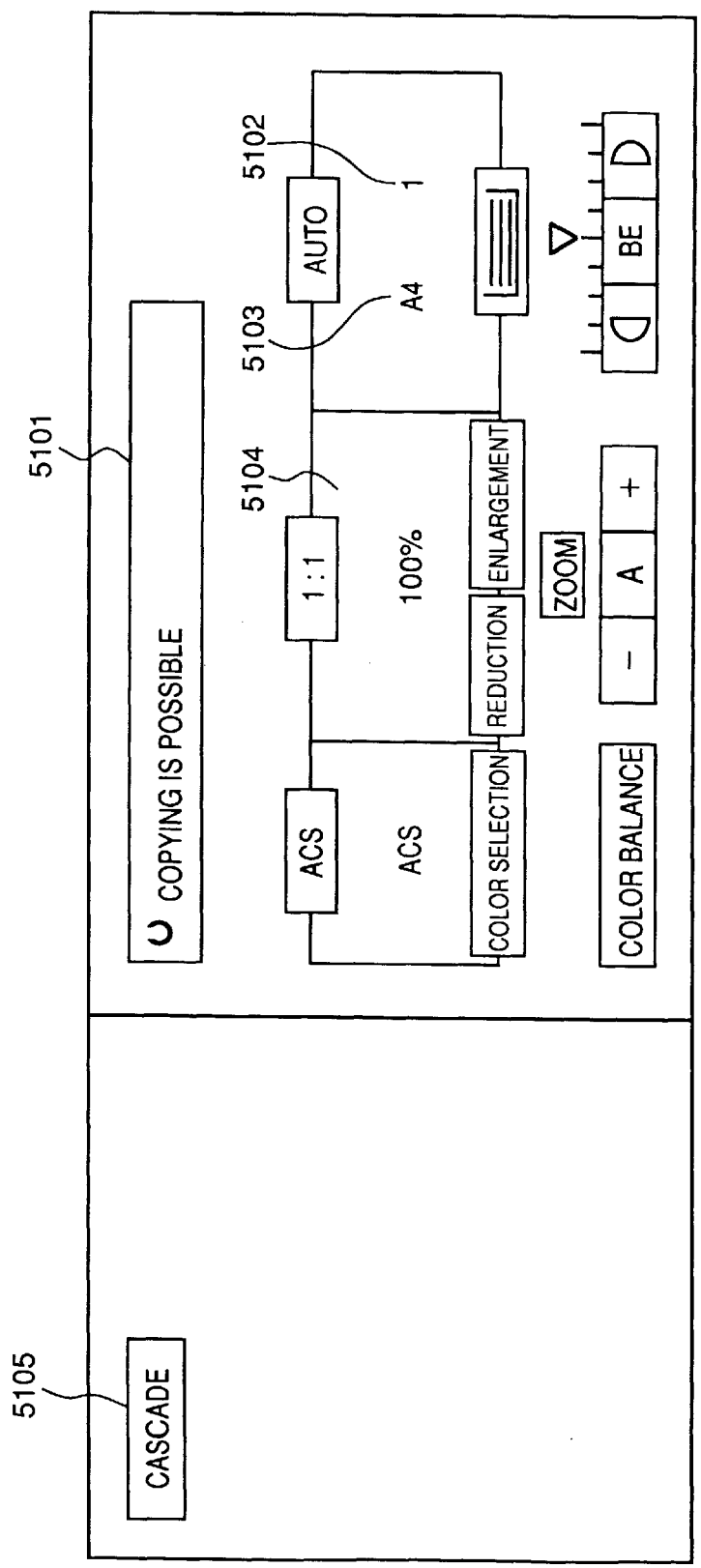
FIG. 43 is a diagram showing an example of a basic screen presented on a display unit.

FIG. 43 is a diagram showing an example of the basic screen on display unit 5005. Numeral 5101 denotes the status of the apparatus, 5102 the number of copies, 5103 the size of the recording paper and 5104 the value set for the copy magnification ratio. Numeral 5105 denotes the key for setting the "CASCADE" mode.

In the initial state, the message indicating the status of the apparatus at 5101 reads "COPYING POSSIBLE" and the background of the "CASCADE" mode setting key 5105 appears white, as shown in FIG. 43. If the operator presses the "CASCADE" mode setting key 5105 at any station under these conditions, this station itself becomes the command transmitting side, namely the master station, and the other stations become the command receiving sides or the slave stations. When a code for changeover to the cascade mode has been sent, an independently operating station shifts to the cascade mode as soon as this operation is finished.

Figure 44:
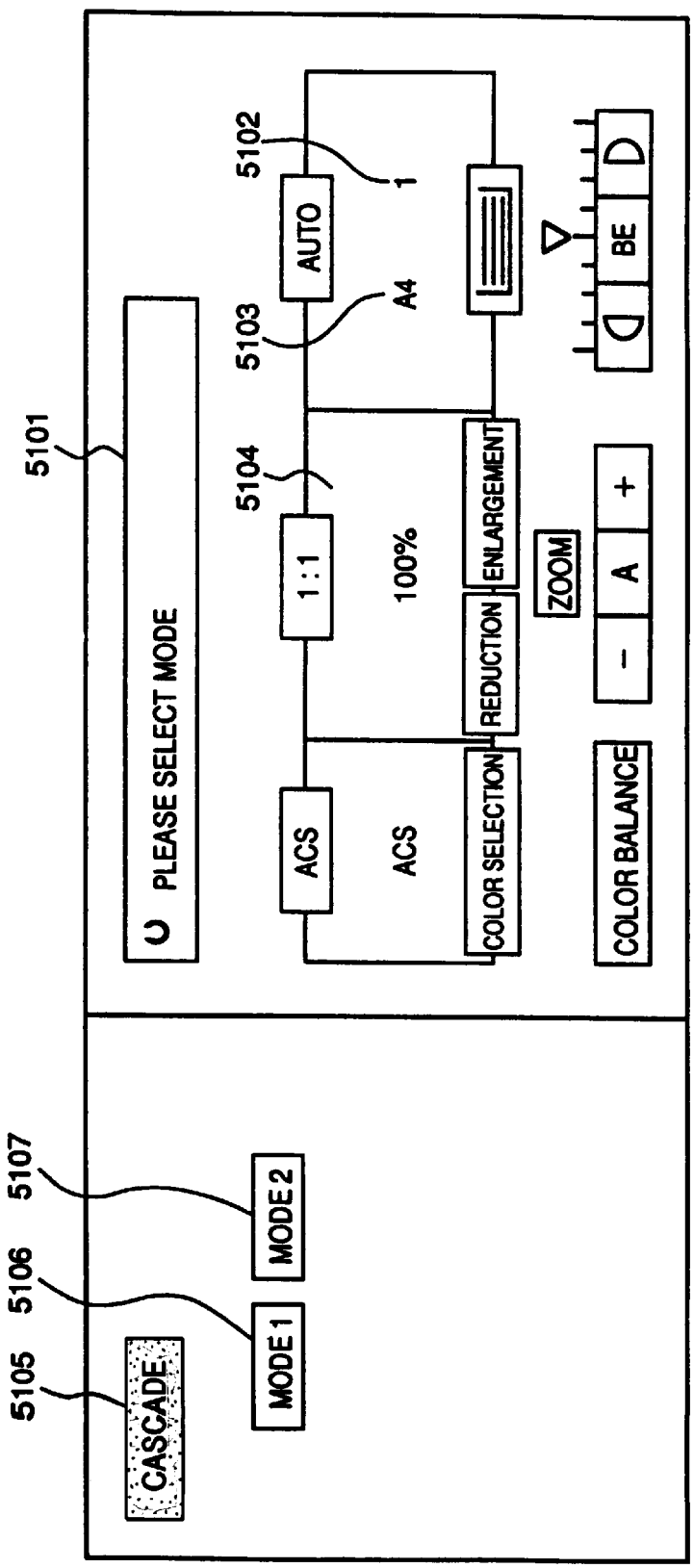
FIG. 44 is a diagram showing a mode setting screen presented on the display unit.

The display presented on the display unit 5005 becomes as shown in FIG. 44, the message indicating the status of the apparatus at 5101 now reads "PLEASE SET MODE" and the "CASCADE" mode setting key 5105 now is inverted so that the background appears black. At the same time, a "MODE 1" key 5106 and a "MODE 2" key 5107 are displayed.

Figure 45:
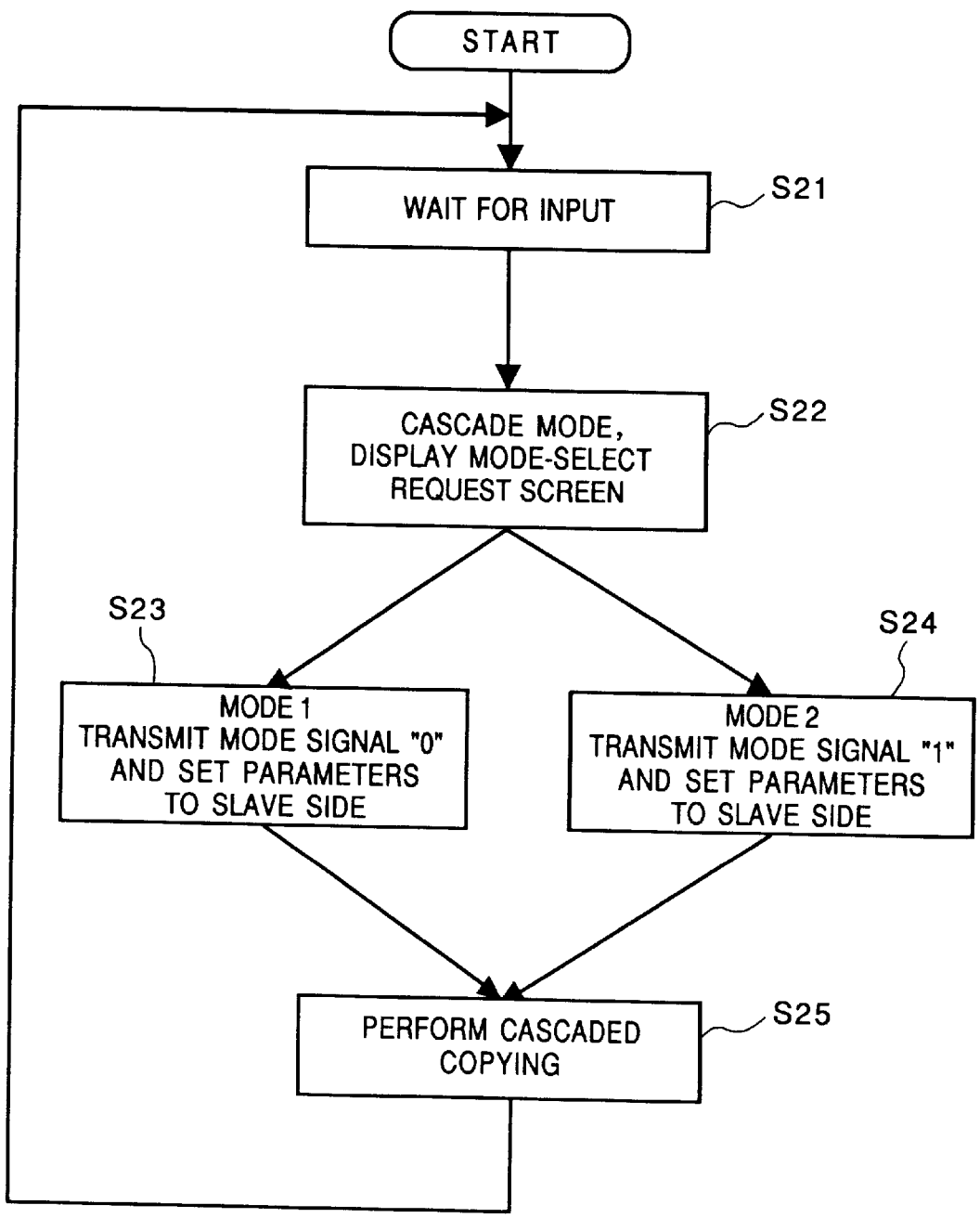
FIGS. 45 and 46 are flowcharts showing a procedure for selecting an enlargement/reduction magnification ratio and paper when a cascade mode is in effect.

A procedure for selecting the enlargement/reduction magnification ratio and the paper at the time of the cascade mode will now be described with reference to FIGS. 45 and 46. FIG. 45 shows the procedure on the master side and FIG. 46 the procedure on the slave side. These procedures are executed by the controller 147.

The master waits for an input at step S21 in FIG. 45. When the "CASCADE" mode setting key 5105 is pressed, the master shifts to the cascade mode at step S22 and displays the mode selecting screen shown in FIG. 44 as the display screen on the display unit 5005. Meanwhile, on the slave side which has received the indication for changeover to the cascade mode, the program proceeds from the state in which an input is awaited at step S31 in FIG. 46 to step S32, at which the slave waits for the paper/magnification setting command to be sent from the master.

If the operator presses the "MODE 1" key or the "MODE 2" key displayed on the display section 5005 of the master under these conditions, the master shifts the program to step S23 or S24.

Figure 47:
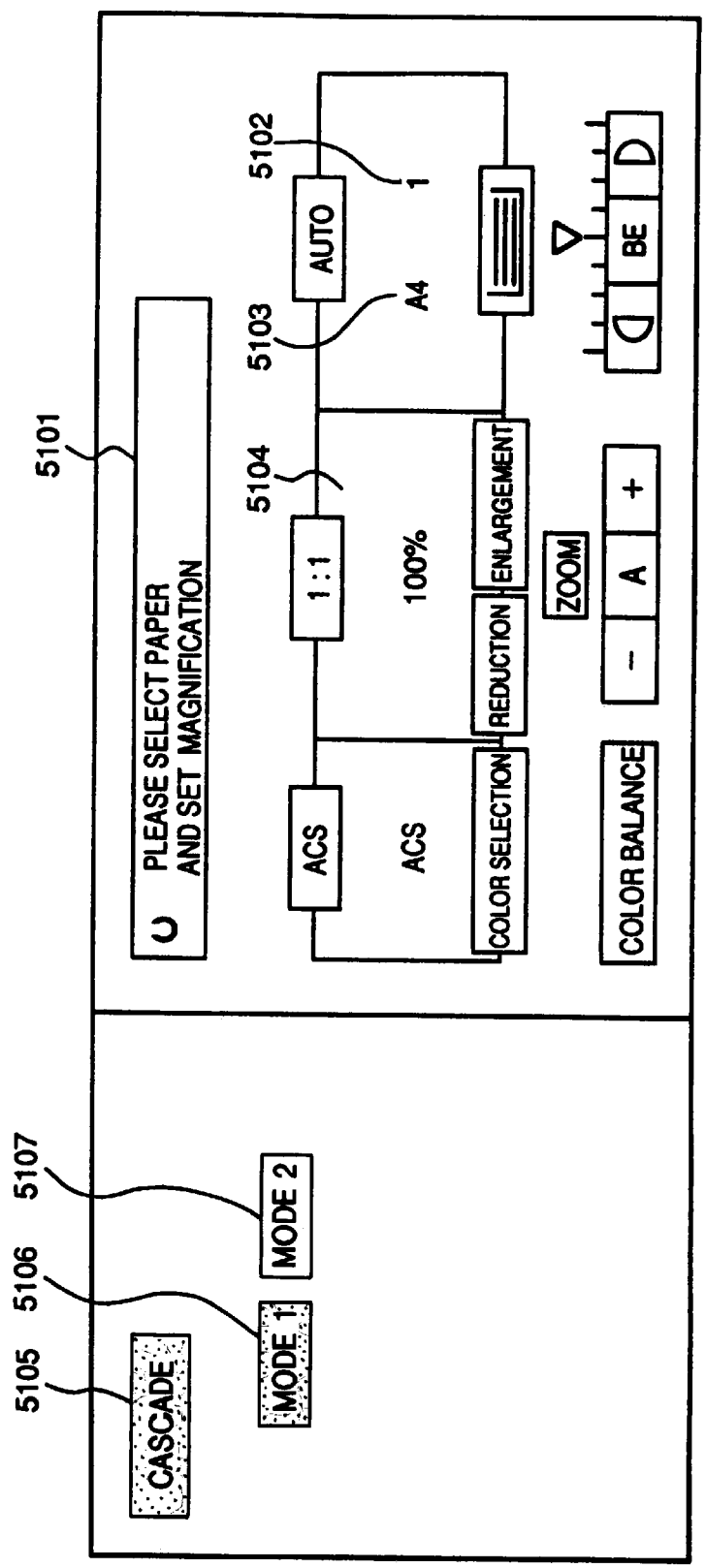
FIG. 47 is a diagram showing a display unit when a Mode 1 is selected.

More specifically, in the case where mode 1 has been selected, a mode signal "0" and the present set parameters (enlargement/reduction magnification ratio and paper selection) are sent to the slave side by the paper/magnification setting command at step S23, and the screen shown in FIG. 47 is displayed on the display panel 5005. In this case, since mode 1 has been selected, the "MODE 1" key 5106 is displayed against a black background and the message indicating the status of the apparatus at 5101 reads "PLEASE SELECT PAPER AND SET MAGNIFICATION". If there is an input from the operator, the set parameters are again sent to the slave side by the paper/magnification setting command. This state continues until the copy start key 5001 is pressed and cascade copying starts at step S25.

When the slave side receives the mode signal "0" by the paper/magnification setting command at step S32, the program proceeds to step S33, where the state of mode 1 is attained and the slave sets itself based upon the set parameters received from the master. This state continues until the copy start key 5001 is pressed on the master side and cascade copying starts at step S35.

Figure 48:
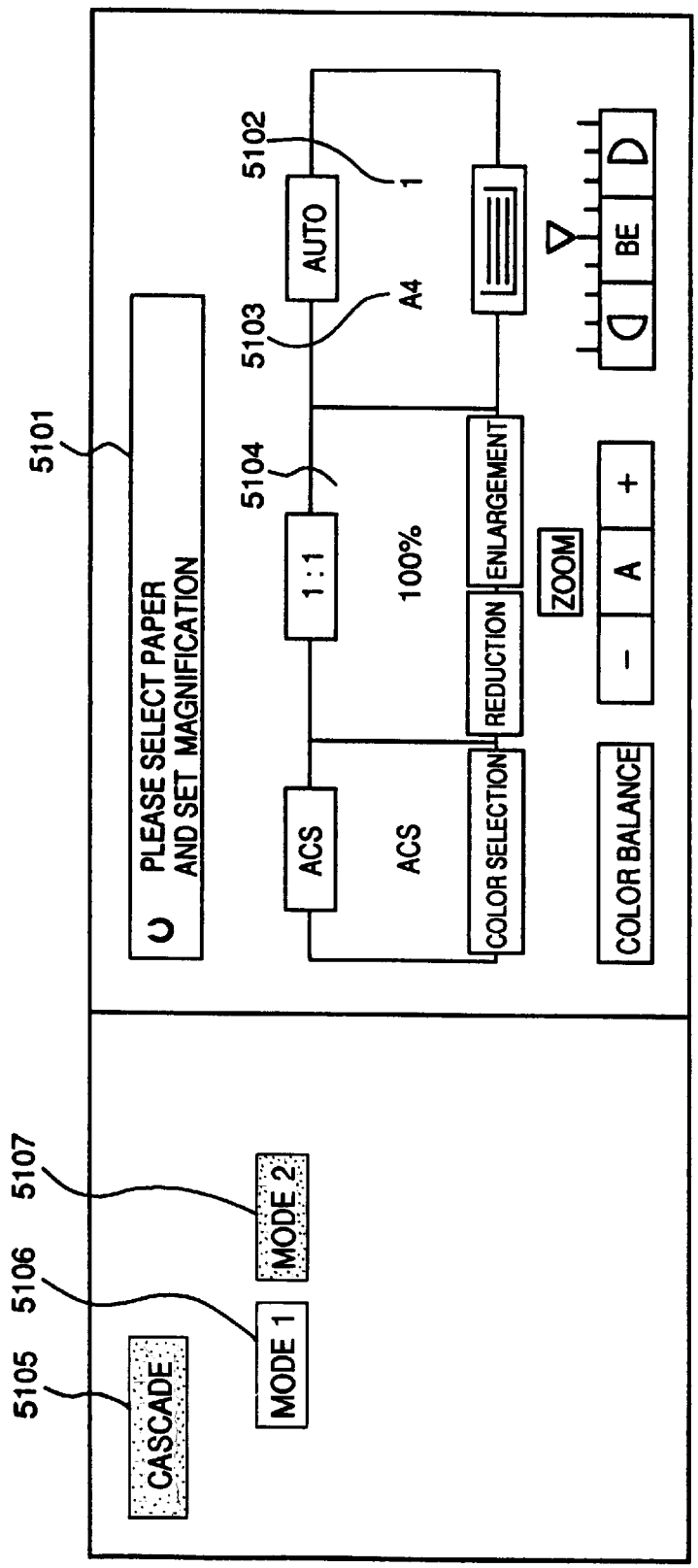
FIG. 48 is a diagram showing the display unit when a Mode 2 is selected.

In a case in which mode 2 has been selected, the master sends mode signal "1" to the slave side by the paper/magnification setting command at step S24 and displays the screen shown in FIG. 48 on the display unit 5005. Since mode 2 has been selected in this case, the "MODE 2" key 5107 is displayed against a black background and the message indicating the status of the apparatus at 5101 reads "PLEASE SELECT PAPER AND SET MAGNIFICATION". If there is an input from the operator, the settings are carried out. If there is no input, the settings stay as they are. This state continues until the copy start key 5001 is pressed and cascade copying starts at step S25.

When the slave side receives the mode signal "1" by the paper/magnification setting command at step S32, the program proceeds to step S33, where the state of mode 2 is attained and the slave displays the screen shown in FIG. 48 on the display unit 5005 in the same manner as on the master side. If there is an input from the operator, the settings are carried out. If there is no input, the settings stay as they are. This state continues until the copy start key 5001 is pressed on the master side and cascade copying starts at step S35.

When the copy start key 5001 is pressed on the master side, cascaded copying is executed at step S35 and copying in accordance with the above-mentioned settings is performed, after which the program returns to step S21 or S31.

Thus, in accordance with this embodiment, a cascade system can be operated efficiently by providing a mode 1 in which the enlargement/reduction magnification ratio and paper selection of all stations connected in cascade can be set from the master station, and a mode 2 in which the enlargement/reduction magnification ratio and paper selection can be set for individual stations from the master side.

Third Modification

In the fourth embodiment described above, the mode selection is performed whenever a transition is made to the cascade mode. However, an arrangement can be adopted in which a default is set, the mode selection is omitted under ordinary circumstances but can be carried out if necessary. Such an image processing system will now be described as a third modification.

Figure 49:
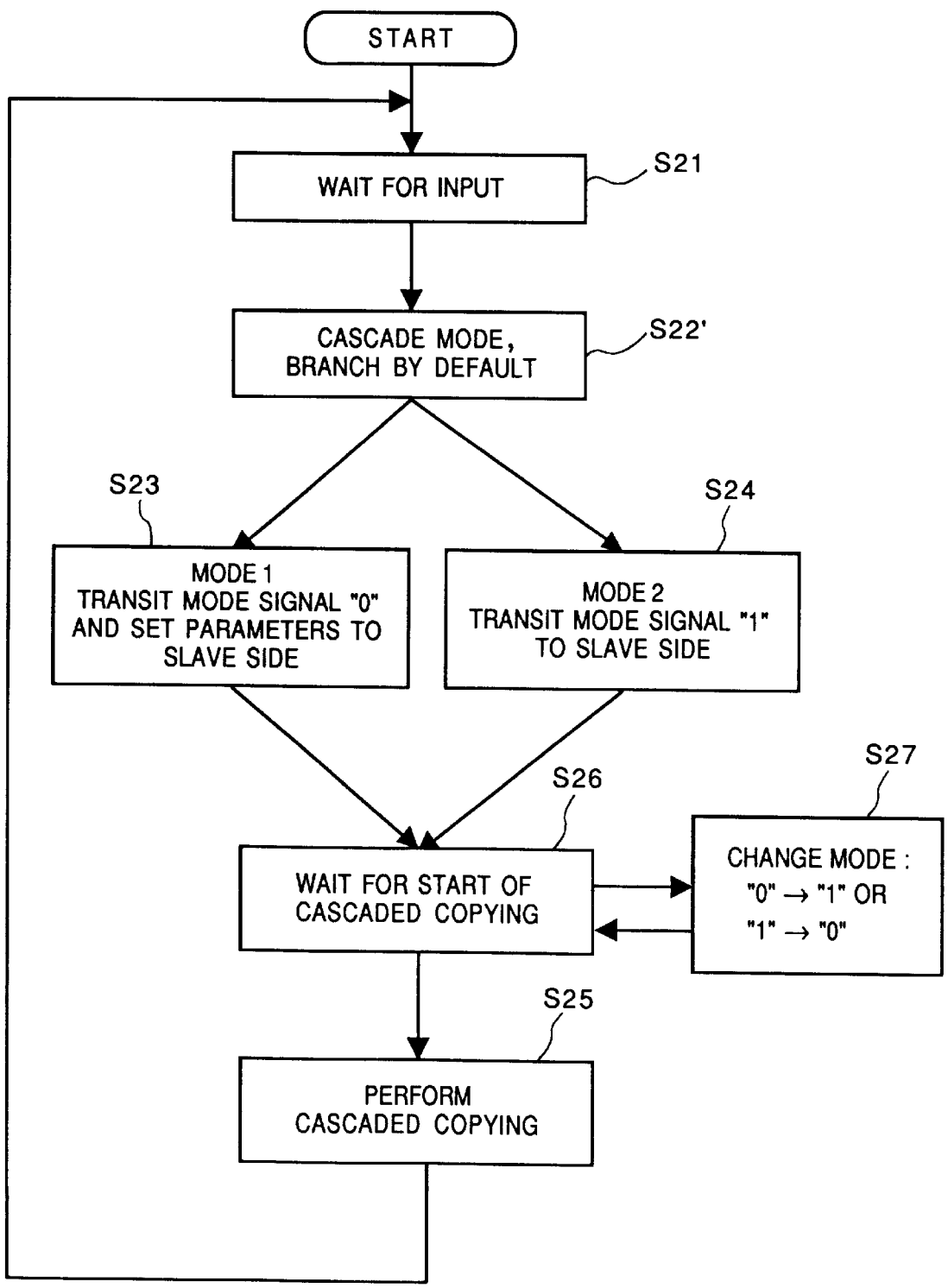
FIG. 49 is a flowchart showing the operating procedure on the master side when a cascade mode is in effect in a third modification.

FIG. 49 is a flowchart showing the operating procedure on the master side when the cascade mode is in effect in the third modification.

The master waits for an input at step S21 in FIG. 49. When the "CASCADE" mode setting key 5105 is pressed, the master shifts to the cascade mode at step S22 and branches to step S23 or S24 in accordance with a mode (default) set in advance. The master waits for the start of copying at step S26.

When the operator designates a mode change as by a predetermined key combination on the master side waiting for the start of copying, an interrupt state is established at step S27. The mode is changed in accordance with the operator input, the mode signal corresponding to the set mode is sent to the slave by the paper/magnification setting command and step S23 or S24 is executed in conformity with the set mode, after which the program returns to the state of step S26.

Figure 46:
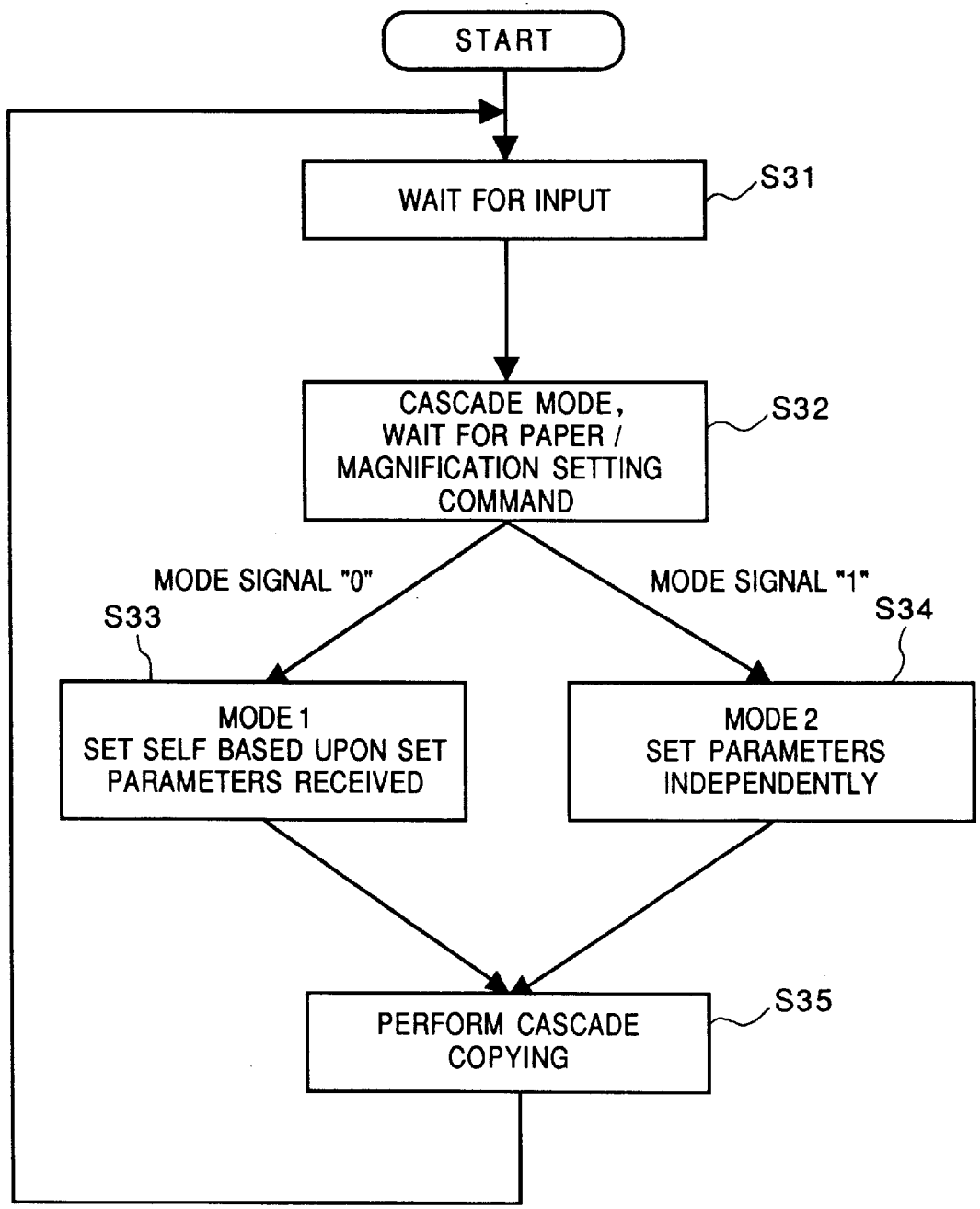

The slave side performs an operation substantially the same as the operation shown in FIG. 46. However, in the state in which the slave is waiting for the start of cascaded copying, the mode is changed in dependence upon the mode signal received from the master in response to the paper/magnification selection command.

If this arrangement is adopted, the usually performed operation can be shortened and simplified since it is unnecessary to carry out mode selection each time a transition is made to the cascade mode. Furthermore, the mode can be changed even at a moment just prior to the start of cascade copying, thereby allowing the desired operation to be performed by each station.

Fourth Modification

In the fourth embodiment and third modification, an example is described in which paper selection and magnification setting on the slave side are performed on the master side or carried out independently on the slave side. However, the setting of conditions on the slave side different from those on the master side can also be performed. Such an image processing system will now be described as a fourth modification.

Figure 50:
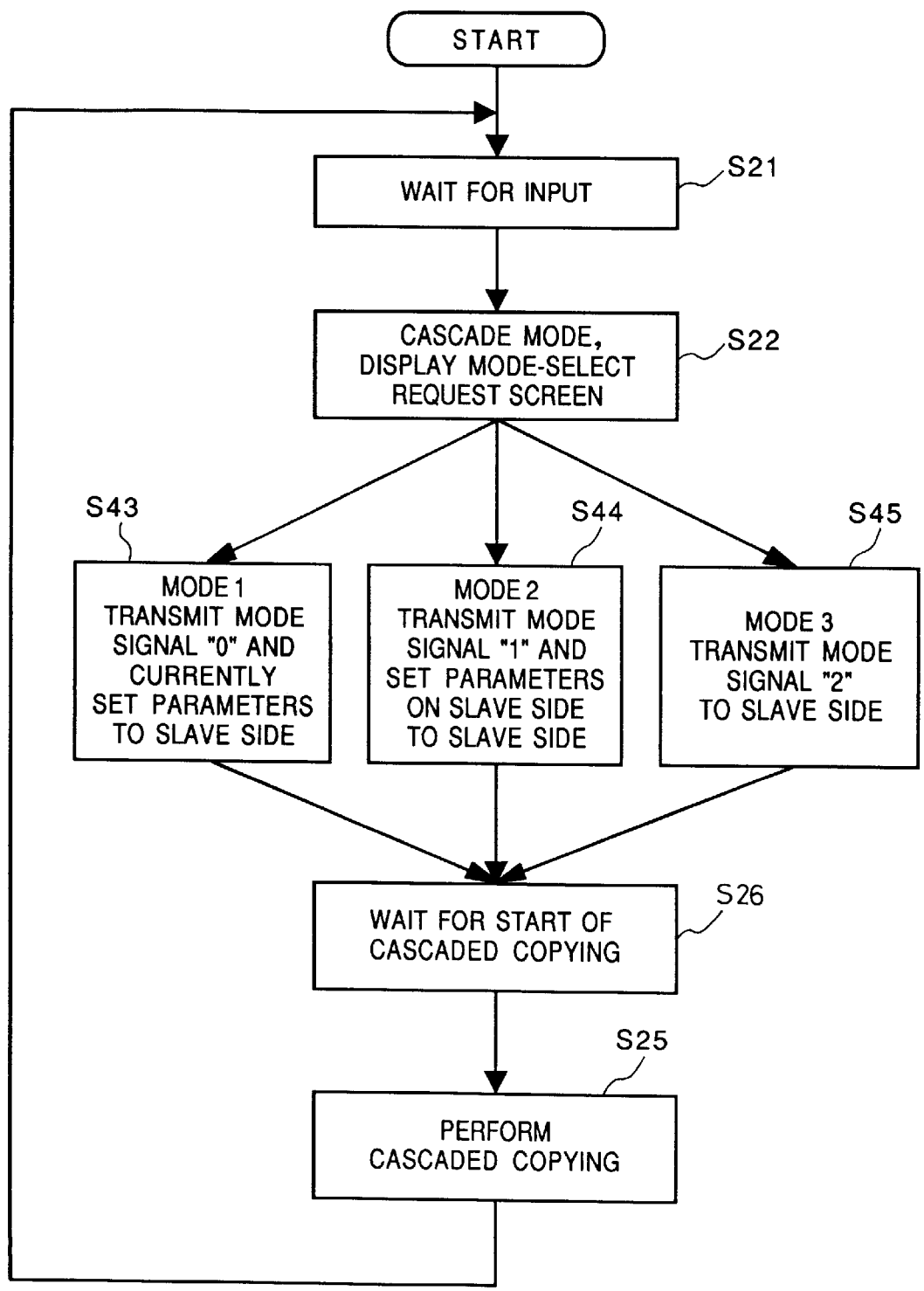
FIGS. 50 and 51 are flowcharts showing the operating procedure when a cascade mode is in effect in a fourth modification.
Figure 51:
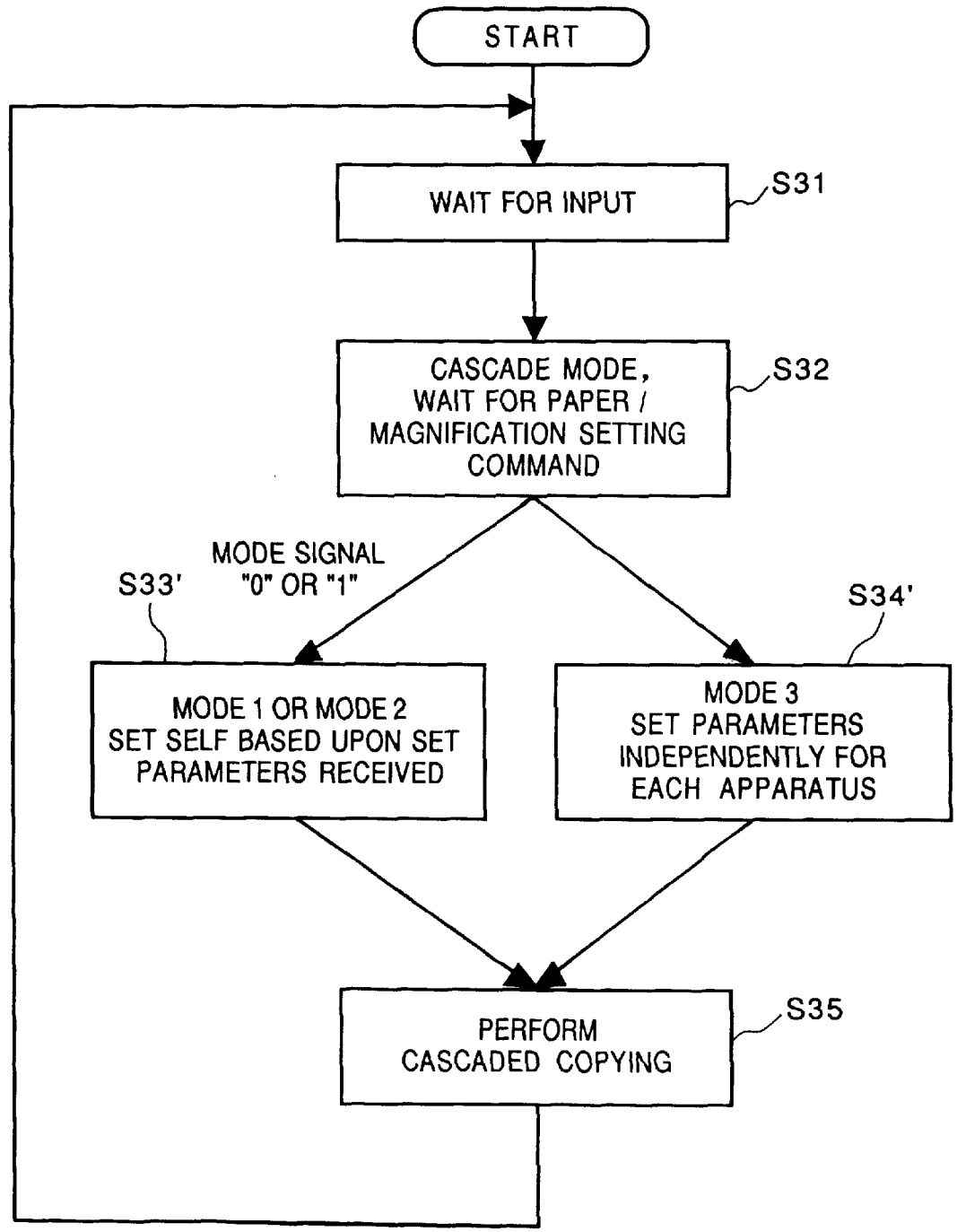

A procedure for selecting enlargement/reduction magnification and paper size in the cascade mode will now be described with reference to FIGS. 50 and 51. FIG. 50 shows the procedure on the master side and FIG. 51 the procedure on the slave side.

Figure 52:
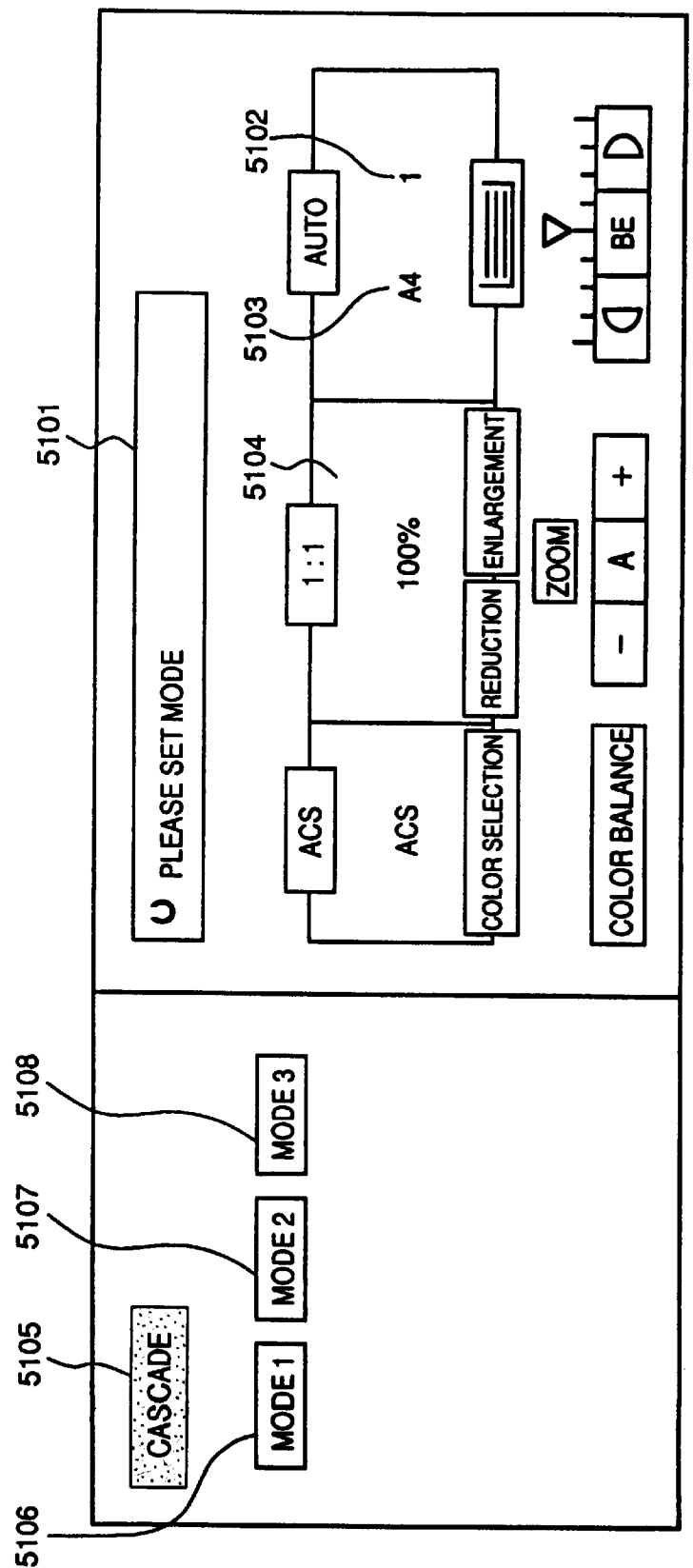
FIG. 52 is a diagram showing a mode setting screen presented on the display unit in the fourth modification.

Operation on the master side will be described first. The master waits for an input at step S21. When the "CASCADE" mode setting key 5105 is pressed, the master shifts to the cascade mode at step S22. Here the mode selecting screen shown in FIG. 52 is displayed as the display screen of the display unit 5005.

If, under these conditions, the operator presses the "MODE 1" key or a "MODE 3" key displayed on the display unit 5005 of the master, the program branches from step S43 to step S45 in dependence upon the key pressed.

More specifically, if mode 1 is selected, the mode signal "0" and the currently set parameters (enlargement/reduction magnification ratio and paper selection) are sent to the slave side by the paper/magnification setting command, after which the start of copying is awaited at step S26.

Figure 53:
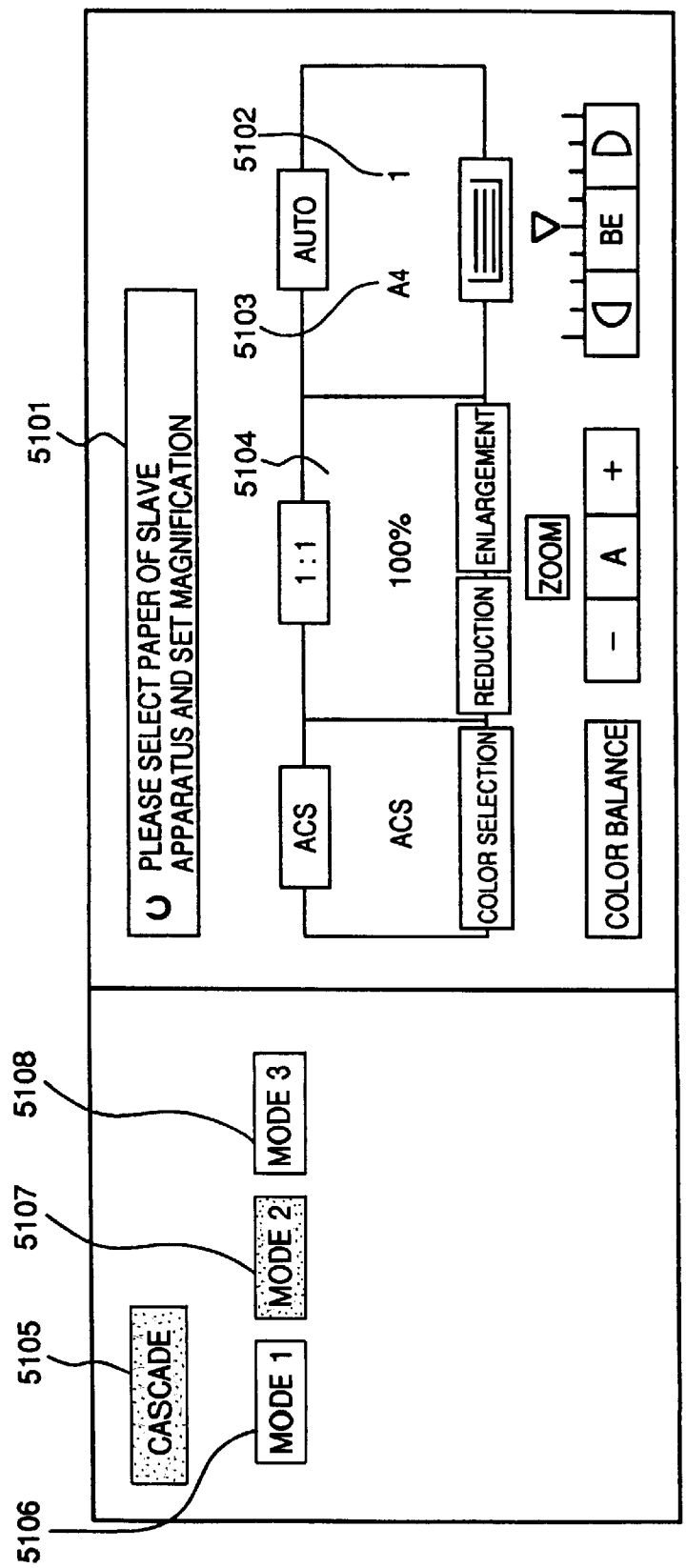
FIG. 53 is a diagram showing a parameter setting screen, on the slave side, presented on the display unit in the fourth modification.

If mode 2 is selected, the mode signal "1" is sent to the slave side by the paper/magnification setting command and the parameter setting screen on the slave side shown in FIG. 53 is displayed on the display unit 5005 at step S44. Since mode has been selected in this case, the "MODE 2" key 5107 is displayed against a black background and the message indicating the status of the apparatus at 5101 reads "PLEASE SELECT PAPER OF SLAVE AND SET MAGNIFICATION". The settings entered by the operator are then sent to the slave side, after which the start of copying is awaited at step S26.

If mode 3 is selected, the mode signal "2" is sent to the slave side at step S45 by the paper/magnification setting command, after which the start of copying is awaited at step S26.

Operation on the slave side will be described next.

Upon receiving an instruction to change over to the cascade mode, the slave side proceeds from the input waiting state of step S31 to step S32 in FIG. 46 and waits for the paper/magnification setting command to be sent from the master. If mode signal "0" or "1" is received by the paper/magnification setting command, the program branches to step S53, where the state shifts from mode 1 to mode 2 and the slave sets itself based upon the set parameters received from the master. This state continues until the copy start key 5001 is pressed and cascade copying starts at step S35.

Figure 54:
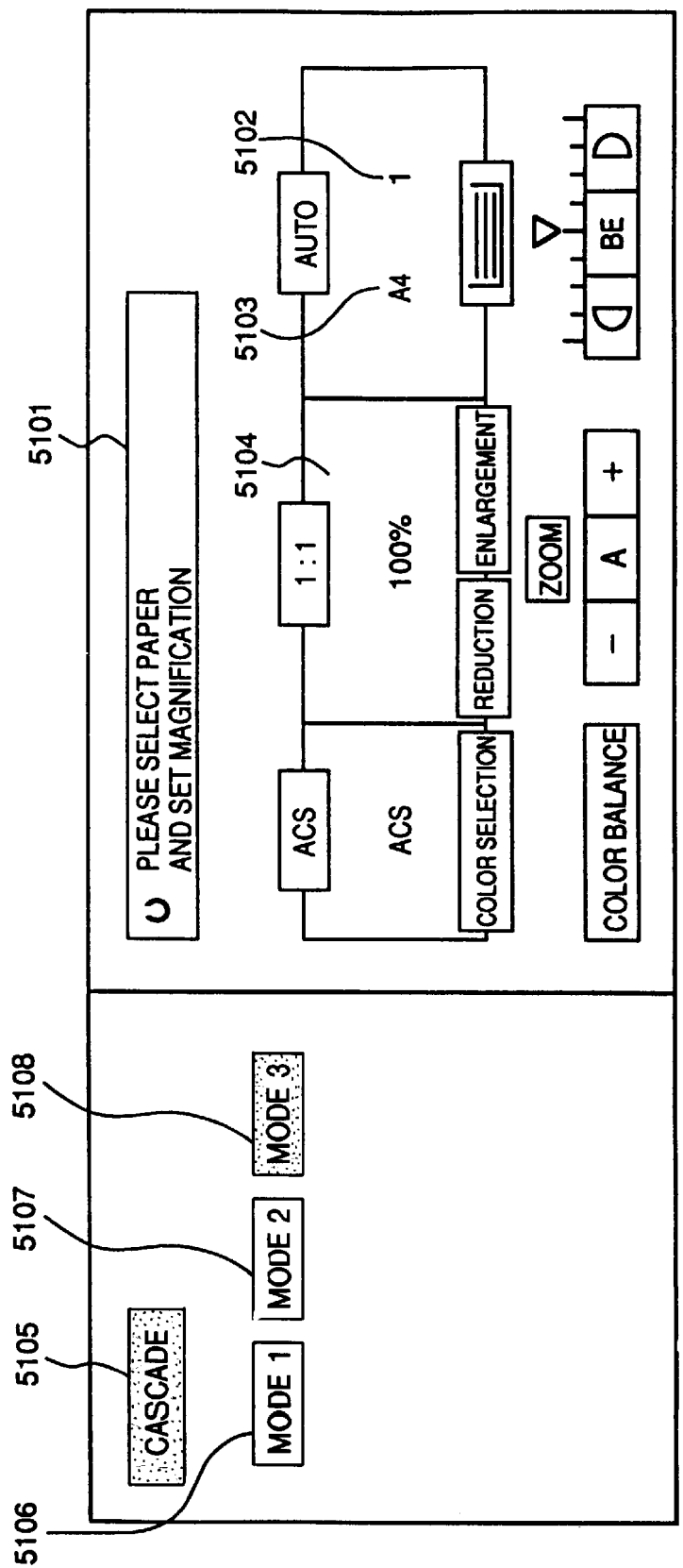
FIG. 54 is a diagram showing the display unit on the slave side when Mode 3 is selected in the fourth modification.

In a case where mode signal "2" is received, the program branches to step S54, mode 3 is established and the screen shown in FIG. 54 is displayed on the display unit 5005. Since mode 3 has been selected in this case, the "MODE 3" key 5108 is displayed against a black background and the message indicating the status of the apparatus at 5101 reads "PLEASE SELECT PAPER AND SET MAGNIFICATION". If there is an input from the operator, the settings are carried out. If there is no input, the settings stay as they are. This state continues until the copy start key 5001 is pressed and cascade copying starts at step S35.

Thus, the setting of conditions on the slave side different from those on the master side can be carried out.

As many apparently widely different embodiments of the present invention can be made without departing from the spirit and scope thereof, it is to be understood that the invention is not limited to the specific embodiments thereof except as defined in the appended claims.

What is claimed is:

1. An image processing system comprising plural image forming apparatuses and at least one image data generating apparatus for generating image data, wherein said system has an operation mode to form images by using a part or all of said plural image forming apparatuses based on image data generated by one of said at least one image data generating apparatus, and the one of said at least one image data generating apparatus comprises inputting means for inputting an instruction indicative of an image forming condition for each of said plural image forming apparatuses to be used when said system is operated in the operation mode where the image forming condition, for each of said plural image forming apparatuses to be used, can be independently instructed and inputted by said inputting means, and transmitting means for transmitting the instruction to each of the part or all of said plural image forming apparatuses.

2. The system according to claim 1, wherein the instruction indicates that the image(s) is to be formed on one side or both sides of a recording medium.

3. The system according to claim 1, wherein said at least one image data generating apparatus generates the image data by reading an image of an original.

4. The system according to claim 3, wherein said at least one image data generating apparatus has a mode to read an image of one side of the original, and a mode to read images of both sides of the original.

5. The system according to claim 1, wherein said plural image forming apparatuses have forming means for forming an image by using an electrophotographic printing method.

6. An image processing system comprising plural image forming apparatuses and at least one image data generating apparatus for generating image data, wherein said system has a function to form images by using a part or all of said plural image forming apparatuses based on image data generated by one of said at least one image data generating apparatus, and the one of said at least one image data generating apparatus comprises inputting means for inputting an instruction indicative of an image forming condition, and controlling means for controlling an image forming condition of the part or all of said plural image forming apparatuses which form the images when said system utilizes the function, wherein when said system utilizes the function, said controlling means has a first setting mode for uniformly setting the image forming condition indicated by the input instruction, to the part or all of said plural image forming apparatuses which form the images, and one or plural other setting modes for allowing each of the part or all of said plural image forming apparatuses to set an independent image forming condition.

7. The system according to claim 6, wherein one of the first setting mode and the one of plural other setting modes is predetermined as a default setting mode.

8. The system according to claim 6, wherein in the plural other setting modes, when an image forming condition is directly inputted to each of the part or all of said plural image forming apparatuses, the image forming apparatus having the image forming condition directly inputted can be set to the image forming condition, wherein the plural other setting modes include:

a second setting mode for setting the image forming condition which has previously been set in the image forming apparatus, in an image forming apparatus which has not been directly inputted an image forming condition; and a third setting mode for setting the image forming condition which has been inputted to the one of said plural image forming apparatuses, in an image forming apparatus which has not been directly inputted an image forming condition.

9. The system according to claim 6, wherein the image forming condition includes at least one of the following conditions: a size of a recording medium; and a magnification for enlargement or reduction.

10. The system according to claim 6, wherein said plural image forming apparatuses have forming means for forming an image by using an electrophotographic printing method.

11. An image processing system comprising plural image forming apparatuses and at least one image data generating apparatus for generating image data, wherein plural groups, each composed of at least one of said plural image forming apparatuses, can be set and registered for selection in an operation mode, wherein in the operation mode, one of the plural groups is selected, and images are formed by the at least one of said plural image forming apparatuses included in the selected group, based on image data generated by one of said at least one image data generating apparatus.

12. The system according to claim 11, wherein an image forming condition can be set for each of the plural groups.

13. The system according to claim 12, wherein the image forming condition includes at least one of the following conditions: a size of a recording medium; and a number of copies.

14. The system according to claim 11, wherein said at least one image data generating apparatus generates the image data by reading an original image.

15. The system according to claim 11, wherein said plural image forming apparatuses have forming means for forming an image by using an electrophotographic printing method.

* * * * *

UNITED STATES PATENT AND TRADEMARK OFFICE
CERTIFICATE OF CORRECTION

PATENT NO. : 6,031,631

DATED : February 29, 2000

INVENTOR(S) : MOTOAKI TAHARA ET AL.

It is certified that error appears in the above-identified patent and that said Letters Patent is hereby corrected as shown below:

SHEET 2:

FIG. 2, "CIRUIT" should read --CIRCUIT--.

SHEET 4:

FIG. 4, "CIRUIT" (both occurrences) should read --CIRCUIT--.

SHEET 29:

FIG. 29, "TARANSITION" should read --TRANSITION--.

Figure 39:
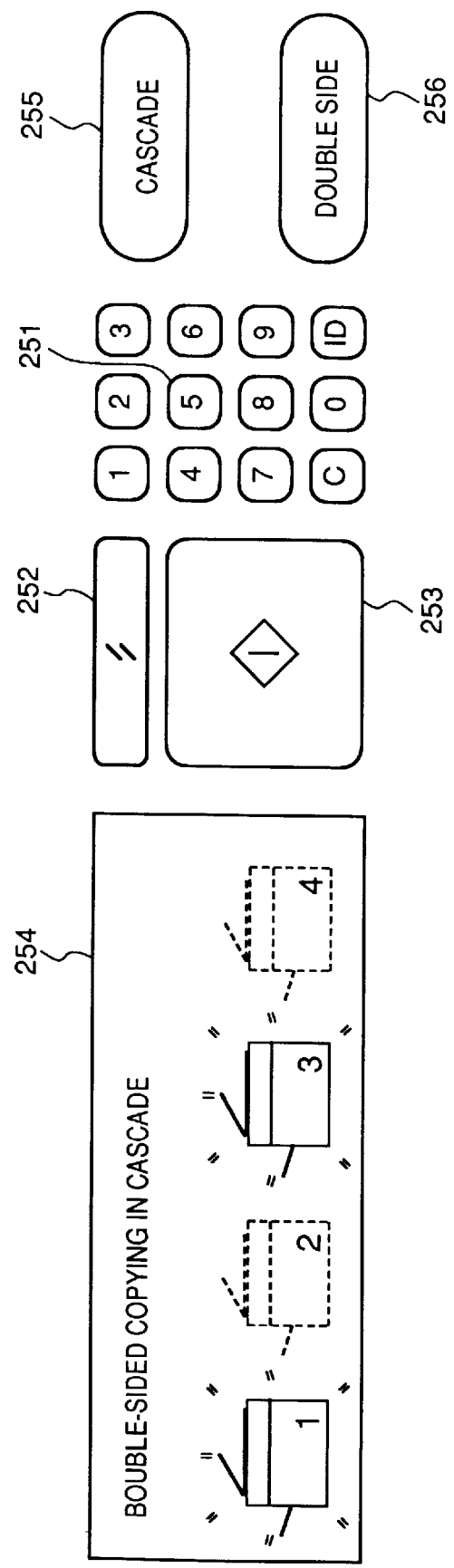

SHEET 39:

FIG. 39, "BOUBLE" should read --DOUBLE--.

COLUMN 1:

Line 25, "a arrangement" should read --an arrangement--.

UNITED STATES PATENT AND TRADEMARK OFFICE
CERTIFICATE OF CORRECTION

PATENT NO. : 6,031,631

DATED : February 29, 2000

INVENTOR(S) : MOTOAKI TAHARA ET AL.

It is certified that error appears in the above-identified patent and that said Letters Patent is hereby corrected as shown below:

COLUMN 2:

Line 27, "iimage" should read --image--; and
    Line 31, "conditioins" should read --conditions-- and "ar" should read --are--.

COLUMN 5:

Line 44, "latent-images" should read --latent images--;
    Line 53, "an means" should read --a means--; and
    Line 59, "describe" should read --described--.

COLUMN 7:

Line 2, "front-" should read --front--; and
    Line 18, "rotting" should read --rotating--.

COLUMN 8:

Line 7, "after-which" should read --after which--.

COLUMN 9:

Line 6, "further, The" should read --further, the--.

UNITED STATES PATENT AND TRADEMARK OFFICE
CERTIFICATE OF CORRECTION

PATENT NO. : 6,031,631

DATED : February 29, 2000

INVENTOR(S) : MOTOAKI TAHARA ET AL.

It is certified that error appears in the above-identified patent and that said Letters Patent is hereby corrected as shown below:

COLUMN 16:

Line 37, "Æ" (three occurrences) should read --→--;
    Line 38, "Æ" (two occurrences) should read --→--;
    Line 39, "Æ" should read --→--;
    Line 60, "Æ" (two occurrences) should read --→--;
    Line 61, "Æ" (two occurrences) should read --→--;
    Line 62, "Æ" (three occurrences) should read --→--;
    Line 63, "Æ" (two occurrences) should read --→--; and
    Line 64, "Æ" should read --→--.

COLUMN 20:

MODE 1, """ (middle column, all occurrences) should read --←--;
    MODE 2, """ (middle column, all occurrences) should read --←--;
    MODE 3, """ (middle column, all occurrences) should read --←--; and
    MODE 4, """ (middle column, all occurrences) should read --←--.

COLUMN 21

MODE 5, """ (middle column, all occurrences) should read --←--;
    MODE 6, """ (middle column, all occurrences) should read --←--;

UNITED STATES PATENT AND TRADEMARK OFFICE
CERTIFICATE OF CORRECTION

PATENT NO. : 6,031,631
DATED : February 29, 2000
INVENTOR(S) : MOTOAKI TAHARA ET AL.

It is certified that error appears in the above-identified patent and that said Letters Patent is hereby corrected as shown below:

```
    MODE 7, """ (middle column, all occurrences) should
        read --←--; and
    MODE 8, """ (middle column, all occurrences) should
        read --←--.
```

COLUMN 22:

```
    MODE 8, """ (middle column, all occurrences) should
        read --←--;
    MODE 9, """ (middle column, all occurrences) should
        read --←--;
    MODE 10, """ (middle column, all occurrences) should
        read --←--; and
    MODE 11, """ (middle column, all occurrences) should
        read --←--.
```

COLUMN 23:

```
    MODE 12, """ (middle column, all occurrences) should
        read --←--;
    MODE 13, """ (middle column, all occurrences) should
        read --←--;
    MODE 14, """ (middle column, all occurrences) should
        read --←--; and
    MODE 15, """ (middle column, all occurrences) should
        read --←--.
```

UNITED STATES PATENT AND TRADEMARK OFFICE
CERTIFICATE OF CORRECTION

PATENT NO. : 6,031,631
DATED : February 29, 2000
INVENTOR(S) : MOTOAKI TAHARA ET AL.

It is certified that error appears in the above-identified patent and that said Letters Patent is hereby corrected as shown below:

COLUMN 24:

MODE 15, """ (middle column, all occurrences) should read --←--;
    MODE 16, """ (middle column, all occurrences) should read --←--;
    MODE 17, """ (middle column, all occurrences) should read --←--; and
    MODE 18, """ (middle column, all occurrences) should read --←--.

COLUMN 25:

MODE 19, """ (middle column, all occurrences) should read --←--; and
    MODE 20, """ (middle column, all occurrences) should read --←--.

COLUMN 29:

Line 38, "AS" should read --As--; and
    Line 45, "of a" should read --that a--.

UNITED STATES PATENT AND TRADEMARK OFFICE
CERTIFICATE OF CORRECTION

PATENT : 6,031,631
DATED : February 29, 2000
INVENTOR(S) : MOTOAKI TAHARA ET AL.

It is certified that error appears in the above-identified patent and that said Letters Patent is hereby corrected as shown below:

COLUMN 33:

Line 63, "need be" should read --need not be--.

Signed and Sealed this

Fifteenth Day of May, 2001

NICHOLAS P. GODICI

*Attest:*

*Attesting Officer*    *Acting Director of the United States Patent and Trademark Office*